United States Patent
Tateishi et al.

(10) Patent No.: US 7,270,703 B2
(45) Date of Patent: *Sep. 18, 2007

(54) COLORED IMAGE-FORMING COMPOSITION CONTAINING PHTHALOCYANINE COMPOUND, INKS, INKJET INKS, INKJET RECORDING METHOD AND METHOD FOR IMPROVING TOLERACNE TO DECOLORATION DUE TO OZONE GAS

(75) Inventors: Keiichi Tateishi, Minami-Ashigara (JP); Masaki Noro, Minami-Ashigara (JP); Yoshiharu Yabuki, Minami-Ashigara (JP); Tadashi Omatsu, Minami-Ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 54 days.

This patent is subject to a terminal disclaimer.

(21) Appl. No.: 10/362,140

(22) PCT Filed: Jun. 21, 2002

(86) PCT No.: PCT/JP02/06248

§ 371 (c)(1),
(2), (4) Date: Oct. 31, 2003

(87) PCT Pub. No.: WO03/000811

PCT Pub. Date: Jan. 3, 2003

(65) Prior Publication Data

US 2004/0099181 A1    May 27, 2004

(30) Foreign Application Priority Data

| Jun. 22, 2001 | (JP) | 2001-189982 |
| Jun. 22, 2001 | (JP) | 2001-190214 |
| Jun. 22, 2001 | (JP) | 2001-190215 |
| Jun. 22, 2001 | (JP) | 2001-190216 |

(51) Int. Cl.
C09D 11/00 (2006.01)
C09D 11/02 (2006.01)
B41J 2/01 (2006.01)
C09B 67/00 (2006.01)

(52) U.S. Cl. .............. 106/31.49; 106/31.47; 106/31.77; 106/31.78; 540/131; 347/100

(58) Field of Classification Search .......... 106/31.49, 106/31.47, 31.78, 31.77; 540/131; 347/100
See application file for complete search history.

(56) References Cited

U.S. PATENT DOCUMENTS

| 5,183,501 | A * | 2/1993 | Kawashita et al. | 106/31.44 |
| 6,015,455 | A * | 1/2000 | Yano et al. | 106/31.58 |
| 6,379,441 | B1 * | 4/2002 | Kanaya et al. | 106/31.49 |
| 6,444,807 | B1 * | 9/2002 | Wolleb et al. | 540/131 |
| 6,517,621 | B2 * | 2/2003 | Andrievsky et al. | 106/31.49 |
| 6,645,281 | B2 * | 11/2003 | Yabuki et al. | 106/31.27 |
| 2002/0067399 | A1 * | 6/2002 | Yabuki et al. | 347/100 |
| 2002/0107301 | A1 * | 8/2002 | Yamanouchi et al. | 523/160 |
| 2003/0217671 | A1 * | 11/2003 | Ozawa | 106/31.49 |
| 2004/0035322 | A1 * | 2/2004 | Ishizuka et al. | 106/31.59 |
| 2004/0045478 | A1 * | 3/2004 | Tateishi et al. | 106/31.49 |
| 2004/0050291 | A1 * | 3/2004 | Taguchi et al. | 106/31.27 |
| 2004/0099181 | A1 * | 5/2004 | Tateishi et al. | 106/31.47 |
| 2004/0154496 | A1 * | 8/2004 | Taguchi | 106/31.48 |
| 2004/0187734 | A1 * | 9/2004 | Ozawa et al. | 106/31.27 |
| 2004/0187738 | A1 * | 9/2004 | Taguchi et al. | 106/31.48 |
| 2005/0073563 | A1 * | 4/2005 | Hanaki et al. | 347/100 |
| 2005/0081745 | A1 * | 4/2005 | Ogawa et al. | 106/31.27 |
| 2005/0132927 | A1 * | 6/2005 | Tateishi et al. | 106/31.47 |

FOREIGN PATENT DOCUMENTS

| DE | 38 43 605 A1 | | 6/1990 |
| DE | 3843605 | * | 6/1990 |
| EP | 0 297 044 A2 | | 12/1988 |
| EP | 297044 | * | 12/1988 |
| EP | 1 243 626 A1 | | 9/2002 |
| EP | 1 243 627 A1 | | 9/2002 |
| EP | 1 364 994 A1 | | 11/2003 |
| JP | 62-190273 A | | 8/1987 |
| JP | 04/097889 | * | 3/1992 |
| JP | 04-97889 A | | 3/1992 |
| JP | 06-57653 A | | 3/1994 |
| JP | 2000-303009 A | | 10/2000 |
| JP | 2002/249677 | * | 9/2002 |
| JP | 2002-249677 A | | 9/2002 |
| WO | WO 00/08101 A2 | | 2/2000 |
| WO | WO 00/08102 A1 | | 2/2000 |
| WO | WO 00/08103 A1 | | 2/2000 |
| WO | 00/17275 A1 | | 3/2000 |
| WO | WO02/8340 | * | 1/2002 |
| WO | WO 02/08340 A1 | | 1/2002 |

OTHER PUBLICATIONS

International Search Report issued in International Applicatiom No. PCT/JP02/06248, on Oct. 15, 2002.

* cited by examiner

Primary Examiner—Helene Klemanski
(74) Attorney, Agent, or Firm—Buchanan Ingersoll & Rooney PC

(57) ABSTRACT

To provide a novel phthalocyanine compound, and an inkjet ink and inkjet recording method capable of an image having an excellent hue, fastness to light and ozone gas resistance. To provide various coloring compositions such as an ink sheet for heat-sensitive recording material, color toner for electrophotography, and color filter, and to provide improving method of oxidation resistance of an image. [Means for Resolution] A phthalocyanine compound substituted with $-SO_2NH-Z$ (Z represents a heterocyclic group) in at least one combination of 2 and 3, 6 and 7, 10 and 11, and 14 and 15-positions, wherein at least one of the 1 to 16-positions has two or more carbon atoms and the total number of the carbon atom thereof is 8 or more, inkjet ink using the compound, ink sheet, color toner and a color filter composition, which use the compound.

59 Claims, No Drawings

COLORED IMAGE-FORMING COMPOSITION CONTAINING PHTHALOCYANINE COMPOUND, INKS, INKJET INKS, INKJET RECORDING METHOD AND METHOD FOR IMPROVING TOLERACNE TO DECOLORATION DUE TO OZONE GAS

TECHNICAL FIELD

The present invention relates to a novel phthalocyanine compound and a colored image-forming composition containing the compound, and in particular, to an oil-soluble ink for cyan color inkjet, an inkjet recording method and a method for improving ozone gas fading resistance (hereinafter, sometimes referred to as "ozone gas resistance") of an image-recorded material utilizing the ink jet recording.

BACKGROUND ART

In recent years, as colored image-forming materials, materials particularly for forming color images are the main current. Concretely, are extensively utilized inkjet mode recording materials, thermal transfer mode recording materials, electrophotographic mode recording materials, transfer mode silver halide light-sensitive materials, printing inks, recording pens, and the like. Further, color filters are used for recording and reproducing color images in picture elements such as CCD in instruments for picture-taking, and in LCD and PDP in displays. In these color image-recording materials and color filters, in order to reproduce or record full-color images, dyes (dyestuffs and pigments) of three primary colors of the so-called additive color mixture process or subtractive color mixture process are used. However, it is the present status that dyes having an absorption characteristic capable of realizing preferred color reproduction areas and having a fastness so as to endure various use conditions and environmental conditions are not available, and improvements are being eagerly demanded.

The inkjet recording method becomes rapidly widespread and is being further developed because the material cost is cheap, high-speed recording is possible, a noise during the recording is low, and color recording is easy. The ink-jet recording method includes a continuous mode for continuously flying droplets and an on-demand mode for flying droplets according to image information signals. Further, the discharge mode includes a mode for applying a pressure by a piezoelectric element to discharge droplets, a mode for generating bubbles in an ink by heat to discharge droplets, a mode for using a ultrasonic wave, and a mode for aspirating and discharging droplets by electrostatic force. Moreover, as the inkjet ink, are used aqueous inks, oil based inks, or solid (melting type) inks.

The dyes used for such inkjet inks must meet the requirements that they are good in solubility or dispersibility in solvents; they can achieve high-speed recording; they have a good hue; they are fast to light, heat, and active gases (oxidizing gases such as NOx and ozone as well as Sox) in the environment; they have superior fastness to water or chemicals; they are good in fixing properties to image-receiving materials and hardly ooze; they are superior in preservability as inks; they have no toxicity; they have a high purity; and they are cheap.

In particular, the dyes are eagerly demanded such that they are a dye having a good cyan hue and having fastness to light, humidity and heat, especially they are fast to oxidizing gases in the environment, such as ozone, during printing on an image-receiving material having an ink-receiving layer containing porous white inorganic pigment particles.

In color copiers or color laser printers utilizing an electrophotographic mode, in general, toners having a coloring material dispersed in resin particles are widely used. As the performance required for the color toners, there are enumerated an absorption characteristic capable of realizing preferred color reproduction areas; a high light transmittance (transparency) that will be of a problem especially during the use by an overhead projector (hereinafter referred to as "OHP"); and various fastnesses under environmental conditions for use. The toners having a pigment as a coloring material dispersed in particles are disclosed in JP-A-62-157051, JP-A-62-255956, and JP-A-6-118715. Though these toners are superior in light fastness, they are insoluble so that they likely cause coagulation. Thus, they are problematic in a reduction of transparency of the colored layer and in a change of hue of the transmitted color. On the other hand, the toners using a dye as a coloring material are disclosed in JP-A-3-276161, JP-A-7-209912, and JP-A-8-123085. These toners are inversely high in transparency and free from a change of hue, but they are problematic in light fastness.

The thermal transfer recording has advantages such that the apparatus is small-sized and can realize a cost reduction; that its operation and maintenance are easy; and that a running cost is cheap. As the performance required for the dyes to be used in the thermal transfer recording, there are enumerated an absorption characteristic capable of realizing preferred color reproduction areas; coexistence of heat transfer properties and fixing properties after the transfer; heat stability; and various fastnesses of obtained images. However, none of the conventionally known dyes could meet all of these performances. For example, from an object to improve the fixing properties and the light fastness, a thermal transfer recording material and an image-forming method, in which a chelate is formed by a transition metal ion in an image-receiving material in which a heat diffusible dye is previously added are proposed in JP-A-60-2398, etc. However, the absorption characteristic of the formed chelate dye is in an unsatisfactory level, and there is a problem in environment by using the transition metal.

Since the color filters are required to have a high transparency, there was employed a method called a dyeing method for coloring using a dyestuff. For example, a method in which a dyeable photoresist is subjected to pattern exposure and development to form a pattern, which is then dyed with a dye of a filter color, is successively repeated with respect to all filter colors, whereby a color filter can be produced. Besides the dyeing method, color filters can also be produced by a method using a positive-working resist as described in U.S. Pat. No. 4,808,501, JP-A-6-35182, etc. According to these methods, since the dye is used, the transmittance is high, and the optical characteristics of the resulting color filters are superior. But, there are limits with respect to the light fastness, heat resistance, and the like. Accordingly, realization of dyes having superior various resistances and high transparency was demanded. On the other hand, there is widely known a method using an organic pigment having superior light fastness and heat resistance in place of the dye. But, it was difficult for color filters using a pigment to obtain the following optical characteristics.

The dyes to be used in the respective applications as described above must be commonly provided with the following properties. Namely, they have an absorption characteristic preferable for color reproducibility; they are good in fastnesses under the environmental conditions for use, for example, light fastness, heat resistance, resistance to oxidizing gases such as ozone, and fastness to other chemicals such as sulfurous gas; and they have a large molar absorption coefficient.

Hitherto, as the cyanine dye, phthalocyanine dyes having super hue and light fastness have been used in almost all cases. However, since the phthalocyanine dyes do not have a sufficient fastness to oxidizing gases, especially ozone, improvements are demanded.

As a dye skeleton used for inkjet ink, a phthalocyanine or triphenylmethane structure is representative. Incidentally, "Pc" as referred to this description means a phthalocyanine skeleton.

As representative phthalocyanine compounds that are most widely reported and utilized, are enumerated phthalocyanine derivatives classified into the following groups (1) to (6).

(1) Phthalocyanine copper compounds [for example, a mixture of Cu-Pc-$(SO_3Na)_m$, wherein m is from 1 to 4], such as Direct Blue 86 or Direct Blue 87.

(2) Direct Blue 199 and phthalocyanine compounds as described in, JP-A-62-190273, JP-A-63-28690, JP-A-63-306075, JP-A-63-306076, JP-A-2-131983, JP-A-3-122171, JP-A-3-200883, JP-A-7-138511, etc. [for example, a mixture of Cu-Pc-$(SO_3Na)_m(SO_2NH_2)_n$, wherein (m+n) is from 1 to 4 (hereinafter, Pc means a phthalocyanine skeleton)].

(3) Phthalocyanine dyes as described in JP-A-63-210175, JP-A-63-37176, JP-A-63-304071, JP-A-5-171085, WO 00/08102, etc. [for example, Cu-Pc-$(CO_2H)_m(CONR_1R_2)_n$, wherein (m+n) is a number of from 0 to 4].

(4) Phthalocyanine dyes as described in JP-A-59-30874, JP-A-1-126381, JP-A-1-190770, JP-A-6-16982, JP-A-7-82499, JP-A-8-34942, JP-A-8-60053, JP-A-8-113745, JP-A-8-310116, JP-A-10-140063, JP-A-10-298463, JP-A-11-29729, JP-A-11-320921, EP173476A2, EP468649A1, EP559309A2, EP596383A1, DE3411476, U.S. Pat. No. 6,086,955, WO 99/13009, GB2341868A, etc. [for example, Cu-Pc-$(SO_3H)_m(SO_2NR_1R_2)_n$, wherein (m+n) is a number of from 0 to 4, and m is not 0].

(5) Phthalocyanine dyes as described in JP-A-60-208365, JP-A-61-2772, JP-A-6-57653, JP-A-8-60052, JP-A-8-295819, JP-A-10-130517, JP-A-11-72614, JP-T-11-515047, JP-T-11-515048, EP196901A2, WO 95/29208, WO 98/49239, WO 98/49240, WO 99/50363, WO 99/67334, etc. [for example, Cu-Pc-$(SO_3H)_l(SO_2NH_2)_m(SO_2NR_1R_2)_n$, wherein (l+m+n) is a number of from 0 to 4].

(6) Phthalocyanine dyes as described in JP-A-59-22967, JP-A-61-185576, JP-A-1-95093, JP-A-3-195783, EP649881A1, WO 00/08101, WO 00/08103, etc. [for example, Cu-Pc-$(SO_2NR_1R_2)_n$, wherein n is a number of from 0 to 4].

Now, the phthalocyanine dyes represented by Direct Blue 87 or Direct Blue 199, as widely used at present, are characterized in that they are superior in light fastness to generally known magenta dyes or yellow dyes.

However, the phthalocyanine dyes have a greenish hue under acidic conditions and are not suitable for cyan inks. For this reason, in the case where these dyes are used as an cyan ink, it is most suitable to use them under neutral to alkaline conditions. But, even when the ink is neutral or alkaline, in the case where a material to be recorded, which is used, is acidic paper, the hue of a printed matter may possibly be greatly changed.

In addition, the phthalocyanine dyes are discolored greenish and erased even by oxidizing gases that are often taken into account as an environmental problem nowadays, such as nitrogen oxide gas and ozone, and simultaneously, the printing density is lowered.

On the other hand, the triphenylmethane dyes and/or pigments are good in hue but are very inferior in light fastness, ozone gas resistance, etc.

After this, if the utilization field is enlarged, and the dyes are widely used in displays such as advertisements, the dyes will be more likely exposed to light and active gases in the environment. Accordingly, realization of dyes and ink compositions particularly having a good hue, an excellent light fastness and superior fastness to active gases (oxidizing gases such as NOx and ozone as well as Sox) in the environment are being eagerly demanded more and more.

However, the development of cyan dyes (for example, phthalocyanine dyes) and cyan inks, which can meet these requirements in a high level, is difficult, and it is the present status that dyes and inks meeting the requirements have not become available yet.

So far, the phthalocyanine dyes to which the ozone gas resistance is imparted are described in JP-A-3-103484, JP-A-4-39365, JP-A-2000-303009, etc. However, it is the present status that the hue and the fastness to light and oxidizing gases are not compatible with each other. Cyan ink products that are fully satisfactory with the requirements in the market have not been provided yet.

DISCLOSURE OF THE INVENTION

The invention is aimed to solve the problems of the prior art and to achieve the following objects. Namely, the objects of the invention are:

(1) To provide novel coloring agents (dyes and pigments) having an absorption characteristic superior in color reproducibility as dyes of three primary colors and having sufficient fastness to light, heat, humidity, and active gases in an environment;

(2) To provide various coloring compositions capable of giving colored images and coloring materials superior in hue and fastness, which are used for inks for printing such as inkjet, ink sheets in heat-sensitive recording materials, color toners for electrophotography, color filers used in displays such as LCD and PDP and picture elements such as CCD, and the like;

(3) To provide inkjet inks capable of forming images having a good hue and high fastness to light and active gases in an environment, particularly ozone gas, particularly by the use of the phthalocyanine compound derivatives, and an ink-jet recording method; and (4) To provide a method of making images fast for improving a fading resistance to ozone gas of image-recorded materials by utilizing the inkjet recording method.

The present inventors made extensive investigations on phthalocyanine compound derivatives having a good hue and high light fastness and gas fastness (particularly to ozone gas). As a result, it has been found that the foregoing problems can be solved by phthalocyanine compounds represented by the following general formulae (I), (II), (III) and (IV), each having a specific dye structure (a specific number of specific substituents are introduced in specific positions to be substituted), which have not hitherto been known, leading to accomplishment of the invention. Specifically, the foregoing problems of the invention are achieved by the following means.

(1) An ink, which is characterized by containing at least one compound selected from phthalocyanine compounds represented by the following general formulae (I), (II), (III) and (IV).

General formula (I)

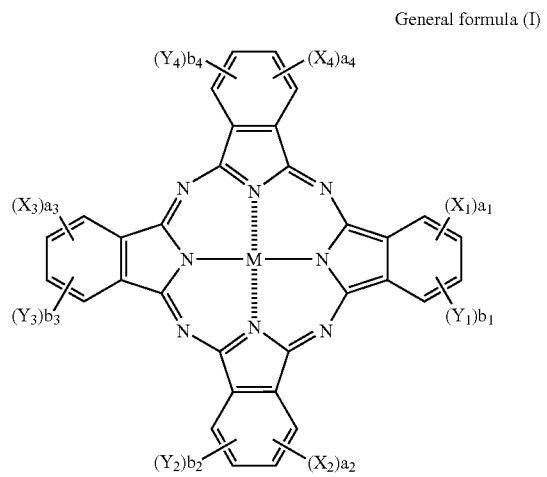

In the general formula (I), $X_1$, $X_2$, $X_3$, and $X_4$ each independently represents —SO—Z and/or —SO$_2$—Z, wherein Zs each independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group.

$Y_1$, $Y_2$, $Y_3$, and $Y_4$ each independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amide group, an arylamino group, an ureido group, a sulfamoylamino group, an alkylthio group, an arylthio group, an alkoxycarbonylamino group, a sulfonamide group, a carbamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a phosphoryl group, or an acyl group. These groups may be further substituted.

However, at least one of $X_1$, $X_2$, $X_3$, $X_4$, $Y_1$, $Y_2$, $Y_3$, and $Y_4$ represents a substituent having 2 or more carbon atoms, and the total sum of carbon atoms of the substituents represented by $X_1$, $X_2$, $X_3$, $X_4$, $Y_1$, $Y_2$, $Y_3$, and $Y_4$ is 8 or more.

a1 to a4, and b1 to b4 each represents a number of the substituents of $X_1$ to $X_4$, and $Y_1$ to $Y_4$; a1 to a4 each independently represents an integer of from 0 to 4, provided that all of them are never 0 at the same time; and b1 to b4 each independently represents an integer of from 0 to 4.

M represents a hydrogen atom, a metal element, or an oxide, a hydroxide or a halide thereof.

General formula (II)

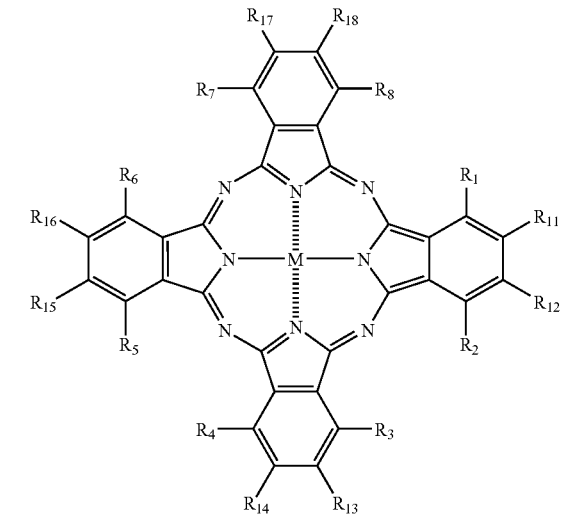

In the general formula (II), $R_1$, $R_2$, $R_3$, $R_4$, $R_5$, $R_6$, $R_7$, and $R_8$ each independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amide group, an arylamino group, an ureido group, a sulfamoylamino group, an alkylthio group, an arylthio group, an alkoxycarbonylamino group, a sulfonamide group, a carbamoyl group, a sulfamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a phosphoryl group, or an acyl group; and each group may be further substituted.

$R_{11}$, $R_{12}$, $R_{13}$, $R_{14}$, $R_{15}$, $R_{16}$, $R_{17}$, and $R_{18}$ each independently represents a hydrogen atom, a halogen atom, or a substituted sulfamoyl group.

However, with respect to each of $R_{11}$ and $R_{12}$, $R_{13}$ and $R_{14}$, $R_{15}$ and $R_{16}$, and $R_{17}$ and $R_{18}$, at least either one represents a substituted sulfamoyl group, and at least one of the four or more substituted sulfamoyl groups present has a substituent having 2 or more carbon atoms. Further, the total sum of carbon atoms of the substituents represented by $R_1$, $R_2$, $R_3$, $R_4$, $R_5$, $R_6$, $R_7$, $R_8$, $R_{11}$, $R_{12}$, $R_{13}$, $R_{14}$, $R_{15}$, $R_{16}$, $R_{17}$, and $R_{18}$ is 8 or more.

M represents a hydrogen atom, a metal element, a metal oxide, a metal hydroxide, or a metal halide.

General formula (III)

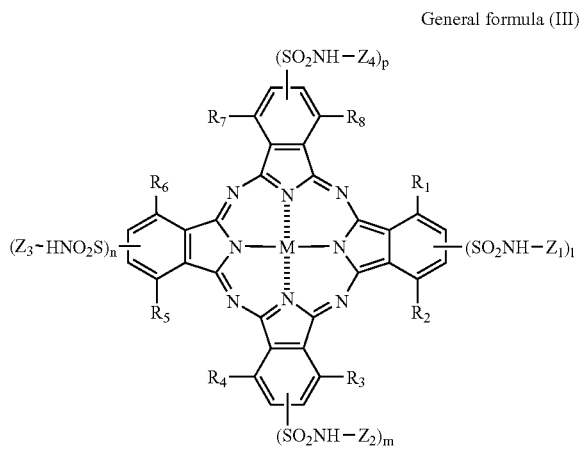

In the general formula (III), $R_1$, $R_2$, $R_3$, $R_4$, $R_5$, $R_6$, $R_7$, and $R_8$ each independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amide group, an arylamino group, an ureido group, a sulfamoylamino group, an alkylthio group, an arylthio group, an alkoxycarbonylamino group, a sulfonamide group, a carbamoyl group, a sulfamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a phosphoryl group, or an acyl group; and each group may be further substituted.

$Z_1$, $Z_2$, $Z_3$, and $Z_4$ each independently represents a substituted or unsubstituted heterocyclic group. At least one of $Z_1$, $Z_2$, $Z_3$, $Z_4$, $R_1$, $R_2$, $R_3$, $R_4$, $R_5$, $R_6$, $R_7$, and $R_8$ has a substituent having 2 or more carbon atoms, and the total sum of carbon atoms of the substituents substituted in $Z_1$, $Z_2$, $Z_3$, $Z_4$, $R_1$, $R_2$, $R_3$, $R_4$, $R_5$, $R_6$, $R_7$, and $R_8$ is 8 or more.

l, m, n, and p each independently represents an integer of 1 or 2.

M represents a hydrogen atom, a metal element, a metal oxide, a metal hydroxide, or a metal halide.

General formula (IV)

In the general formula (IV), $R_1$, $R_2$, $R_3$, $R_4$, $R_5$, $R_6$, $R_7$, and $R_8$ each independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amide group, an arylamino group, an ureido group, a sulfamoylamino group, an alkylthio group, an arylthio group, an alkoxycarbonylamino group, a sulfonamide group, a carbamoyl group, a sulfamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a phosphoryl group, or an acyl group; and each group may be further substituted.

$W_1$, $W_2$, $W_3$, and $W_4$ each independently represents an atomic group necessary for forming a nitrogen-containing heterocyclic ring or a condensed ring of the heterocyclic ring with other ring. However, at least one heterocyclic ring formed from $W_1$, $W_2$, $W_3$, and $W_4$ has a substituent having 2 or more carbon atoms, and the total sum of carbon atoms of the substituents further substituted in the groups represented by $W_1$, $W_2$, $W_3$, and $W_4$ is 8 or more.

l, m, n, and p each independently represents an integer of 1 or 2.

M represents a hydrogen atom, a metal element, a metal oxide, a metal hydroxide, or a metal halide.

(2) The ink as set forth in (1) as above, wherein the compounds represented by the foregoing general formulae (I) (II), (III) and (IV) are compounds represented by the following general formulae (V), (VI), (VII) and (VIII), respectively.

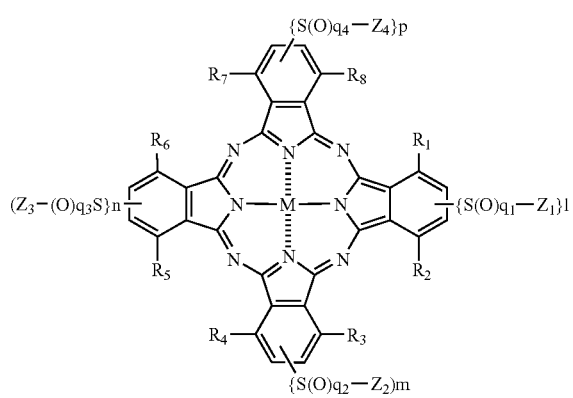

General formula (V)

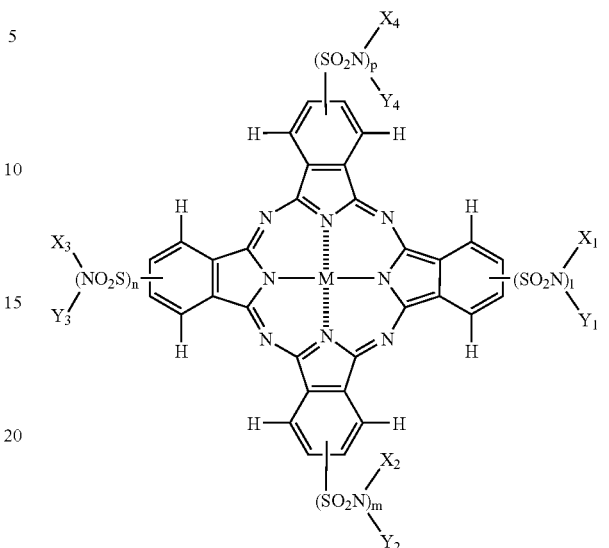

General formula (VI)

In the general formula (V), $R_1$, $R_2$, $R_3$, $R_4$, $R_5$, $R_6$, $R_7$, and $R_8$ each independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amide group, an arylamino group, an ureido group, a sulfamoylamino group, an alkylthio group, an arylthio group, an alkoxycarbonylamino group, a sulfonamide group, a carbamoyl group, a sulfamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a phosphoryl group, or an acyl group. These groups may be further substituted.

$Z_1$, $Z_2$, $Z_3$, and $Z_4$ each independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group.

However, at least one of $Z_1$, $Z_2$, $Z_3$, $Z_4$, $R_1$, $R_2$, $R_3$, $R_4$, $R_5$, $R_6$, $R_7$, and Re represents a substituent having 2 or more carbon atoms, and the total sum of carbon atoms of the substituents represented by $Z_1$, $Z_2$, $Z_3$, $Z_4$, $R_1$, $R_2$, $R_3$, $R_4$, $R_5$, $R_6$, $R_7$, and $R_8$ is 8 or more.

l, m, n, p, $q_1$, $q_1$, $q_3$, and $q_4$ each independently represents an integer of 1 or 2.

M is synonymous with M in the general formula (I).

In the general formula (VI), $X_1$, $X_2$, $X_3$, and $X_4$ each independently represents a hydrogen atom, a substituted or unsubstituted alkyl group, a substituted or unsubstituted aryl group, a substituted or unsubstituted cycloalkyl group, a substituted or unsubstituted alkenyl group, a substituted or unsubstituted aralkyl group, or a substituted or unsubstituted heterocyclic group.

$Y_1$, $Y_2$, $Y_3$, and $Y_4$ each independently represents a substituted or unsubstituted alkyl group or aryl group.

However, at least one of $X_1$, $X_2$, $X_3$, $X_4$, $Y_1$, $Y_2$, $Y_3$, and $Y_4$ represents a substituent having 2 or more carbon atoms, and the total sum of carbon atoms of the substituents represented by $X_1$, $X_2$, $X_3$, $X_4$, $Y_1$, $Y_2$, $Y_3$, and $Y_4$ is 8 or more.

M is synonymous with M in the general formula (I).

l, m, n, and p each independently represents an integer of 1 or 2.

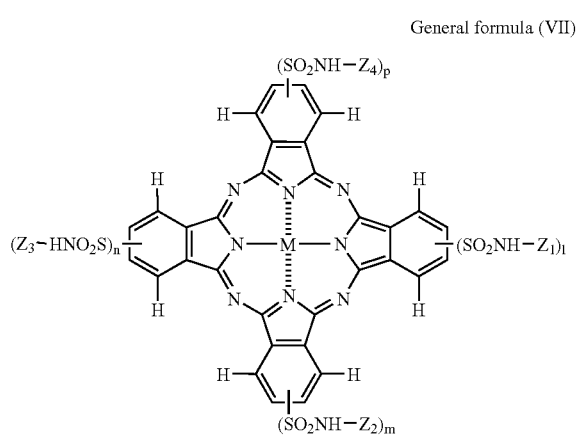

General formula (VII)

In the general formula (VII), $Z_1$, $Z_2$, $Z_3$, and $Z_4$ each independently represents a substituted or unsubstituted heterocyclic group. At least one of $Z_1$, $Z_2$, $Z_3$, and $Z_4$ has a substituent having 2 or more carbon atoms, and the total sum of carbon atoms of the substituents substituted in $Z_1$, $Z_2$, $Z_3$, and $Z_4$ is 8 or more.

M is synonymous with M in the general formula (III). l, m, n, and p each independently represents an integer of 1 or 2.

General formula (VIII)

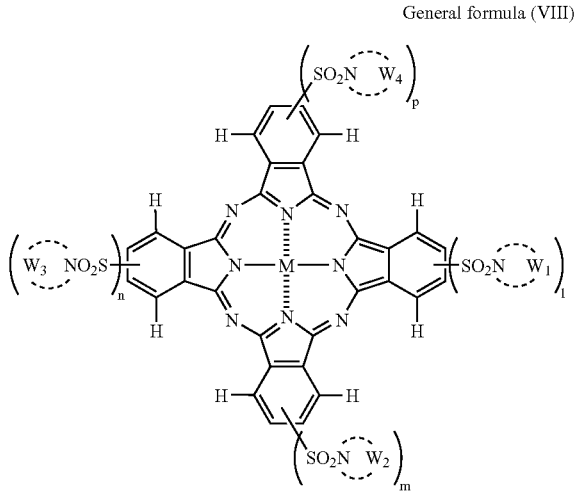

In the general formula (VIII), $W_1$, $W_2$, $W_3$, $W_4$, l, m, n, p, and M are respectively synonymous with $W_1$, $W_2$, $W_3$, $W_4$, l, m, n, p, and M in the general formula (IV).

(3) The ink as set forth in (1) as above, wherein the compounds represented by the foregoing general formulae (I) (II), (III) and (IV) are compounds represented by the following general formulae (IX), (X), (VI) and (XII), respectively.

General formula (IX)

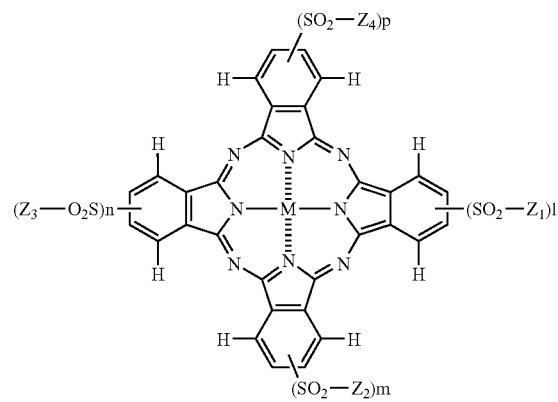

In the general formula (IX), $Z_1$, $Z_2$, $Z_3$, and $Z_4$ each independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group. However, at least one of $Z_1$, $Z_2$, $Z_3$, and $Z_4$ represents a substituent having 2 or more carbon atoms, and the total sum of carbon atoms of the substituents represented by $Z_1$, $Z_2$, $Z_3$, and $Z_4$ is 8 or more per molecule of the phthalocyanine compound. l, m, n, p, and M are synonymous with those in the case of the general formula (V).

General formula (X)

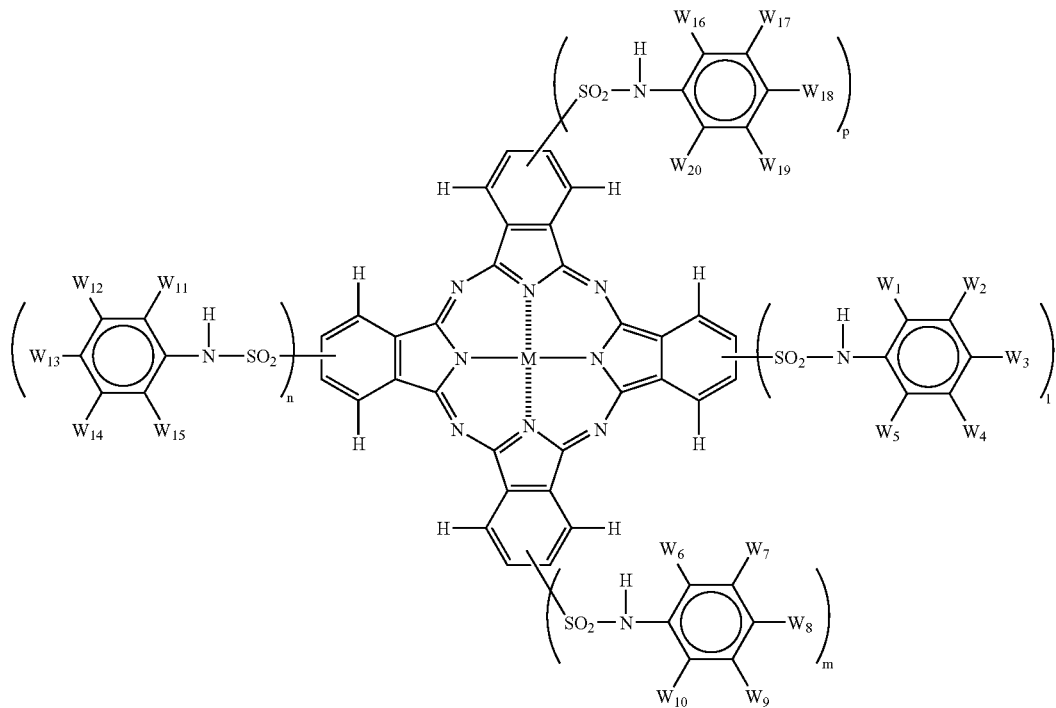

In the general formula (X), $W_1$ to $W_{20}$ each independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amide group, an arylamino group, an ureido group, a sulfamoylamino group, an alkylthio group, an arylthio group, an alkoxycarbonylamino group, a sulfonamide group, a carbamoyl group, a sulfamoyl group, a sulfonyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a sulfinyl group, a phosphoryl group, or an acyl group; and each group may be further substituted.

However, with respect to each of $W_1$ to $W_5$, $W_6$ to $W_{10}$, $W_{11}$ to $W_{15}$, and $W_{16}$ to $W_{20}$, either one of them is a substituent having 2 or more carbon atoms, and the total sum of carbon atoms of the substituents represented by $W_1$ to $W_{20}$ is 8 or more.

M, l, m, n, and p are synonymous with M, l, m, n, and p in the foregoing general formula (VI).

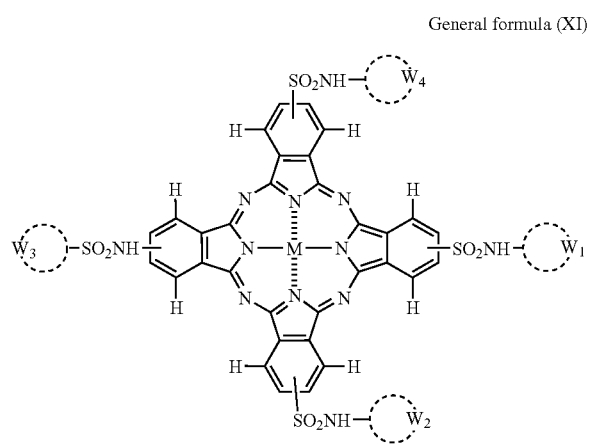

General formula (XI)

In the general formula (XI), $W_1$, $W_2$, $W_3$, and $W_4$ each independently represents an atomic group necessary for forming a 5- to 6-membered nitrogen-containing hetero ring or a condensed ring of the hetero ring with other ring. However, in the case where $W_1$, $W_2$, $W_3$, and/or $W_4$ is an atomic group for forming a 6-membered nitrogen-containing heterocyclic ring or a condensed ring of the heterocyclic ring with other ring, the number of nitrogen atoms constituting the 6-membered hetero ring or the condensed ring is 1 or 2. At least one of the 5- to 6-membered hetero rings or the condensed rings of the hetero ring with other ring, as formed from the atomic group of $W_1$, $W_2$, $W_3$, and $W_4$, has a substituent having 2 or more carbon atoms, and the total sum of carbon atoms of the substituents substituted in $W_1$, $W_2$, $W_3$, and $W_4$ is 8 or more.

M is synonymous with M in the general formula (VII).

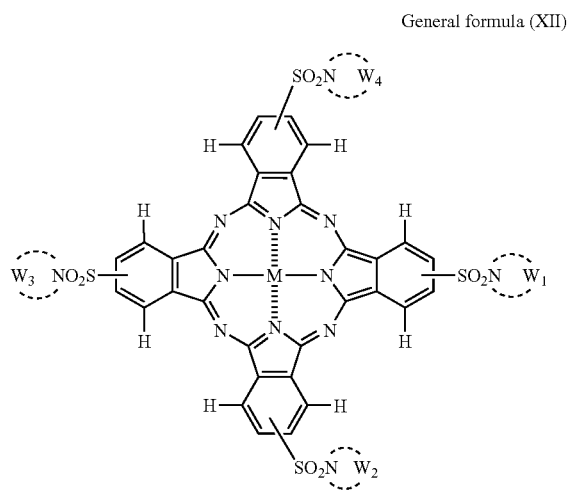

General formula (XII)

In the general formula (XII), $W_1$, $W_2$, $W_3$, and $W_4$ each independently represents an atomic group necessary for forming a 5- to 6-membered nitrogen-containing hetero ring or a condensed ring of the hetero ring with other ring. However, at least one of the hetero rings or the condensed rings of the hetero ring with other ring, as formed from $W_1$, $W_2$, $W_3$, and $W_4$, has a substituent having 2 or more carbon atoms, and the total sum of carbon atoms of the substituents further substituted in the groups represented by $W_1$, $W_2$, $W_3$, and $W_4$ is 8 or more.

M is synonymous with M in the foregoing general formula (I).

(4) The ink as set forth in any of (1) to (3) as above, wherein the compounds represented by the foregoing (I) to (XII) is contained in an amount of 0.2 parts by weight or more and 10 parts by weight or less in 100 parts by weight of the ink.

(5) The ink as set forth in any of (1) to (4) as above, which is an ink for inkjet recording.

(6) An inkjet recording method, which comprises forming images on an image-receiving material having an ink-receiving layer containing white inorganic pigment particles on a support by using the ink for inkjet recording as set forth in (5) as above.

(7) A method of improving ozone gas resistance by forming images using the ink for inkjet recording as set forth in (5) as above, thereby improving an ozone gas resistance of a colored image material.

(8) A phthalocyanine compound, which is represented by any of the foregoing general formulae (IX), (X) and (XI).

(9) The phthalocyanine compound as set forth in (8) as above, wherein in the foregoing general formula (IX), $Z_1$, $Z_2$, $Z_3$, and $Z_4$ are each represented by -$A_1$-$L_1$-$A_2$-Q, wherein $A_1$ and $A_2$ each represents a substituted or unsubstituted alkylene group; $L_1$ represents a divalent connecting group; and Q represents an alkoxy group.

(10) The phthalocyanine compound as set forth in (9) as above, wherein in the foregoing general formula (IX), $L_1$ is —$SO_2NH$—, —COO—, —CONH—, —$NHSO_2$—, —NHCO—, —$SO_2$—, or —O—.

BEST MODE FOR CARRYING OUT THE INVENTION

The invention will be described hereunder in detail.

[Phthalocyanine Compound]

First of all, the phthalocyanine compound represented by the general formula (I) of the invention will be described in detail. Incidentally, since the phthalocyanine compound is oil-soluble, it does not have an ionic hydrophilic group within the molecule thereof.

General formula (I)

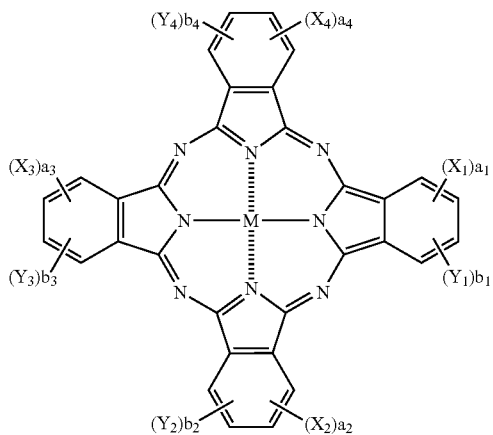

In the general formula (I), $Y_1$, $Y_2$, $Y_3$, and $Y_4$ each independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amide group, an arylamino group, an ureido group, a sulfamoylamino group, an alkylthio group, an arylthio group, an alkoxycarbonylamino group, a sulfonamide group, a carbamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a phosphoryl group, or an acyl group; and each group may be further substituted.

Of these, a hydrogen atom, a halogen atom, an alkyl group, an aryl group, a cyano group, an alkoxy group, an amide group, a ureido group, a sulfonamide group, a carbamoyl group, an sulfamoyl group, and an alkoxycarbonyl group are preferable; a hydrogen atom, a halogen atom, and a cyano group are particularly preferable; and a hydrogen atom is most preferable.

$X_1$, $X_2$, $X_3$, and $X_4$ each independently represents —SO—Z and/or —SO$_2$—Z, and preferably —SO$_2$—Z.

Zs each independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group; particularly preferably a substituted or unsubstituted alkyl group, a substituted or unsubstituted aryl group, or a substituted or unsubstituted heterocyclic group; and most preferably a substituted alkyl group, a substituted aryl group, or a substituted heterocyclic group.

At least one of $X_1$, $X_2$, $X_3$, $X_4$, $Y_1$, $Y_2$, $Y_3$, and $Y_4$ represents a substituent having 2 or more carbon atoms, and the total sum of carbon atoms of the substituents represented by $X_1$, $X_2$, $X_3$, $X_4$, $Y_1$, $Y_2$, $Y_3$, and $Y_4$ is 8 or more.

In the above, it is preferred that at least one of $X_1$, $X_2$, $X_3$, $X_4$, $Y_1$, $Y_2$, $Y_3$, and $Y_4$ represents a substituent having 3 or more carbon atoms, and the total sum of carbon atoms of the substituents represented by $X_1$, $X_2$, $X_3$, $X_4$, $Y_1$, $Y_2$, $Y_3$, and $Y_4$ is 8 or more. It is particularly preferred that $X_1$, $X_2$, $X_3$, and $X_4$ represent a substituent having 2 or more carbon atoms, and the total sum of carbon atoms of the substituents represented by $X_1$, $X_2$, $X_3$, $X_4$, $Y_1$, $Y_2$, $Y_3$, and $Y_4$ is 8 or more. It is most preferred that $X_1$, $X_2$, $X_3$, and $X_4$ represent a substituent having 2 or more carbon atoms, and the total sum of carbon atoms of the substituents represented by $X_1$, $X_2$, $X_3$, $X_4$, $Y_1$, $Y_2$, $Y_3$, and $Y_4$ is 10 or more.

In the case where $Y_1$, $Y_2$, $Y_3$, $Y_4$, and Z may be further substituted, the following substituents are enumerated.

Examples include a halogen atom (such as a chlorine atom and a bromine atom); a linear or branched alkyl group having from 1 to 12 carbon atoms, an aralkyl group having from 7 to 18 carbon atoms, an alkenyl group having from 2 to 12 carbon atoms, a linear or branched alkynyl group having from 2 to 12 carbon atoms, and a cycloalkyl or cycloalkenyl group having from 3 to 12 carbon atoms, which may have a side chain (specific examples of these groups include methyl, ethyl, propyl, isopropyl, t-butyl, 2-methanesulfonylethyl, 3-phenoxypropyl, trifluoromethyl, and cyclopentyl groups); an aryl group (such as phenyl, 4-t-butylphenyl, and 2,4-di-t-amylphenyl groups); a heterocyclic group (such as imidazolyl, pyrazolyl, triazolyl, 2-furyl, 2-thienyl, 2-pyrimidinyl, and 2-benzothiazolyl groups); a cyano group; a hydroxyl group; a nitro group; a carboxy group; an amino group; an alkyloxy group (such as methoxy, ethoxy, 2-methoxyethoxy, and 2-methanesulfonylethoxy groups); an aryloxy group (such as phenoxy, 2-methylphenoxy, 4-t-butylphenoxy, 3-nitrophenoxy, and 3-t-butyloxycarbamoylphenoxy groups); an acylamino group (such as acetamide, benzamide, and 4-(3-t-butyl-4-hydroxyphenoxy)butanamide groups); an alkylamino group (such as methylamino, butylamino, diethylamino, and methylbutylamino groups); an anilino group (such as phenylamino and 2-chloroanilino groups); a ureido group (such as phenylureido, methylureido, and N,N-dibutylureido groups); a sulfamoylamino group (such as an N,N-dipropylsulfamoylamino group); an alkylthio group (such as methylthio, octylthio, and 2-phenoxyethylthio); an arylthio group (such as phenylthio, 2-butoxy-5-t-octylphenylthio, and 2-carboxyphenylthio); an alkyloxycarbonylamino group (such as methoxycarbonylamino); a sulfonamide group (such as methanesulfonamide, benzenesulfonamide, p-toluenesulfonamide, and octadecaneamide groups); a carbamoyl group (N-ethylcarbamoyl and N,N-dibutylcarbamoyl groups); a sulfamoyl group (such as N-ethylsulfamoyl, N,N-dipropylsulfamoyl, and N,N-diethylsulfamoyl groups); a sulfonyl group (such as methanesulfonyl, octanesulfonyl, benzenesulfonyl, and toluenesulfonyl groups); an alkyloxycarbonyl group (such as methoxycarbonyl and butyloxycarbonyl groups); a heterocyclic oxy group (such as 1-phenyltetrazole-5-oxy and 2-tetrahydropyranyloxy groups); an azo group (such as phenylazo, 4-methoxyphenylazo, 4-pivaloylaminophenylazo, and 2-hydroxy-4-propanoylphenylazo groups); an acyloxy group (such as an acetoxy group); a carbamoyloxy group (such as N-methylcarbamoyloxy and N-phenylcarbamoyloxy groups); a silyloxy group (such as trimethylsilyloxy and dibutylmethylsilyloxy groups); an aryloxycarbonylamino group (such as phenoxycarbonylamino); an imide group (such as N-succinimde and N-phthalimide groups); a heterocyclic thio group (such as 2-benzothiazolylthio, 2,4-di-phenoxy-1,3,5-triazole-6-thio, and 2-pyridylthio groups); a sulfinyl group (such as a 3-phenoxypropylsulfinyl group); a phosphoryl group (such as phenoxyphosphoryl, octyloxyphosphoryl, and phenylphosphoryl groups); an aryloxycarbonyl group (such as a phenoxycarbonyl group); and an acyl group (such as acetyl, 3-phenylpropanoyl, and benzoyl groups).

a1 to a4, and b1 to b4 each represents a number of the substituents of $X_1$ to $X_4$, and $Y_1$ to $Y_4$; a1 to a4 each independently represents an integer of from 0 to 4. b1 to b4 each independently represents an integer of from 0 to 4. However, all of a1 to a4 are never 0 at the same time. a1 to a4 are each preferably 1 or 2, and particularly preferably 1.

a1 and b1 each independently represents an integer of from 0 to 4 so as to meet a relation of (a1+b1)=4, in which a combination where a1 represents 1 or 2, and b1 represents 3 or 2 is particularly preferred, and a combination where a1 represents 1, and b1 represents 3 is most preferred.

a2 and b2 each independently represents an integer of from 0 to 4 so as to meet a relation of (a2+b4)=4, in which a combination where a2 represents 1 or 2, and b2 represents 3 or 2 is particularly preferred, and a combination where a2 represents 1, and b2 represents 3 is most preferred.

a3 and b3 each independently represents an integer of from 0 to 4 so as to meet a relation of (a3+b3)=4, in which a combination where a3 represents 1 or 2, and b3 represents 3 or 2 is particularly preferred, and a combination where a3 represents 1, and b3 represents 3 is most preferred.

a4 and b4 each independently represents an integer of from 0 to 4 so as to meet a relation of (a4+b4)=4, in which a combination where a4 represents 1 or 2, and b4 represents 3 or 2 is particularly preferred, and a combination where a4 represents 1, and b4 represents 3 is most preferred.

M represents a hydrogen atom, a metal element, or an oxide, a hydroxide or a halide thereof. Preferred examples of M include a hydrogen atom and metal elements such as Li, Na, K, Mg, Ti, Zr, V, Nb, Ta, Cr, Mo, W, Mn, Fe, Co, Ni, Ru, Rh, Pd, Os, Ir, Pt, Cu, Ag, Au, Zn, Cd, Hg, Al, Ga, In, Si, Ge, Sn, Pb, Sb, and Bi. Examples of the oxide include VO and GeO. Further, examples of the hydroxide include $Si(OH)_2$, $Cr(OH)_2$, and $Sn(OH)_2$. Moreover, examples of the halide include AlCl, $SiCl_2$, VCl, $VCl_2$, VOCl, FeCl, GaCl, and ZrCl. Of these are particularly preferable Cu, Ni, Zn, and Al, with Cu being most preferable.

In addition, Pc (phthalocyanine ring) may form a dimer (such as Pc-M-L-M-Pc) or a trimer via L (divalent connecting group). At that time, Ms may be the same or different.

Preferred examples of the divalent connecting group represented by L include an oxy group (—O—), a thio group (—S—), a carbonyl group (—CO—), a sulfonyl group (—SO$_2$—), an imino group (—NH—), a methylene group (—CH$_2$—), and a combination thereof.

Examples of the halogen atom represented by $Y_1$, $Y_2$, $Y_3$, and $Y_4$ include a fluorine atom, a chlorine atom, and a bromine atom.

The alkyl group represented by $Y_1$, $Y_2$, $Y_3$, and $Y_4$ includes an alkyl group having a substituent and an unsubstituted alkyl group. As the alkyl group is preferable an alkyl group having from 1 to 12 carbon atoms. Examples of the substituent include a hydroxyl group, an alkoxy group, a cyano group, and a halogen atom. Examples of the alkyl group include methyl, ethyl, butyl, isopropyl, t-butyl, hydroxyethyl, methoxyethyl, cyanoethyl, trifluoromethyl, 3-sulfopropyl, and 4-sulfobutyl.

The cycloalkyl group represented by $Y_1$, $Y_2$, $Y_3$, and $Y_4$ includes a cycloalkyl group having a substituent and an unsubstituted cycloalkyl group. As the cycloalkyl group is preferable a cycloalkyl group having from 5 to 12 carbon atoms. Examples of the cycloalkyl group include a cyclohexyl group.

The alkenyl group represented by $Y_1$, $Y_2$, $Y_3$, and $Y_4$ includes an alkenyl group having a substituent and an unsubstituted alkenyl group. As the alkenyl group is preferable an alkenyl group having from 2 to 12 carbon atoms. Examples of the alkenyl group include a vinyl group and an allyl group.

The aralkyl group represented by $Y_1$, $Y_2$, $Y_3$, and $Y_4$ includes an aralkyl group having a substituent and an unsubstituted aralkyl group. As the aralkyl group is preferable an aralkyl group having from 7 to 12 carbon atoms. Examples of the aralkyl group include a benzyl group and a 2-phenethyl group.

The aryl group represented by $Y_1$, $Y_2$, $Y_3$, and $Y_4$ includes an aryl group having a substituent and an unsubstituted aryl group. As the aryl group is preferable an aryl group having from 6 to 12 carbon atoms. Examples of the substituent include an alkyl group, an alkoxy group, a halogen atom, and an alkylamino group. Examples of the aryl group include phenyl, p-tolyl, p-methoxyphenyl, o-chlorophenyl, and m-(3-sulfopropylamino)phenyl groups.

The heterocyclic group represented by $Y_1$, $Y_2$, $Y_3$, and $Y_4$ includes a heterocyclic group having a substituent and an unsubstituted heterocyclic group. As the heterocyclic group is preferable a 5- or 6-membered heterocyclic group. Examples of the heterocyclic group include a 2-pyridyl group, a 2-thienyl group, and a 2-furyl group.

The alkylamino group represented by $Y_1$, $Y_2$, $Y_3$, and $Y_4$ includes an alkylamino group having a substituent and an unsubstituted alkylamino group. As the alkylamino group is preferable an alkylamino group having from 1 to 6 carbon atoms. Examples of the alkylamino group include a methylamino group and a diethylamino group.

The alkoxy group represented by $Y_1$, $Y_2$, $Y_3$, and $Y_4$ includes an alkoxy group having a substituent and an unsubstituted alkoxy group. As the alkoxy group is preferable an alkoxy group having from 1 to 12 carbon atoms. Examples of the substituent include an alkoxy group and a hydroxyl group. Examples of the alkoxy group include a methoxy group, an ethoxy group, an isopropoxy group, a methoxyethoxy group, a hydroxyethoxy group, and a 3-carboxypropoxy group.

The aryloxy group represented by $Y_1$, $Y_2$, $Y_3$, and $Y_4$ includes an aryloxy group having a substituent and an unsubstituted aryloxy group. As the aryloxy group is preferable an aryloxy group having from 6 to 12 carbon atoms. Examples of the substituent include an alkoxy group. Examples of the aryloxy group include a phenoxy group, a p-methoxyphenoxy group, and an o-methoxyphenoxy group.

The amide group represented by $Y_1$, $Y_2$, $Y_3$, and $Y_4$ includes an amide group having a substituent and an unsubstituted amide group. As the amide group is preferable an amide group having from 2 to 12 carbon atoms. Examples of the amide group include an acetamide group, a propionamide group, a benzamide group, and a 3,5-disulfobenzamide group.

The arylamino group represented by $Y_1$, $Y_2$, $Y_3$, and $Y_4$ includes an arylamino group having a substituent and an unsubstituted arylamino group. As the arylamino group is preferable an arylamino group having from 6 to 12 carbon atoms. Examples of the substituent include a halogen atom. Examples of the arylamino group include an alinino group and a 2-chloroanilino group.

The ureido group represented by $Y_1$, $Y_2$, $Y_3$, and $Y_4$ includes a ureido group having a substituent and an unsubstituted ureido group. As the ureido group is preferable a ureido group having from 1 to 12 carbon atoms. Examples of the substituent include an alkyl group and an aryl group. Examples of the ureido group include a 3-methylureido group, a 3,3-dimethylureido group, and a 3-phenylureido group.

The sulfamoyl group represented by $Y_1$, $Y_2$, $Y_3$, and $Y_4$ includes a sulfamoyl group having a substituent and an unsubstituted sulfamoyl group. Examples of the substituent include an alkyl group. Examples of the sulfamoyl group include an N,N-dipropylsulfamoylamino group.

The alkylthio group represented by $Y_1$, $Y_2$, $Y_3$, and $Y_4$ includes an alkylthio group having a substituent and an unsubstituted alkylthio group. As the alkylthio group is preferable an alkylthio group having from 1 to 12 carbon atoms. Examples of the alkylthio group include a methylthio group and an ethylthio group.

The arylthio group represented by $Y_1$, $Y_2$, $Y_3$, and $Y_4$ includes an arylthio group having a substituent and an unsubstituted arylthio group. As the arylthio group is preferable an arylthio group having from 6 to 12 carbon atoms. Examples of the substituent include an alkyl group. Examples of the arylthio group include a phenylthio group and a p-tolylthio group.

The alkoxycarbonylamino group represented by $Y_1$, $Y_2$, $Y_3$, and $Y_4$ includes an alkoxycarbonylamino group having a substituent and an unsubstituted alkoxycarbonylamino group. As the alkoxycarbonylamino group is preferable an alkoxycarbonylamino group having from 2 to 12 carbon atoms. Examples of the alkoxycarbonylamino group include an ethoxycarbonylamino group.

The sulfonamide group represented by $Y_1$, $Y_2$, $Y_3$, and $Y_4$ includes a sulfonamide group having a substituent and an unsubstituted sulfonamide group. As the sulfonamide group is preferable a sulfonamide group having from 1 to 12 carbon atoms. Examples of the sulfonamide group include methanesulfonamide, benzenesulfonamide, and 3-carboxybenzenesulfonamide.

The carbamoyl group represented by $Y_1$, $Y_2$, $Y_3$, and $Y_4$ includes a carbamoyl group having a substituent and an unsubstituted carbamoyl group. Examples of the substituent include an alkyl group. Examples of the carbamoyl group include a methylcarbamoyl group and a dimethylcarbamoyl group.

The sulfamoyl group represented by $Y_1$, $Y_2$, $Y_3$, and $Y_4$ includes a sulfamoyl group having a substituent and an unsubstituted sulfamoyl group. Examples of the substituent include an alkyl group and an aryl group. Examples of the sulfamoyl group include a dimethylsulfamoyl group, a di-(2-hydroxyethyl)sulfamoyl group, and a phenylsulfamoyl group.

The alkoxycarbonyl group represented by $Y_1$, $Y_2$, $Y_3$, and $Y_4$ includes an alkoxycarbonyl group having a substituent and an unsubstituted alkoxycarbonyl group. As the alkoxycarbonyl group is preferable an alkoxycarbonyl group having from 2 to 12 carbon atoms. Examples of the alkoxycarbonyl group include a methoxycarbonyl group and an ethoxycarbonyl group.

The heterocyclic oxy group represented by $Y_1$, $Y_2$, $Y_3$, and $Y_4$ includes a heterocyclic oxy group having a substituent and an unsubstituted heterocyclic oxy group. As the heterocyclic oxy group is preferable a heterocyclic oxy group containing a 5- or 6-membered heterocyclic ring. Examples of the substituent include a hydroxyl group. Examples of the heterocyclic oxy group include a 2-tetrahydropyranyloxy group.

The azo group represented by $Y_1$, $Y_2$, $Y_3$, and $Y_4$ includes an azo group having a substituent and an unsubstituted azo group. Examples of the azo group include a p-nitrophenylazo group.

The acyloxy group represented by $Y_1$, $Y_2$, $Y_3$, and $Y_4$ includes an acyloxy group having a substituent and an unsubstituted acyloxy group. As the acyloxy group is preferable an acyloxy group having from 1 to 12 carbon atoms. Examples of the acyloxy group include an acetoxy group and a benzoyloxy group.

The carbamoyloxy group represented by $Y_1$, $Y_2$, $Y_3$, and $Y_4$ includes a carbamoyloxy group having a substituent and an unsubstituted carbamoyloxy group. Examples of the substituent include an alkyl group. Examples of the carbamoyloxy group include an N-methylcarbamoyloxy group.

The silyloxy group represented by $Y_1$, $Y_2$, $Y_3$, and $Y_4$ includes a silyloxy group having a substituent and an unsubstituted silyloxy group. Examples of the substituent include an alkyl group. Examples of the silyloxy group include a trimethylsilyloxy group.

The aryloxycarbonyl group represented by $Y_1$, $Y_2$, $Y_3$, and $Y_4$ includes an aryloxycarbonyl group having a substituent and an unsubstituted aryloxycarbonyl group. As the aryloxycarbonyl group is preferable an aryloxycarbonyl group having from 7 to 12 carbon atoms. Examples of the aryloxycarbonyl group include a phenoxycarbonyl group.

The aryloxycarbonylamino group represented by $Y_1$, $Y_2$, $Y_3$, and $Y_4$ includes an aryloxycarbonylamino group having a substituent and an unsubstituted aryloxycarbonylamino group. As the aryloxycarbonylamino group is preferable an aryloxycarbonylamino group having from 7 to 12 carbon atoms. Examples of the aryloxycarbonylamino group include a phenoxycarbonylamino group.

The imide group represented by $Y_1$, $Y_2$, $Y_3$, and $Y_4$ includes an imide group having a substituent and an unsubstituted imide group. Examples of the imide group include an N-phthalimide group and an N-succinimide group.

The heterocyclic thio group represented by $Y_1$, $Y_2$, $Y_3$, and $Y_4$ includes a heterocyclic thio group having a substituent and an unsubstituted heterocyclic thio group. As the heterocyclic thio group is preferable a 5- or 6-membered heterocyclic thio group. Examples of the heterocyclic thio group include a 2-pyridylthio group.

The phosphoryl group represented by $Y_1$, $Y_2$, $Y_3$, and $Y_4$ includes a phosphoryl group having a substituent and an unsubstituted phosphoryl group. Examples of the phosphoryl group include a phenoxyphosphoryl group and a phenylphosphoryl group.

The acyl group represented by $Y_1$, $Y_2$, $Y_3$, and $Y_4$ includes an acyl group having a substituent and an unsubstituted acyl group. As the acyl group is preferable an acyl group having from 1 to 12 carbon atoms. Examples of the acyl group include an acetyl group and a benzoyl group.

The alkyl group represented by Z includes an alkyl group having a substituent and an unsubstituted alkyl group. As the alkyl group is preferable an alkyl group having from 1 to 12 carbon atoms. Examples of the substituent include a hydroxyl group, an alkoxy group, a cyano group, and a halogen atom. Examples of the alkyl group include methyl, ethyl, butyl, isopropyl, t-butyl, hydroxyethyl, methoxyethyl, cyanoethyl, trifluoromethyl, 3-sulfopropyl, and 4-sulfobutyl groups.

The cycloalkyl group represented by Z includes a cycloalkyl group having a substituent and an unsubstituted cycloalkyl group. As the cycloalkyl group is preferable a cycloalkyl group having from 5 to 12 carbon atoms. Examples of the cycloalkyl group include a cyclohexyl group.

The alkenyl group represented by Z includes an alkenyl group having a substituent and an unsubstituted alkenyl group. As the alkenyl group is preferable an alkenyl group having from 2 to 12 carbon atoms. Examples of the alkenyl group include a vinyl group and an allyl group.

The aralkyl group represented by Z includes an aralkyl group having a substituent and an unsubstituted aralkyl group. As the aralkyl group is preferable an aralkyl group having from 7 to 12 carbon atoms. Examples of the aralkyl group include a benzyl group and a 2-phenethyl group.

The aryl group represented by Z includes an aryl group having a substituent and an unsubstituted aryl group. As the aryl group is preferable an aryl group having from 6 to 12 carbon atoms. Examples of the aryl group include phenyl, p-tolyl, p-methoxyphenyl, o-chlorophenyl, and m-(3-sulfopropylamino)phenyl groups. Examples of the substituent include an alkyl group, an alkoxy group, a halogen atom, and an alkylamino group.

The heterocyclic group represented by Z includes a heterocyclic group having a substituent and an unsubstituted heterocyclic group and may further form a condensed ring with other ring. As the heterocyclic group is preferable a 5- or 6-membered heterocyclic group (which may further form a condensed ring with other ring). Examples of the heterocyclic group, which are not limited as to the substitution position of the hetero ring, include imidazole, benzoimidazole, pyrazole, benzopyrazole, triazole, thiazole, benzothiazole, isothiazole, benzoisothiazole, oxazole, benzoxazole, thiadiazole, pyrrole, benzopyrrole, indole, isoxazole, benzisoxazole, thiophene, benzothiophene, furan, benzofuran, pyridine, quinoline, isoquinoline, pyridazine, pyrimidine, pyrazine, cinnoline, phthalazine, quinazoline, quinoxaline, and triazine groups. Examples of the substituent include an alkyl group, an alkoxy group, an alkylamino group, a carbamoyl group, a sulfamoyl group, a sulfoamino group, and a halogen atom.

As the combination as the phthalocyanine compound represented by the foregoing general formula (I) is particularly preferable a combination where $X_1$, $X_2$, $X_3$, and $X_4$ each independently represents —SO—Z and/or —SO$_2$—Z, and particularly preferably —SO$_2$—Z.

Zs in the above-described preferred combination of the substituents of the phthalocyanine compound of the general formula (I) each independently represents a substituted alkyl group, a substituted aryl group, or a substituted heterocyclic group, particularly preferably a substituted alkyl group or a substituted heterocyclic group, and most preferably a substituted alkyl group.

$Y_1$, $Y_2$, $Y_3$, and $Y_4$ in the above-described preferred combination each independently represents a hydrogen atom, a halogen atom, a cyano group, or a sulfonyl group, particularly preferably a hydrogen atom, a halogen atom, or a sulfonyl group, and most preferably a hydrogen atom or a sulfonyl group.

In the above-described preferred combination, it is particularly preferred that $X_1$, $X_2$, $X_3$, and $X_4$ each represents a substituent having 2 or more carbon atoms, and the total sum of carbon atoms of the substituents represented by $X_1$, $X_2$, $X_3$, $X_4$, $Y_1$, $Y_2$, $Y_3$, and $Y_4$ is 8 or more, and most preferred that $X_1$, $X_2$, $X_3$, and $X_4$ each represents a substituent having 2 or more carbon atoms, and the total sum of carbon atoms of the substituents represented by $X_1$, $X_2$, $X_3$, $X_4$, $Y_1$, $Y_2$, $Y_3$, and $Y_4$ is 10 or more.

It is preferred that at least one oleophilic group having 2 or more carbon atoms is present in one molecule of the phthalocyanine compound represented by the general formula (I). Particularly, those having an oleophilic group having 3 or more carbon atoms are preferred, with those in which the total sum of carbon atoms of the oleophilic groups is 10 or more being most preferred.

Since the phthalocyanine compound represented by the general formula (I) is one in which the sum of carbon atoms of the substituents in one molecule of the phthalocyanine compound is 8 or more, the solubility or dispersibility in an oleophilic medium is particularly good.

Incidentally, with respect to the combination of the preferred substituents of the compound represented by the general formula (I), compounds in which at least one of the various substituents is a preferred group as described above are preferred, those in which more of the various substituents are a preferred group as described above are more preferred, and those in which all of the substituents are a preferred group as described above are most preferred.

Of the phthalocyanine compounds represented by the general formula (I) are more preferable phthalocyanine compounds having a structure represented by the following general formula (V). The phthalocyanine compounds represented by the general formula (V) according to the invention will be described below in detail.

General formula (V)

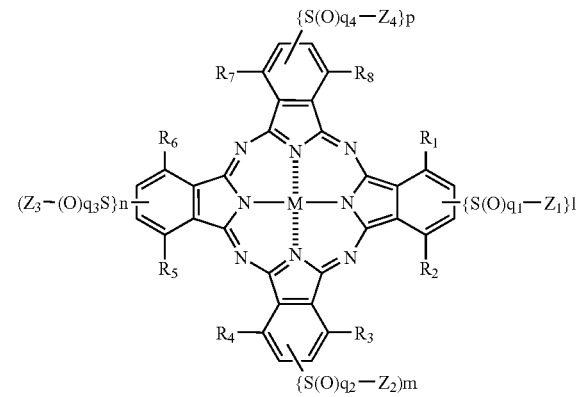

In the general formula (V), $Z_1$, $Z_2$, $Z_3$, and $Z_4$ are each independently synonymous with Z in the foregoing general formula (I), and preferred examples thereof are also the same.

$R_1$, $R_2$, $R_3$, $R_4$, $R_5$, $R_6$, $R_7$, and $R_8$ are each independently synonymous with $Y_1$, $Y_2$, $Y_3$, and $Y_4$ in the foregoing general formula (I), and preferred examples thereof are also the same.

l, m, n, and p each independently represents an integer of 1 or 2 within the range of $4 \leq (l+m+n+p) \leq 8$, and particularly preferably $4 \leq (l+m+n+p) \leq 6$, with the case where they each independently represents 1 (l=m=n=p=1) being most preferred.

$q_1$, $q_2$, $q_3$, and $q_4$ each independently represents an integer of 1 or 2, with the case of $q_1=q_2=q_3=q_4=2$ being preferred.

M is synonymous with M in the foregoing general formula (I), and preferred examples thereof are also the same.

In the phthalocyanine compounds represented by the general formula (V), the following combinations are particularly preferred as the combination of the substituents.

$R_1$, $R_2$, $R_3$, $R_4$, $R_5$, $R_6$, $R_7$, and $R_8$ each independently represents a hydrogen atom, a halogen atom, a cyano group, or a sulfonyl group, particularly a hydrogen atom, a halogen atom, or a sulfonyl group, and most preferably a hydrogen atom or a sulfonyl group; and $Z_1$, $Z_2$, $Z_3$, and $Z_4$ each independently represents a substituted alkyl group, a substituted aryl group, or a substituted heterocyclic group, particularly a substituted alkyl group or a substituted heterocyclic group, and most preferably a substituted alkyl group. As the substituted alkyl group is particularly preferable a group represented by $-A_1-L_1-A_2-Q$, wherein $A_1$ and $A_2$ each independently represents a substituted or unsubstituted alkylene, a substituted or unsubstituted arylene, or a substituted or unsubstituted heterocyclic group, preferably a substituted or unsubstituted alkylene or a substituted or unsubstituted phenylene, and particularly preferably a substituted or unsubstituted alkylene, more specifically, a linear or branched alkylene group having from 1 to 18 carbon atoms, particularly preferably a linear or branched alkylene group having from 1 to 8 carbon atoms, and most preferably a linear or branched alkylene group having from 2 to 6 carbon atoms.

$L_1$ represents a divalent connecting group, preferably oxy (—O—), thio (—S—), carbonyl (—CO—), sulfonyl (—SO$_2$—), imino (—NR—), sulfamoyl (—SO$_2$NR—), carbamoyl (—CONR—), alkoxycarbonyl (—CO$_2$—), acylamino (—NRCO—), or sulfonamide (—NRSO$_2$—), more preferably oxy, sulfamoyl, carbamoyl, or alkoxycarbonyl, and most preferably sulfamoyl or alkoxycarbonyl. Here, R in the formulae representing the specific examples of the connecting group represented by $L_1$ represents a hydrogen atom, an alkyl group, an aryl group, or a heterocyclic group, preferably a hydrogen atom or an alkyl group, and particularly preferably a hydrogen atom.

Q represents a hydrogen atom or a substituent. Preferred examples of the substituent are the same as the examples of the substituent as enumerated for the groups with which $Y_1$, $Y_2$, $Y_3$, $Y_4$, and Z in the foregoing general formula (I) can be substituted. Preferably, the substituent is an alkyloxy group (such as methoxy, ethoxy, 2-methoxyethoxy, 3-isopropyloxy, and 2-methanesulfonylethoxy groups) or an aryloxy group (such as phenoxy, 2-methylphenoxy, 4-t-butylphenoxy, 4-methoxyphenoxy, and 3-t-butyloxycarbamoylphenoxy groups), particularly preferably a linear or branched alkyloxy group having from 1 to 18 carbon atoms, and most preferably a linear or branched alkyloxy group having from 1 to 8 carbon atoms.

l, m, n, and p each independently represents an integer of 1 or 2, with the case where they each independently represents 1 (l=m=n=p=1) being most preferred.

$q_1$, $q_2$, $q_3$, and $q_4$ each independently represents an integer of 1 or 2, with the case of $q_1=q_2=q_3=q_4=2$ being preferred.

M represents a hydrogen atom, a metal element, or an oxide, a hydroxide or a halide thereof, particularly preferably Cu, Ni, Zn, or Al, and most preferably Cu.

It is preferred that at least one of $Z_1$, $Z_2$, $Z_3$, $Z_4$, $R_1$, $R_2$, $R_3$, $R_4$, $R_5$, $R_6$, $R_7$, and $R_8$ represents a substituent having 2 or more carbon atoms, and the total sum of carbon atoms of the substituents represented by $Z_1$, $Z_2$, $Z_3$, $Z_4$, $R_1$, $R_2$, $R_3$, $R_4$, $R_5$, $R_6$, $R_7$, and $R_7$ is 8 or more. It is particularly preferred that at least one of $Z_1$, $Z_2$, $Z_3$, and $Z_4$ represents a substituent having 2 or more carbon atoms, and the total sum of carbon atoms of the substituents represented by $Z_1$, $Z_2$, $Z_3$, $Z_4$, $R_1$, $R_2$, $R_3$, $R_4$, $R_5$, $R_6$, $R_7$, and $R_8$ is 8 or more. It is most preferred that at least one of $Z_1$, $Z_2$, $Z_3$, and $Z_4$ represents a substituent having 2 or more carbon atoms, and the sum of carbon atoms of the substituents represented by $Z_1$, $Z_2$, $Z_3$, $Z_4$, $R_1$, $R_2$, $R_3$, $R_4$, $R_5$, $R_6$, $R_7$, and Re is 10 or more.

Incidentally, with respect to the combination of the preferred substituents of the compound represented by the general formula (V), compounds in which at least one of the various substituents is a preferred group as described above are preferred, those in which more of the various substituents are a preferred group as described above are more preferred, and those in which all of the substituents are a preferred group as described above are most preferred.

Of the phthalocyanine compounds represented by the general formula (V) are more preferable phthalocyanine compounds having a structure represented by the following general formula (IX). The phthalocyanine compounds represented by the general formula (IX) according to the invention will be described below in detail.

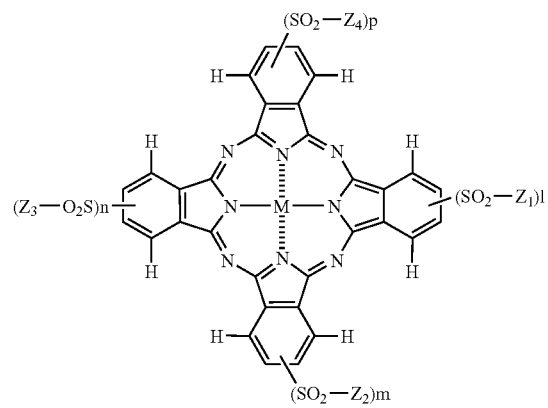

General formula (IX)

In the general formula (IX), $Z_1$, $Z_2$, $Z_3$, $Z_4$, l, m, n, p, and M are each independently synonymous with $Z_1$, $Z_2$, $Z_3$, $Z_4$, l, m, n, p, and M in the foregoing general formula (V), and preferred examples thereof are also the same.

In the phthalocyanine compounds represented by the general formula (IX), the same combinations of the substituents that are particularly preferred in the foregoing general formula (V) are particularly preferred as the combination of the substituents.

It is preferred that at least one of $Z_1$, $Z_2$, $Z_3$, and $Z_4$ represents a substituent having 2 or more carbon atoms, and the total sum of carbon atoms of the substituents represented by $Z_1$, $Z_2$, $Z_3$, and $Z_4$ is 8 or more. It is particularly preferred that at least one of $Z_1$, $Z_2$, $Z_3$, and $Z_4$ represents a substituent having 2 or more carbon atoms, and the total sum of carbon atoms of the substituents represented by $Z_1$, $Z_2$, $Z_3$, and $Z_4$ is 8 or more. It is most preferred that at least one of $Z_1$, $Z_2$, $Z_3$, and $Z_4$ represents a substituent having 2 or more carbon atoms, and the sum of carbon atoms of the substituents represented by $Z_1$, $Z_2$, $Z_3$, and $Z_4$ is 10 or more.

Incidentally, with respect to the combination of the preferred substituents of the compound represented by the general formula (IX), compounds in which at least one of the various substituents is a preferred group as described above are preferred, those in which more of the various substituents are a preferred group as described above are more preferred, and those in which all of the substituents are a preferred group as described above are most preferred.

In general, it is known to use various phthalocyanine derivatives as an ink composition inclusive of one for ink-jet. A phthalocyanine derivative represented by the following general formula (A) may inevitably contain an isomer of substitution position of a substituent $G_n$ (n=1 to 16) (wherein $G_1$ is defined as a substituent at the 1-position, and $G_{16}$ is defined as a substituent at the 16-position; and $G_n$ is used merely for explanation for the sake of convenience, does not mean a substituent having a specific structure represented by the general formula (I) or general formula (V), and may be any of the above-described substituents) during the synthesis. In many cases, these substitution position isomers are considered to be the same derivative without being distinguished from each other. Further, in the case where the substituent of G contains isomers, these isomers are more likely considered to be the same phthalocyanine derivative without being distinguished from each other.

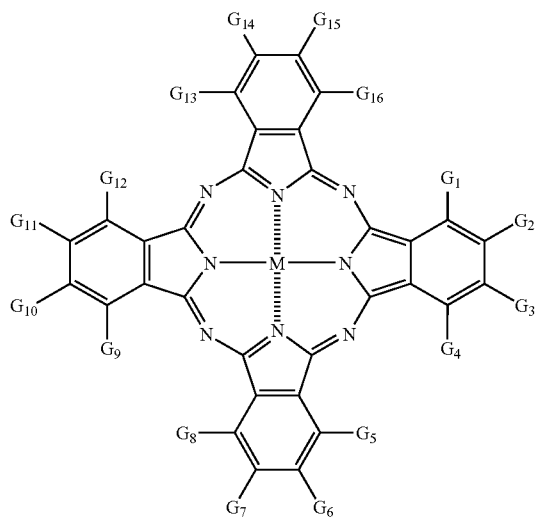

General formula (A)

In the phthalocyanine compounds as defined in this description, when the general formula (II) is taken into account for explanation, the case where the structure is different refers to any one of the case where the species of the constitutional atoms of the substituent Gn (n=1 to 16) is different, the case where the number is different, or the case where the position is different, In the invention, derivatives having a different structure (particularly, as to the substitution position) on the phthalocyanine compounds represented by the general formulae (I), (II), (V) and (IX) are defined in terms of the following three groups.

(1) β-Position substitution type (phthalocyanine compounds having specific substituents at the 2- and/or 3-position, 6- and/or 7-position, 10- and/or 11-position, and 14- and/or 15-position)

(2) α-Position substitution type (phthalocyanine compounds having specific substituents at the 1- and/or 4-position, 5- and/or 8-position, 9- and/or 12-position, and 13- and/or 16-position)

(3) α,β-Positions-mixed substitution type (phthalocyanine compounds in which no regularity at the 1- to 16-positions is present)

In this description, in the case where the derivatives of the phthalocyanine compound having a different structure (particularly, as to the substitution position), the above-described expressions, β-position substitution type, α-position substitution type, and α,β-positions-mixed substitution type are used.

The phthalocyanine derivatives that are used in the invention can be synthesized according to or by referring to, for example, Shirai and Kobayashi, *Phthalocyanine—Chemistry and Function*, pp. 1–62, published by I.P.C., and C. C. Leznoff and A. B. P. Lever, *Phthalocyanines—Properties and Applications*, pp. 1–54, published by VCH, or by combining methods similar thereto.

The phthalocyanine compound represented by the general formula (IX) of the invention is synthesized by, for example, reacting a phthalonitrile derivative represented by the general formula (IXa) and/or a diiminoisoindoline derivative represented by the general formula (IXb) with a metal derivative represented by the general formula (IXc). Incidentally, in the general formula (IXa) and general formula (IXb), t is synonymous with l, m, n, and E in the general formula (IX).

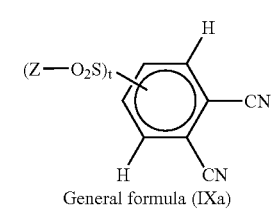

General formula (IXa)

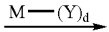 &/or 

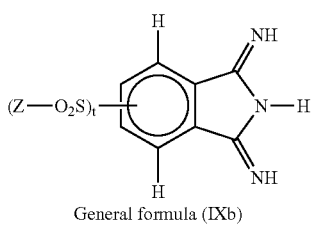

General formula (IXb)

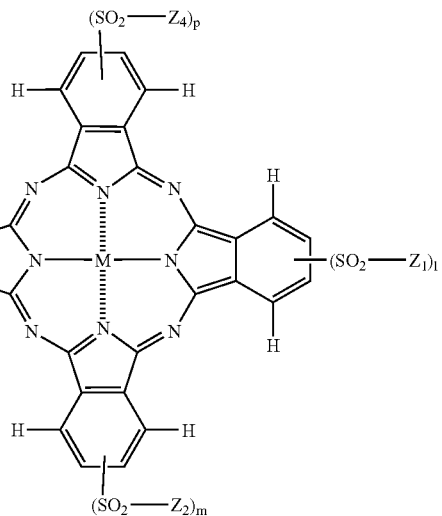

General formula (IX)

In the general formula (IX) and M-(Y)$_d$, M is the same as M in the foregoing general formulae (I), (V) and (IX); Y shows a monovalent or divalent ligand such as a halogen atom, an acetic acid anion, acetylacetonato, and oxygen; and d represents an integer of from 1 to 4.

Examples of the metal derivative represented by M-(Y)$_d$ include halides, carboxylic acid derivatives, sulfates, nitrates, carbonyl compounds, oxides, and complexes of Al, Si, Ti, V, Mn, Fe, Co, Ni, Cu, Zn, Ge, Ru, Rh, Pd, In, Sn, Pt, and Pb. Specific examples include copper chloride, copper bromide, copper iodide, nickel chloride, nickel bromide, nickel acetate, cobalt chloride, cobalt bromide, cobalt acetate, iron chloride, zinc chloride, zinc bromide, zinc iodide, zinc acetate, vanadium chloride, vanadium oxytrichloride, palladium chloride, palladium acetate, aluminum chloride, manganese chloride, manganese acetate, manganese acetylacetone, manganese chloride, lead chloride, lead acetate, indium chloride, titanium chloride, and tin chloride.

An amount of the metal derivative and the phthalonitrile compound represented by the general formula (IXa) to be used is preferably from 1:3 to 1:6 in terms of a molar ratio. Further, an amount of the metal derivative and the diiminoisoindoline derivative represented by the general formula (IXb) to be used is preferably from 1:3 to 1:6 in terms of a molar ratio.

Usually, the reaction is carried out in the presence of a solvent. As the solvent are used organic solvents having a boiling point of 80° C. or higher, and preferably 130° C. or higher. Examples include n-amyl alcohol, n-hexanol, cyclohexanol, 2-methyl-1-pentanol, 1-heptanol, 2-heptanol, 1-octanol, 2-ethylhexanol, benzyl alcohol, ethylene glycol, propylene glycol, ethoxyethanol, propoxyethanol, butoxyethanol, dimethylaminoethanol, diethylaminoethanol, tri-chlorobenzene, chloronaphthalene, sulfolane, nitrobenzene, quinoline, and urea. An amount of the solvent to be used is from 1 to 100 times, and preferably from 5 to 20 times the weight of the phthalonitrile compound.

In the reaction, 1,8-diazabicyclo[5.4.0]-7-undecene (DBU) or ammonium molybdenate may be added as a catalyst. An amount of the catalyst to be added is from 0.1 to 10 molar times, and preferably from 0.5 to 2 molar times per mole of the phthalonitrile compound.

The reaction is carried out at a reaction temperature in the range of from 80 to 300° C., preferably from 100 to 250° C., and particularly preferably from 130 to 230° C. When the reaction temperature is lower than 80° C., the reaction rate is extremely slow. When it is higher than 300° C., the phthalocyanine compound is possibly decomposed.

The reaction is carried out for a reaction time of from 2 to 20 hours, preferably from 5 to 15 hours, and particularly preferably from 5 to 10 hours. When the reaction time is less than 2 hours, larges amounts of the unreacted starting materials are present, whereas when it is more than 20 hours, the phthalocyanine compound is possibly decomposed.

The products obtained by these reactions are treated according to the post-treatments of usual organic synthesis reactions, and then can be provided with or without purification. For example, materials liberated from the reaction system are provided without purification or with a purification operation of, e.g., recrystallization or column chromatography, or a combination thereof. Further, after the reaction, the reaction products are poured in water or ice with or without distilling out the reaction solvent, and liberated materials having been or having not been neutralized are provided without purification or with a purification operation of, e.g., recrystallization or column chromatography, or a combination thereof. Alternatively, the reaction products are poured in water or ice with or without distilling out the reaction solvent, and materials having been or having not been neutralized are extracted with an organic solvent/an aqueous solution and then provided without purification or with a purification operation of, e.g., recrystallization or column chromatography, or a combination thereof.

The thus obtained phthalocyanine compound represented by the general formula (IX) (for example, the case of l=m=n=p=1) is usually a mixture of compounds represented by the following general formulae (a)-1 to (a)-4 as isomers in the respective substitution positions of $R^1(SO_2—Z_1)$, $R^2(SO_2—Z_2)$, $R^3(SO_2—Z_3)$, and $R^4(SO_2—Z_4)$.

General formula (a)-1

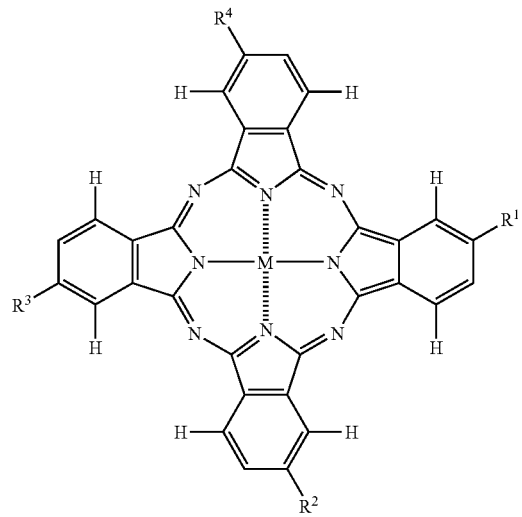

General formula (a)-2

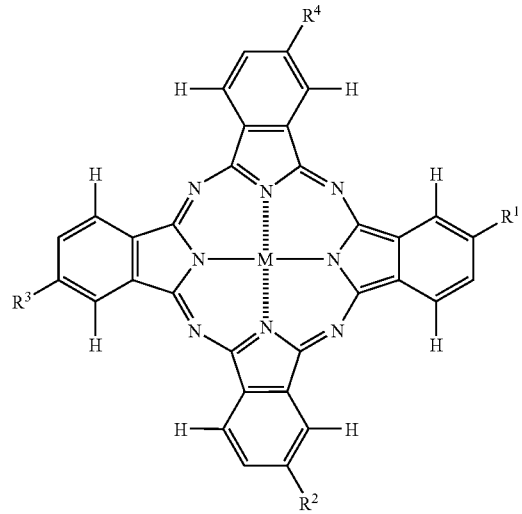

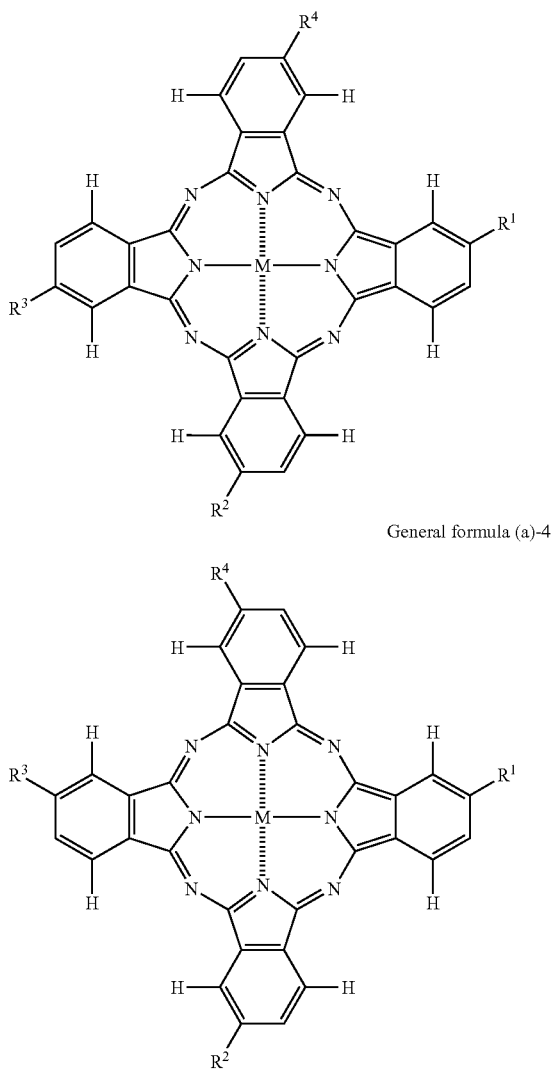

General formula (a)-3

General formula (a)-4

Namely, the compounds represented by the foregoing general formulae (a)-1 to (a)-4 are of a β-position substitution type (phthalocyanine compounds having specific substituents represented by $R^1$ to $R^4$ for the sake of convenience at the 2- and/or 3-position, 6- and/or 7-position, 10- and/or 11-position, and 14- and/or 15-position).

The phthalocyanine compound represented by the general formula (I) of the invention is corresponding to the α,β-positions-mixed substitution type; and the compounds represented by the general formulae (V) and (IX) are corresponding to the β-position substitution type (phthalocyanine compounds having specific substituents at the 2- and/or 3-position, 6- and/or 7-position, 10- and/or 11-position, and 14- and/or 15-position). In the invention, it has been found that in any of the substitution types, specific substituents represented by, for example, —SO—Z and/or —$SO_2$—Z in the general formula (I) are very important in improving the fastness. Further, it has been confirmed that a derivative in which a specific number of specific substituents {for example, when a reference is made to phthalocyanine nuclei represented by the general formula (II), which are contained in a number of 4 or more and 8 or less in one molecule of the phthalocyanine compound, at least one specific substituent is contained at each group of the (2- and/or 3-position), (6- and/or 7-position), (10- and/or 11-position), and (14- and/or 15-position)} are introduced at a specific position (for example, the β-position substitution type is more preferred than the α,β-positions-mixed substitution type) in the phthalocyanine nuclei is an extremely important characteristic feature in structure as means for solving the problems of the invention. Although these causes are unknown in detail, the improvement effects in hue, light fastness, and ozone gas fading resistance (ozone gas resistance), which are brought by the characteristic feature in structure by the specific substituents, are quite unpredictable from the above-described prior art.

In this description, the ozone gas resistance as referred to means a representative of the resistance to ozone gas and also includes a resistance to an oxidizing atmosphere other than ozone gas. In other words, the phthalocyanine compound represented by the general formula (I) according to the invention is characterized in that it is highly resistant to oxidizing gases present in a general environment, such as nitrogen oxides frequently present in exhaust gases of automobiles, sulfur oxides frequently present in exhaust gases in thermal power stations and factories, photochemical smog rich in ozone gas and oxygen-nitrogen and oxygen-hydrogen radicals generated by photochemical chain reaction of the foregoing nitrogen oxides or sulfur oxides with sunlight, and hydrogen peroxide radicals generated in places where a specific chemical solution is used, such as beauty parlors. Accordingly, in the case where oxidative deterioration of images such as in outdoor advertisements and guidance in railroad facilities restricts the image life, the use of the phthalocyanine compound according to the invention as an image-forming material enables to improve the resistance to an oxidizing atmosphere, namely, the so-called ozone gas resistance.

Specific examples of the phthalocyanine compound of the invention will be given with reference to the following Table I-1 to Table I-6 and Table I-11 (Illustrative Compounds I-101 to 150 and I-176 to 185) while using the following general formula (IX'), it should not be construed that the phthalocyanine compound used in the invention is limited thereto.

General formula (IX')

TABLE I-1
| Compound No. | M | X | a |
|---|---|---|---|
| 1-101 | Cu | —SO$_2$—(CH$_2$)$_3$—CH$_3$ | 1 |
| 1-102 | Cu | —SO$_2$—(CH$_2$)$_3$—CH$_3$ | 2 |
| 1-103 | Cu | —SO—(CH$_2$)$_3$—CH$_3$ | 1 |
| 1-104 | Cu | —SO$_2$—(CH$_2$)$_3$—SO$_2$NHC$_4$H$_9$(n) | 1 |
| 1-105 | Cu | —SO$_2$—(CH$_2$)$_2$—NHCOC$_4$H$_9$(n) | 1 |
| 1-106 | Cu | —SO$_2$—(CH$_2$)$_2$—NHSO$_2$C$_2$H$_5$ | 1 |
| 1-107 | Cu | —SO$_2$—(CH$_2$)$_3$—CONHC$_3$H$_7$(i) | 1 |
| 1-108 | Cu | —SO$_2$—(CH$_2$)$_3$—CO$_2$C$_5$H$_{11}$(n) | 1 |
| 1-109 | Cu | —SO$_2$(CH$_2$)$_3$N(C$_2$H$_4$OH)$_2$ | 1 |
| 1—110 | Ni | 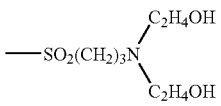 | 1 |
TABLE I-2
| Compound No. | M | X | a |
|---|---|---|---|
| I-111 | Cu | 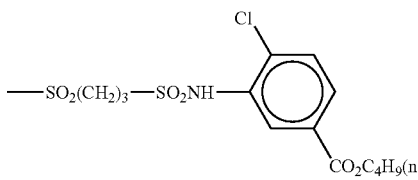 | 1 |
| I-112 | Cu | 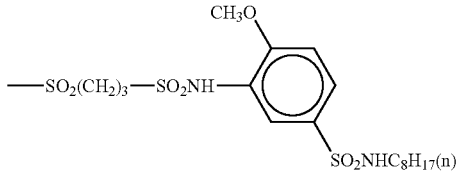 | 1 |
| I-113 | Zn | 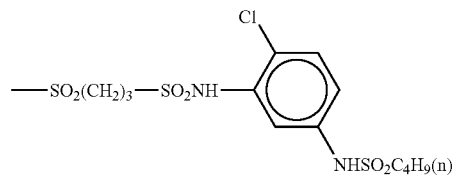 | 1 |
| I-114 | Cu | 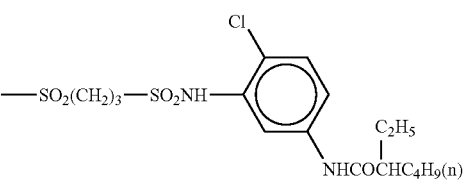 | 1 |
| I-115 | Cu | 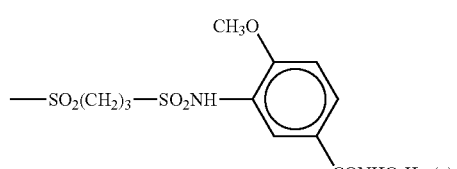 | 1 |

TABLE I-2-continued

| Compound No. | M | X | a |
|---|---|---|---|
| I-116 | Nu | —SO$_2$(CH$_2$)$_3$—SO$_2$NH—[phenyl with (i)C$_4$H$_9$O and OC$_4$H$_9$(i)] | 1 |
| I-117 | Cu | —SO$_2$(CH$_2$)$_3$—SO$_2$NH—[phenyl]—C$_8$H$_{17}$(n) | 1 |
| I-118 | Zn | —SO$_2$(CH$_2$)$_3$—SO$_2$NH—[phenyl]—OC$_3$H$_7$(i) | 1 |
| I-119 | Cu | —SO$_2$(CH$_2$)$_3$—SO$_2$NH—[phenyl with Cl and NHCONHC$_6$H$_{13}$(n)] | 1 |
| I-120 | Cu | —SO$_2$(CH$_2$)$_3$—SO$_2$NH—[phenyl]—NHCONH—[cyclohexyl] | 1 |

TABLE I-3

| Compound No. | M | X | a |
|---|---|---|---|
| I-121 | Cu | —SO$_2$(CH$_2$)$_3$—NHSO$_2$—[phenyl with CO$_2$C$_5$H$_{11}$(n) and CO$_2$C$_5$H$_{11}$(n)] | 1 |
| I-122 | Cu | —SO$_2$(CH$_2$)$_3$—NHSO$_2$—[phenyl]—NHSO$_2$C$_8$H$_{17}$(n) | 1 |
| I-123 | Cu | —SO$_2$(CH$_2$)$_3$—NHSO$_2$—[phenyl with (n)C$_4$H$_9$ and C$_4$H$_9$(t)] | 1 |
| I-124 | Cu | —SO$_2$(CH$_2$)$_3$—NHSO$_2$—[phenyl]—NHCOC$_3$H$_7$(i) | 1 |

TABLE I-3-continued

| Compound No. | M | X | a |
|---|---|---|---|
| I-125 | Cu | —SO$_2$(CH$_2$)$_3$—NHCO—C$_6$H$_3$(CO$_2$C$_8$H$_{11}$(n))(CO$_2$C$_8$H$_{11}$(n)) | 1 |
| I-126 | Cu | —SO$_2$(CH$_2$)$_3$—NHCO—C$_6$H$_4$—SO$_2$NHCH$_2$CH(C$_2$H$_5$)C$_4$H$_9$(n) | 1 |
| I-127 | Cu | —SO$_2$(CH$_2$)$_3$—CONH—C$_6$H$_3$(SO$_2$NHC$_3$H$_7$(i))(SO$_2$NHC$_3$H$_7$(i)) | 1 |
| I-128 | Cu | —SO$_2$(CH$_2$)$_3$—CONH—C$_6$H$_3$(CO$_2$C$_4$H$_9$(s))(CO$_2$C$_4$H$_9$(s)) | 1 |
| I-129 | Cu | —SO$_2$(CH$_2$)$_3$—NHCONH—C$_6$H$_4$—OC$_6$H$_{13}$(s) | 1 |
| I-130 | Cu | —SO$_2$—(CH$_2$)$_2$—NHCONHC$_4$H$_9$(i) | 1 |

TABLE I-4

| Compound No. | M | X | a |
|---|---|---|---|
| I-131 | Cu | —SO$_2$—C$_6$H$_4$—CO$_2$C$_5$H$_{11}$(n) | 1 |
| I-132 | Cu | —SO$_2$—C$_6$H$_4$—CONH—C$_6$H$_4$—NHSO$_2$C$_4$H$_9$(n) | 1 |
| I-133 | Ni | —SO$_2$—C$_6$H$_4$—NHCOCH(C$_2$H$_5$)C$_4$H$_9$(n) | 1 |
| I-134 | Cu | —SO$_2$—C$_6$H$_4$—OC$_2$H$_5$O—C$_6$H$_3$((t)C$_5$H$_{11}$)(C$_5$H$_{11}$(t)) | 1 |

TABLE I-4-continued

| Compound No. | M | X | a |
|---|---|---|---|
| I-135 | Cu | —SO₂—C₆H₃(CO₂C₅H₁₁(i))₂ (1,3-di-iso-pentyloxycarbonyl at 2,5-positions) | 1 |
| I-136 | Cu | —SO₂—C₆H₄—NHSO₂C₈H₁₇(n) | 1 |
| I-137 | Cu | —SO₂—C₆H₄—NHCOCH(C₂H₅)C₄H₉(n) | 1 |
| I-138 | Cu | —SO₂—C₆H₄—SO₂NH(CH₂)₃O—C₆H₃((t)C₅H₁₁)(C₅H₁₁(t)) | 1 |
| I-139 | Cu | —SO₂—C₆H₄—SO₂NHCO—C₆H₁₃(n) | 1 |
| I-140 | Cu | —SO₂—C₆H₄—SO₂NKSO₂—C₈H₁₇(n) | 1 |

TABLE I-5

| Compound No. | M | X | a |
|---|---|---|---|
| I-141 | Cu | —SO₂—(imidazole with N-(CH₂)₅CH₃) | 1 |
| I-142 | Cu | —SO₂—(1,3,4-thiadiazole)—NHSO₂—C₆H₄—SO₂NHC₄H₉(n) | 1 |
| I-143 | Cu | —SO₂—(1,3,4-thiadiazole)—NHCO—C₆H₄—SO₂NHC₄H₉(i) | 1 |

TABLE I-5-continued

| Compound No. | M | X | a |
|---|---|---|---|
| I-144 | Cu | —SO$_2$-(1,2,4-triazole, N4-(CH$_2$)$_7$CH$_3$) | 1 |
| I-145 | Cu | —SO$_2$-(4-methylthiazole-5-CH$_2$CO$_2$C$_5$H$_{11}$(i)) | 1 |
| I-146 | Cu | —SO$_2$-(benzimidazole, N-(CH$_2$)$_9$CH$_3$) | 1 |
| I-147 | Ni | —SO$_2$-(1,3,4-thiadiazole-2-NHSO$_2$-C$_6$H$_4$-SO$_2$N(C$_2$H$_5$)$_2$) | 1 |
| I-148 | Ni | —SO$_2$-(4-methylthiazole-5-CH$_2$CO$_2$C$_5$H$_{11}$(n)) | 1 |
| I-149 | Zn | —SO$_2$-(1,3,4-thiadiazole-2-NHCO-C$_6$H$_4$-SO$_2$NHC$_3$H$_7$(i)) | 1 |
| I-150 | Zn | —SO$_2$-(4-methylthiazole-5-CH$_2$CO$_2$C$_5$H$_{11}$(n)) | 1 |

Further, specific examples of the phthalocyanine compound of the invention will be given with reference to the following Table I-6 to Table I-10 (Illustrative Compounds I-151 to 175) while using the following general formula (I'), it should not be construed that the phthalocyanine compound used in the invention is limited thereto. Incidentally, in the tables, specific examples of each group of $(X_1, X_2)$, $(Y_{11}, Y_{12})$, $(Y_{13}, Y_{14})$, $(Y_{15}, Y_{16})$, and $(Y_{17}, Y_{18})$ are each independently not in order.

General formula (I')

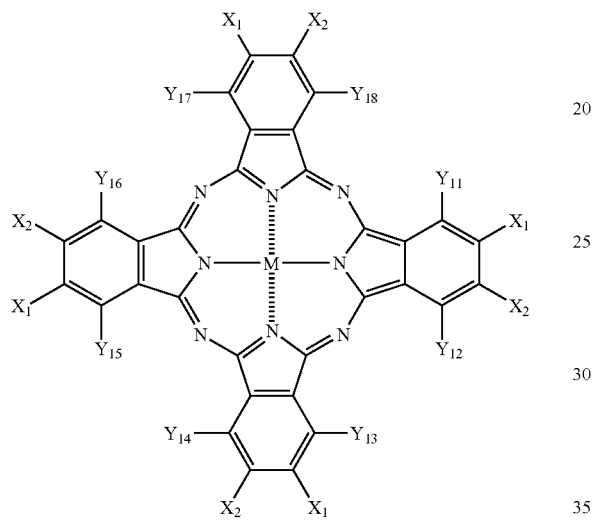

TABLE I-6

| Compound No. | M | $X_1$ | $X_2$ | $Y_{11}, Y_{12}$ | $Y_{13}, Y_{14}$ | $Y_{15}, Y_{16}$ | $Y_{17}, Y_{18}$ |
|---|---|---|---|---|---|---|---|
| I-151 | Cu | —SO$_2$—(CH$_2$)$_3$—CH$_3$ | —Cl | —H, —H | —H, —H | —H, —H | —H, —H |
| I-152 | Cu | —SO$_2$—(CH$_2$)$_3$—CH$_3$ | —H | —Cl, —H | —Cl, —H | —Cl, —H | —Cl, —H |
| I-153 | Cu | —SO—(CH$_2$)$_3$—CH$_3$ | —Cl | —H, —H | —H, —H | —H, —H | —H, —H |
| I-154 | Cu | —SO$_2$—(CH$_2$)$_7$—CH$_3$ | —Cl | —Cl, —H | —Cl, —H | —Cl, —H | —Cl, —H |
| I-155 | Ni | —SO$_2$—(CH$_2$)$_3$—CH$_3$ | —Cl | —H, —H | —H, —H | —H, —H | —H, —H |

TABLE I-7

| Compound No. | M | $X_1$ | $X_2$ | $Y_{11}, Y_{12}$ | $Y_{13}, Y_{14}$ | $Y_{15}, Y_{16}$ | $Y_{17}, Y_{18}$ |
|---|---|---|---|---|---|---|---|
| I-156 | Cu | —SO$_2$—(CH$_2$)$_3$—SO$_2$NHC$_4$H$_9$(n) | —Cl | —H, —H | —H, —H | —H, —H | —H, —H |
| I-157 | Cu | —SO$_2$—(CH$_2$)$_2$—NHCOC$_4$H$_9$(n) | —H | —Cl, —H | —Cl, —H | —Cl, —H | —Cl, —H |
| I-158 | Cu | —SO$_2$—(CH$_2$)$_2$—NHSO$_2$C$_2$H$_5$ | —Cl | —H, —H | —H, —H | —H, —H | —H, —H |
| I-159 | Cu | —SO$_2$—(CH$_2$)$_3$—CONHC$_3$H$_7$(i) | —H | —Cl, —H | —Cl, —H | —Cl, —H | —Cl, —H |
| I-160 | Zn | —SO$_2$—(CH$_2$)$_3$—CO$_2$C$_5$H$_{11}$(n) | —Cl | —H, —H | —H, —H | —H, —H | —H, —H |

TABLE I-8

| Compound No. | M | X₁ | X₂ | Y₁₁, Y₁₂ | Y₁₃, Y₁₄ | Y₁₅, Y₁₆ | Y₁₇, Y₁₈ |
|---|---|---|---|---|---|---|---|
| I-161 | Cu | —SO₂(CH₂)₃N(C₂H₄OH)₂ | —Cl | —H, —H | —H, —H | —H, —H | —H, —H |
| I-162 | Cu | —SO₂(CH₂)₃—SO₂NH—(2-Cl, 5-SO₂NHC₆H₁₃(n))phenyl | —H | —Cl, —H | —Cl, —H | —Cl, —H | —Cl, —H |
| I-163 | Cu | —SO₂(CH₂)₃—SO₂NH—(2-Cl, 5-NHSO₂C₄H₉(n))phenyl | —Cl | —H, —H | —H, —H | —H, —H | —H, —H |
| I-164 | Cu | —SO₂(CH₂)₃—SO₂NH—(2-CH₃O, 5-CONHC₈H₁₇(n))phenyl | —H | —Cl, —H | —Cl, —H | —Cl, —H | —Cl, —H |
| I-165 | Ni | —SO₂(CH₂)₂—NHSO₂—(3,5-bis(CO₂C₅H₁₁(n)))phenyl | —Cl | —H, —H | —H, —H | —H, —H | —H, —H |

TABLE I-9

| Compound No. | M | X₁ | X₂ | Y₁₁, Y₁₂ | Y₁₃, Y₁₄ | Y₁₅, Y₁₆ | Y₁₇, Y₁₈ |
|---|---|---|---|---|---|---|---|
| I-166 | Cu | —SO₂(CH₂)₃—NHCO—(3,4-bis(CO₂C₅H₁₁(n)))phenyl | —Cl | —H, —H | —H, —H | —H, —H | —H, —H |
| I-167 | Cu | —SO₂(CH₂)₃—CONH—(3,5-bis(SO₂NHC₃H₇(i)))phenyl | —Cl | —H, —H | —H, —H | —H, —H | —H, —H |
| I-168 | Cu | —SO₂—(CH₂)₂—NHCONHC₄H₉(i) | —Cl | —H, —H | —H, —H | —H, —H | —H, —H |
| I-169 | Cu | —SO₂—(phenyl)—OC₂H₅O—(2-(t)C₅H₁₁, 4-C₂H₅(t))phenyl | —Cl | —H, —H | —H, —H | —H, —H | —H, —H |

TABLE I-9-continued

| Compound No. | M | X$_1$ | X$_2$ | Y$_{11}$, Y$_{12}$ | Y$_{13}$, Y$_{14}$ | Y$_{15}$, Y$_{16}$ | Y$_{17}$, Y$_{18}$ |
|---|---|---|---|---|---|---|---|
| I-170 | Cu | —SO$_2$—(3-CO$_2$C$_5$H$_{11}$(n)-phenyl) | —Cl | —H, —H | —H, —H | —H, —H | —H, —H |

TABLE I-10

| Compound No. | M | X$_1$ | X$_2$ | Y$_{11}$, Y$_{12}$ | Y$_{13}$, Y$_{14}$ | Y$_{15}$, Y$_{16}$ | Y$_{17}$, Y$_{18}$ |
|---|---|---|---|---|---|---|---|
| I-171 | Cu | —SO$_2$—(3-NHSO$_2$C$_8$H$_{17}$(n)-phenyl) | —Cl | —H, —H | —H, —H | —H, —H | —H, —H |
| I-172 | Cu | —SO$_2$—(1,3,4-thiadiazol-2-yl)-NHSO$_2$-(3-SO$_2$NHC$_4$H$_9$(n)-phenyl) | —Cl | —H, —H | —H, —H | —H, —H | —H, —H |
| I-173 | Cu | —SO$_2$—(1,3,4-thiadiazol-2-yl)-NHCO-(3-SO$_2$NHC$_4$H$_9$(i)-phenyl) | —Cl | —H, —H | —H, —H | —H, —H | —H, —H |
| I-174 | Cu | —SO$_2$—(4-methyl-5-CH$_2$CO$_2$C$_5$H$_{11}$(i)-thiazol-2-yl) | —Cl | —H, —H | —H, —H | —H, —H | —H, —H |
| I-175 | Cu | —SO$_2$—(1-(CH$_2$)$_5$CH$_3$-imidazol-2-yl) | —Cl | —H, —H | —H, —H | —H, —H | —H, —H |

TABLE I-11

| Compound No. | M | X | a |
|---|---|---|---|
| I-176 | Cu | —SO$_2$—(CH$_2$)$_3$—SO$_2$NH(CH$_2$)$_3$OC$_3$H$_7$(i) | 1 |
| I-177 | Cu | —SO$_2$—(CH$_2$)$_3$—CO$_2$CH(CH$_3$)CH$_2$OCH$_3$ | 1 |
| I-178 | Cu | —SO$_2$—(CH$_2$)$_4$—SO$_2$NH(CH$_2$)$_3$OC$_3$H$_7$(i) | 1 |
| I-179 | Cu | —SO$_2$—(CH$_2$)$_2$CH(CH$_3$)SO$_2$NH(CH$_2$)$_3$OC$_3$H$_7$(i) | 1 |
| I-180 | Cu | —SO$_2$—(CH$_2$)$_3$—CO$_2$CH$_2$CH$_2$OCH$_3$ | 1 |
| I-181 | Cu | —SO$_2$—(CH$_2$)$_3$—CONH(CH$_2$)$_3$OC$_3$H$_7$(i) | 1 |
| I-182 | Ni | —SO$_2$—(CH$_2$)$_3$—SO$_2$NH(CH$_2$)$_3$OC$_3$H$_7$(i) | 1 |
| I-183 | Ni | —SO$_2$—(CH$_2$)$_3$—CO$_2$CH(CH$_3$)CH$_2$OCH$_3$ | 1 |
| I-184 | Zn | —SO$_2$—(CH$_2$)$_3$—SO$_2$NH(CH$_2$)$_3$OC$_3$H$_7$(i) | 1 |
| I-185 | Zn | —SO$_2$—(CH$_2$)$_3$—CO$_2$CH(CH$_3$)CH$_2$OCH$_3$ | 1 |

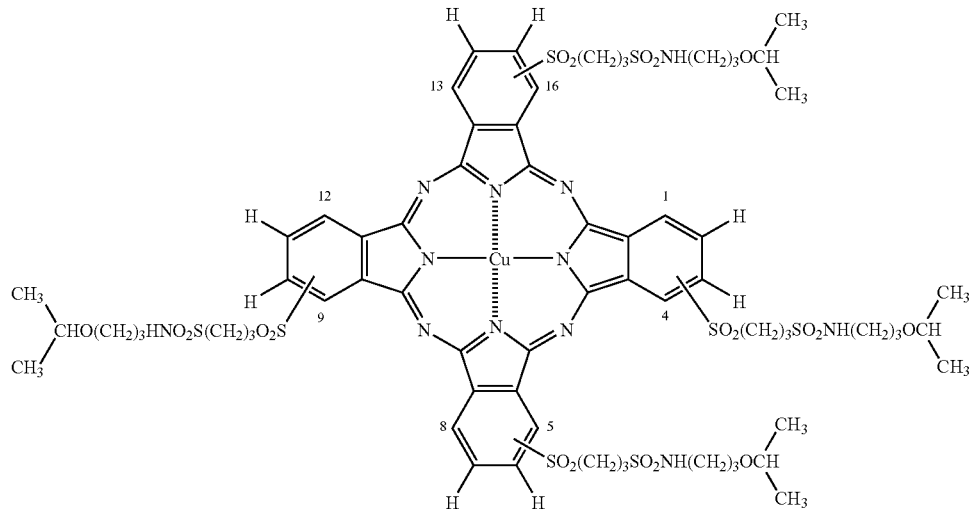

Illustrative Compound 186

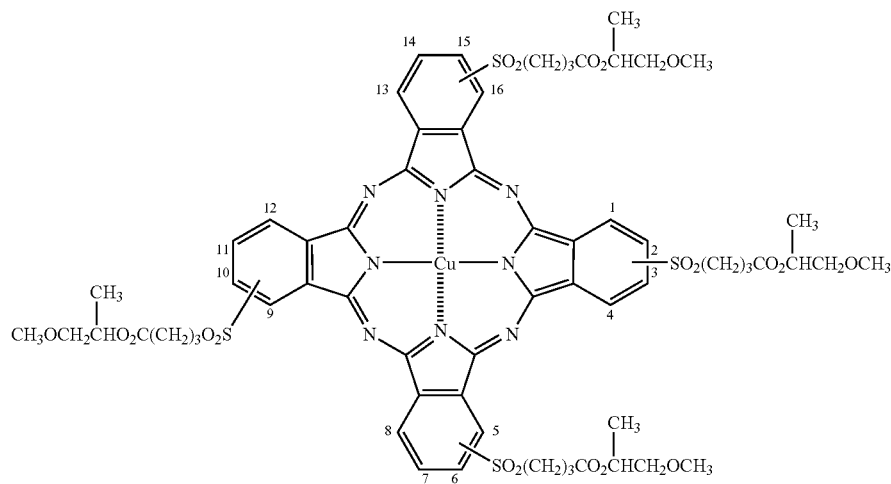

Illustrative Compound 187

Representative phthalocyanine compounds of the general formula (IX) of the invention can be derived by, for example, the following synthesis route. In the following Synthesis Examples, λmax means an absorption maximum wavelength, and εmax means a molar absorption coefficient at the absorption maximum wavelength.

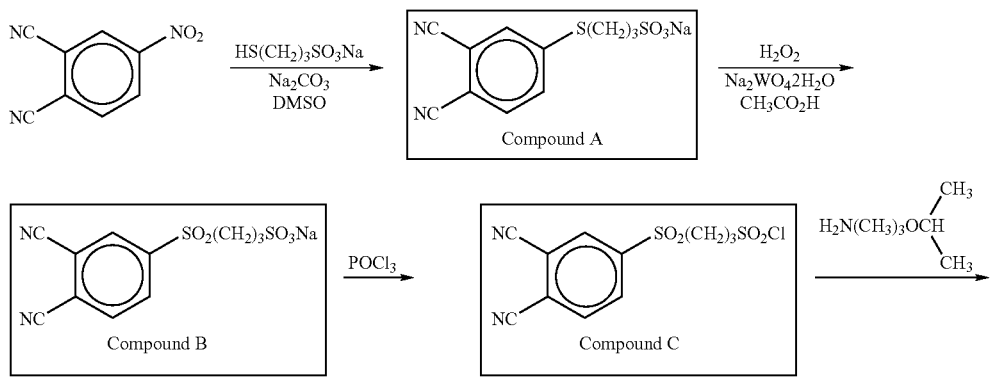

-continued
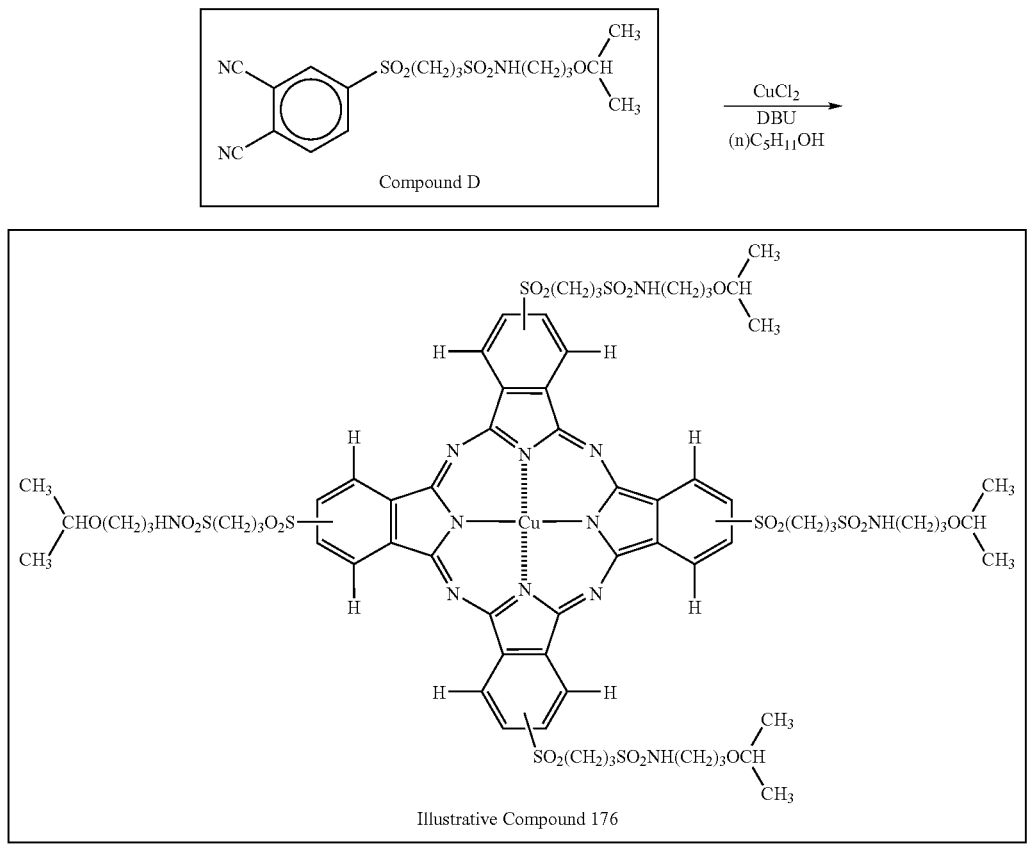
Illustrative Compound 176
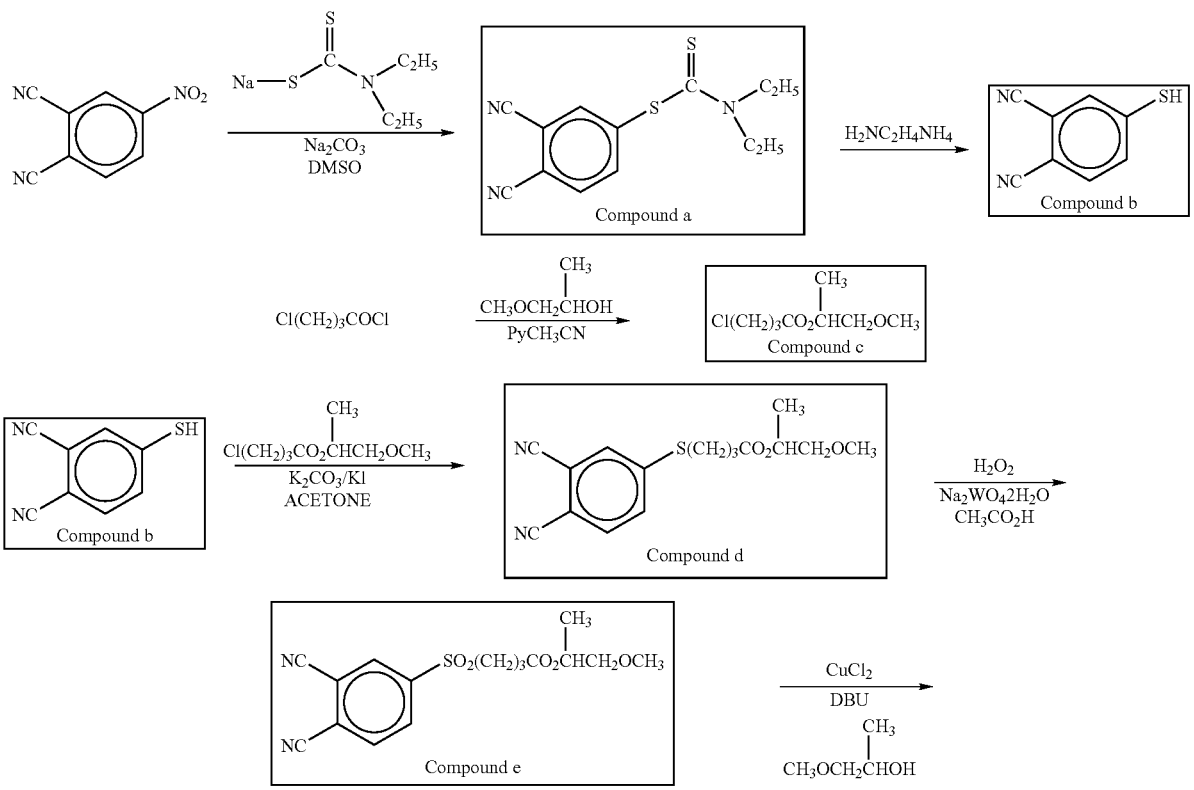

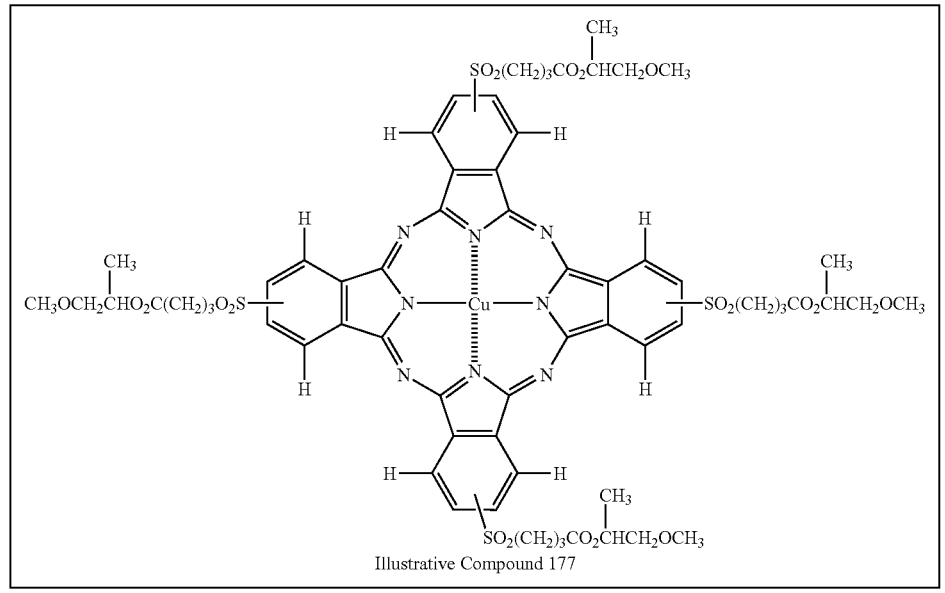

Illustrative Compound 177

SYNTHESIS EXAMPLE 1

Synthesis of Illustrative Compound 176 of the Invention

Synthesis of Compound A

Under a nitrogen gas stream, 26.0 g of 4-nitrophthalonitrile (made by Tokyo Kasei) was dissolved in 200 mL of DMSO (dimethyl sulfoxide), and 30.3 g of 3-mercaptopropane-sodium sulfonate (made by Aldorich) was added to the solution with stirring at an internal temperature of 20° C. Thereafter, 24.4 g of anhydrous sodium carbonate was gradually added with stirring at an internal temperature of 20° C. The reaction mixture was elevated to 30° C. with stirring, and stirred at that temperature for one hour. After cooling to 20° C., the reaction mixture was filtered by a Nutsche filter, and the filtrate was added to 15,000 mL of ethyl acetate and allowed to crystallize. Subsequently, the mixture was stirred at room temperature for 30 minutes, and deposited crude crystals were filtered by a Nutsche filter and washed with ethyl acetate, followed by drying. The obtained crude crystals were recrystallized from methanol/ethyl acetate to obtain 42.5 g of Compound A. $^1$H-NMR (DMSO-$d_6$), δ value on TMS standard: 1.9 to 2.0 (2H, t); 2.5 to 2.6 (2H, m); 3.2 to 3.3 (2H, t); 7.75 to 7.85 (1H, d); 7.93 to 8.03 (1H, d); 8.05 to 8.13 (1H, s).

Synthesis of Compound B

Compound A (42.4 g) was dissolved in 300 mL of acetic acid, and 2.5 g of $Na_2WO_4.2H_2O$ was added to the solution with stirring at an internal temperature of 20° C. The mixture was then cooled to an internal temperature of 10° C. in an ice bath. Subsequently, 35 mL of an aqueous hydrogen peroxide solution (30%) was gradually added dropwise while taking care of heat generation. After stirring at an internal temperature of 15 to 20° C. for 30 minutes, the reaction mixture was elevated to an internal temperature of 60° C. and stirred at that temperature for one hour. After cooling to 20° C., the reaction mixture was poured into 1,500 mL of ethyl acetate, and the mixture was then stirred at that temperature for 30 minutes. Thereafter, deposited crude crystals were filtered by a Nutsche filter and washed with 200 mL of ethyl acetate, followed by drying. The obtained crude crystals were washed with methanol/ethyl acetate under heating for purification, to obtain 41.0 g of Compound B. $^1$H-NMR (DMSO-$d_6$), δ value on TMS standard: 1.8 to 1.9 (2H, t); 2.4 to 2.5 (2H, m); 3.6 to 3.7 (2H, t); 8.3 to 8.4 (1H, d); 8.4 to 8.5 (1H, d); 8.6 to 8.7 (1H, s).

Synthesis of Compound C

Compound B (67.2 g) was dispersed in 150 mL of DMAc (dimethylacetamide) and 1,000 mL of acetonitrile, and 38.0 mL of phosphorus oxychloride was gradually added dropwise to the dispersion with stirring at an internal temperature of 20° C. while taking care of heat generation. Subsequently, the reaction mixture was elevated to an internal temperature of 70° C. and stirred at that temperature for 2 hours. After cooling to 20° C., the reaction mixture was poured into 3,000 mL of ice water, and the mixture was then stirred at 15° C. for 30 minutes. Deposited crude crystals were filtered by a Nutsche filter and washed with 5,000 mL of water. The obtained crude crystals were taken out by and washed with 500 mL of isopropyl alcohol. Thereafter, the crystals were filtered by a Nutsche filter, washed with 200 mL of isopropyl alcohol, and dried in vacuo to obtain 52.2 g of Compound C. $^1$H-NMR (DMSO-$d_6$), δ value on TMS standard: 1.8 to 1.9 (2H, m); 2.5 to 2.6 (2H, t); 3.6 to 3.7 (2H, t); 8.4 to 8.5 (2H, dd); 8.6 to 8.7 (1H, s).

Synthesis of Compound D

In 50 mL of acetonitrile was dissolved 12.0 g of 3-isopropoxypropylamine (made by Tokyo Kasei), to which was then gradually added dropwise 16.7 g of Compound C with stirring at an internal temperature of 4° C. such that the internal temperature did not exceed 10° C. After stirring at room temperature for one hour, the reaction mixture was added to a mixed solution of 100 mL of distilled water and 300 g of ice. Deposited solids were collected by filtration and thoroughly washed with water. The obtained crude crystals were recrystallized from isopropanol to obtain 16.2 g of Compound D. $^1$H-NMR (DMSO-$d_6$), δ value on TMS standard: 1.0 to 1.1 (6H, d); 1.5 to 1.6 (2H, t); 1.9 to 2.0 (2H, m); 2.9 to 3.0 (2H, dd); 3.0 to 3.1 (2H, t); 3.3 to 3.4 (2H, m); 3.4 to 3.5 (1H, m); 3.6 to 3.7 (2H, t); 7.1 to 7.2 (1H, t); 8.3 to 8.5 (2H, dd); 8.6 to 8.7 (1H, s).

Synthesis of Illustrative Compound 176 of the Invention

In a three-necked flask equipped with a condenser was charged 60 mL of n-amyl alcohol, to which were added 16.2 g of Compound D and 1.3 g of copper (II) chloride. To the mixture, 0.3 mL of 1,8-diazabicyclo[5.4.0]-7-undecene (DBU) was added dropwise at room temperature with stirring. Subsequently, the reaction mixture was elevated to an internal temperature of 100° C. and stirred at that temperature for one hour. Then, 100 mL of methanol was poured thereinto, and the mixture was stirred under reflux for one hour. After cooling the reaction mixture to room temperature, insoluble matters were separated by filtration and washed with 200 mL of methanol. To the filtrate was added dropwise 500 mL of isopropanol for crystallization. The obtained crude crystals were filtered by a Nutsche filer. The crystals were dissolved in 200 mL of methanol, and 300 mL of isopropanol was added dropwise thereto for reprecipitation. Crude crystals were separated by filtration and dissolved in 200 mL of methanol. The solution was elevated to a reflux temperature with stirring, to which was then added dropwise 450 mL of isopropanol for reprecipitation. Crude crystals were separated by filtration and applied and washed with isopropanol, followed by drying to obtain 11.2 g of Illustrative Compound 176 as a blue crystal. λmax (absorption maximum wavelength): 676.1 nm; εmax (molar absorption coefficient at the absorption maximum wavelength) =1.78×10$^5$ (in DMF). As a result of analyzing the obtained compound (mass analysis: ES1-MS, measured by various instrumental analysis methods such as elemental analysis), it could be confirmed that the substitution position of phthalocyanine copper(II) as defined in this description was of a β-position substitution type {having one —{SO$_2$—(CH$_2$)$_3$—SO$_2$NH—(CH$_2$)$_3$—OCH(CH$_3$)$_2$} group at the (2- or 3-position), (6- or 7-position), (10- or 11-position), or (14- or 15-position) on each benzene nucleus and four (in total) —{SO$_2$—(CH$_2$)$_3$—SO$_2$NH—(CH$_2$)$_3$—OCH(CH$_3$)$_2$} groups in one molecule of the phthalocyanine copper).

SYNTHESIS EXAMPLE 2

Synthesis of Illustrative Compound 177 of the Invention

Synthesis of Compound a

Under a nitrogen gas stream, a three-necked flask equipped with a condenser was charged with 600 mL of dimethyl sulfoxide (DMSO), to which was then added 195.2 g of sodium N,N-diethyldithiocarbamate trihydrate. Subsequently, 152 g of anhydrous potassium carbonate was dividedly added thereto at room temperature with stirring.

Next, after elevating an internal temperature to 50° C., 300 mL of a DMSO solution of 125 g of 4-nitrophthalonitrile (made by Tokyo Kasei) was added dropwise at that temperature over one hour. The mixture was stirred at that temperature for 4 hours and then cooled such that the internal temperature reached room temperature. The reaction mixture was poured into 4,000 mL of water for crystallization and stirred at room temperature for one hour, followed by filtration. The obtained crude crystals were washed with 3,000 mL of water and 250 mL of cold methanol, and then dried at 40° C. overnight. The obtained crude crystals were washed with 500 mL of methanol under heating, cooled to 10° C., filtered, and then dried to obtain 184.7 g of Compound a. $^1$H-NMR (DMSO-$d_6$), δ value on TMS standard: 1.2 to 1.3 (3H, t); 1.3 to 1.4 (3H, t); 3.8 to 3.9 (2H, q); 3.9 to 4.0 (2H, q); 7.9 to 8.0 (1H, d); 8.2 to 8.3 (1H, d); 8.3 to 8.4 (1H, s).

Synthesis of Compound b

Under a nitrogen gas stream, a three-necked flask equipped with a condenser was charged with 390 mL of ethylenediamine (made by Tokyo Kasei), to which was then dividedly added 130 g of Compound a at room temperature. Subsequently, the mixture was elevated to an internal temperature of 42° C. with stirring.

Next, the mixture was stirred at that temperature for 4 hours and then cooled to an internal temperature of 20° C. The reaction mixture was poured into 1,300 mL of water, and 1,000 mL of concentrated hydrochloric acid was subsequently added dropwise to adjust the solution to a pH of 2. Deposited crystals were filtered, washed successively with 2N hydrochloric acid and isopropyl alcohol, and then dried to obtain 70.0 g of Compound b. $^1$H-NMR (DMSO-$d_6$), δ value on TMS standard: 7.85 to 7.95 (1H, d); 7.95 to 8.05 (1H, d); 8.15 to 8.25 (1H, s).

Synthesis of Compound c

Acetonitrile (50 mL) was mixed with 18.3 mL of 1-methoxy-2-propanol (made by Tokyo Kasei), and the mixture was kept at 4° C. To the mixture, 21.0 mL of 4-chlorobutyl chloride (made by Tokyo Kasei) was added, and subsequently, 15.1 mL of pyridine was gradually added dropwise such that an internal temperature did not exceed 15° C. After the dropwise addition, the mixture was stirred at room temperature for 30 minutes, and 500 mL of water was added thereto. A desired product was extracted with 200 mL of ethyl acetate, and an organic phase was collected by a separatory funnel. The organic phase was washed five times with saturated salt water, dried over anhydrous sodium sulfate, and then concentrated to obtain 32.1 g of Compound c in an oily state. $^1$H-NMR (DMSO-$d_6$), δ value on TMS standard: 1.2 to 1.3 (3H, d); 2.0 to 2.2 (2H, dd); 2.2 to 2.4 (2H, t); 3.3 (3H, s); 3.4 to 3.5 (2H, d); 3.5 to 3.7 (2H, t); 5.0 to 5.2 (1H, m).

Synthesis of Compound d

Compound b (23.0 g) and 31.0 g of Compound c were mixed with 50 mL of an acetone suspension of 23.9 g of potassium carbonate (made by Wako Pure Chemical) and 28.7 g of potassium iodide (made by Wako Pure Chemical) at room temperature. The mixture was refluxed with stirring for one hour and then returned to room temperature. After separating insoluble matters by filtration, 500 mL of water was added to the filtrate, a desired product was extracted with 150 mL of ethyl acetate, and an organic phase was collected by a separatory funnel. The organic phase was washed five times with saturated salt water, dried over anhydrous sodium sulfate, and then concentrated to obtain 51.5 g of Compound d in an oily state.

$^1$H-NMR (DMSO-$d_6$), δ value on TMS standard: 1.1 to 1.2 (3H, d); 1.8 to 1.9 (2H, m); 2.4 to 2.5 (2H, t); 3.1 to 3.2 (2H, t); 3.2 to 3.3 (3H, s); 3.3 to 3.4 (2H, d); 4.9 to 5.1 (1H, m); 7.7 to 8.0 (2H, dd); 8.0 to 8.1 (1H, s).

Synthesis of Compound e

Compound d (50.0 g) was mixed with 100 mL of acetic acid, and 2.6 g of $Na_2WO_4 \cdot 2H_2O$ was added to the mixture in an ice bath with stirring at an internal temperature of 10° C. Subsequently, 30 mL of an aqueous hydrogen peroxide solution (30%) was gradually added dropwise while taking care of heat generation. After stirring at an internal temperature of 15 to 20° C. for 30 minutes, the reaction mixture was elevated to an internal temperature of 60° C. and stirred at that temperature for one hour. After cooling to 20° C., 500 mL of ethyl acetate and 1,000 mL of water were poured into the reaction mixture. The mixture was shaken by a separatory funnel, and an organic phase was collected. The organic phase was washed three times with 500 mL of saturated salt water, dried over anhydrous sodium sulfate, and then concentrated to obtain 49.1 g of Compound e in an oily state.
$^1$H-NMR (DMSO-$d_6$), δ value on TMS standard: 1.1 to 1.2 (3H, d); 1.7 to 1.9 (2H, m); 2.3 to 2.5 (2H, t); 3.2 to 3.3 (3H, s); 3.3 to 3.4 (2H, d); 3.5 to 3.6 (2H, t); 4.9 to 5.0 (1H, m); 8.3 to 8.5 (2H, dd); 8.6 to 8.7 (1H, s).

Synthesis of Illustrative Compound 177 of the Invention

In a three-necked flask equipped with a condenser was charged 200.0 mL of 1-methoxy-2-propanol (made by Tokyo Kasei), to which was added 46.0 g of Compound e. To the mixture, 1.0 mL of 1,8-diazabicyclo[5.4.0]-7-undecene (DBU) was added dropwise at room temperature with stirring. Subsequently, the reaction mixture was elevated to an internal temperature of 100° C., and 4.41 g of copper(II) chloride was added. After stirring at that temperature for 3 hours, the reaction mixture was cooled to room temperature, and insoluble matters were separated by filtration. The insoluble matters were washed with 200 mL of acetonitrile, and 1,300 mL of methanol was added dropwise to the filtrate for crystallization. The obtained crude crystals were filtered by a Nutsche filter. The crystals were applied and washed with 200 mL of methanol, followed by drying to obtain 24.2 g of Illustrative Compound 177 as a blue crystal. λmax (absorption maximum wavelength): 675.5 nm; εmax (molar absorption coefficient at the absorption maximum wavelength)=$1.85 \times 10^5$ (in DMF). As a result of analyzing the obtained compound (mass analysis: ES1-MS, measured by various instrumental analysis methods such as elemental analysis), it could be confirmed that the substitution position of phthalocyanine copper(II) as defined in this description was of a β-position substitution type {having one —{$SO_2$—($CH_2$)$_3$—$CO_2$—CH($CH_3$)$CH_2$—$OCH_3$} group at the (2- or 3-position), (6- or 7-position), (10- or 11-position), or (14- or 15-position) on each benzene nucleus and four (in total) —{$SO_2$—($CH_2$)$_3$—$CO_2$—CH($CH_3$)$CH_2$—$OCH_3$} groups in one molecule of the phthalocyanine copper}.

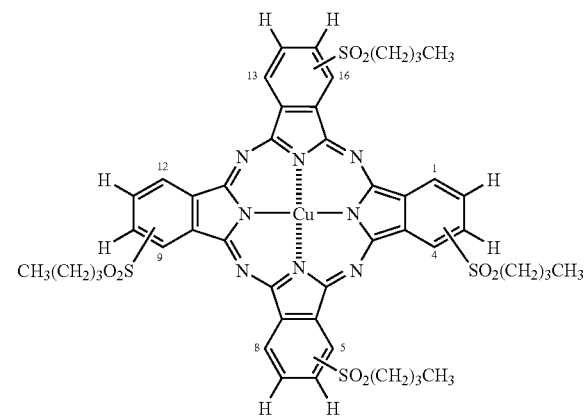

Illustrative Compound 176

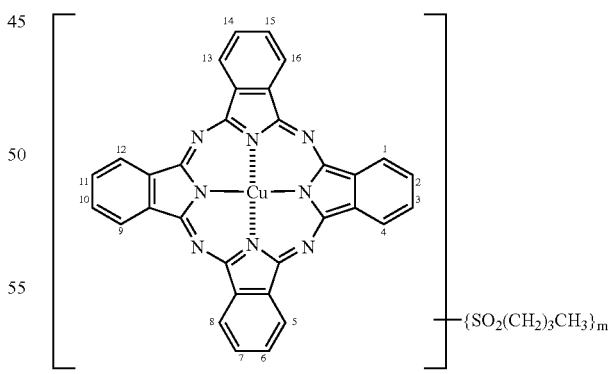

Illustrative Compound 177

Substitution position: Mixture at the 1-position to 16-position
Number of substitutions: Mixture of m = 4, 3, 2

[Phthalocyanine Dye]

In addition, the phthalocyanine compound represented by the foregoing general formula (II) will be described in detail.

Incidentally, since the phthalocyanine compound is oil-soluble, it does not have an ionic hydrophilic group within the molecule thereof.

General formula (II)

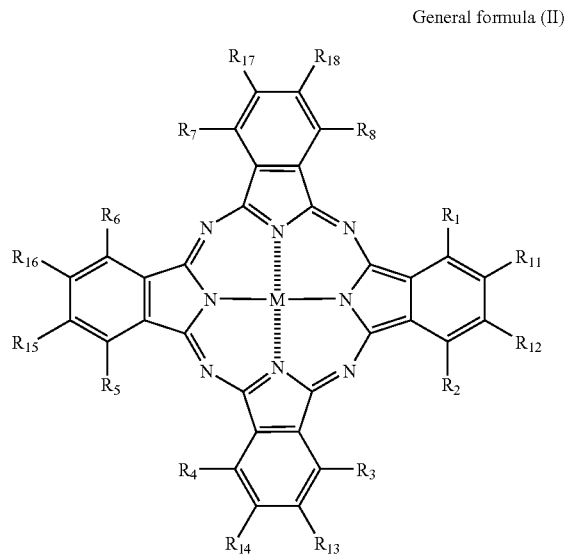

In the general formula (II), $R_1$, $R_2$, $R_3$, $R_4$, $R_5$, $R_6$, $R_7$, and $R_8$ each independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amide group, an arylamino group, an ureido group, a sulfamoylamino group, an alkylthio group, an arylthio group, an alkoxycarbonylamino group, a sulfonamide group, a carbamoyl group, a sulfamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a sulfinyl group, a phosphoryl group, or an acyl group; and each group may be further substituted. Specific examples and preferred examples of $R_1$ to $R_8$ are the same as in $Y_1$ to $Y_4$ as above.

Of these, a hydrogen atom, a halogen atom, an alkyl group, an aryl group, a cyano group, an alkoxy group, an amide group, a ureido group, a sulfonamide group, a carbamoyl group, a sulfamoyl group, and an alkoxycarbonyl group are preferable; a hydrogen atom, a halogen atom, and a cyano group are particularly preferable; and a hydrogen atom is most preferable.

$R_{11}$, $R_{12}$, $R_{13}$, $R_{14}$, $R_{15}$, $R_{16}$, $R_{17}$, and $R_{18}$ each independently represents a hydrogen atom, a halogen atom, or a substituted sulfamoyl group. However, with respect to each of $R_{11}$ and $R_{12}$, $R_{13}$ and $R_{14}$, $R_{15}$ and $R_{16}$, and $R_{17}$ and $R_{18}$, at least either one represents a substituted sulfamoyl group, and at least one of the four or more substituted sulfamoyl groups present has a substituent having 2 or more carbon atoms. Further, the total sum of carbon atoms of the substituents represented by $R_1$, $R_2$, $R_3$, $R_4$, $R_5$, $R_6$, $R_7$, $R_8$, $R_{11}$, $R_{12}$, $R_{13}$, $R_{14}$, $R_{15}$, $R_{16}$, $R_{17}$, and $R_{18}$ is 8 or more.

As the substituent which $R_1$, $R_2$, $R_3$, $R_4$, $R_5$, $R_6$, $R_7$, $R_8$, $R_{11}$, $R_{12}$, $R_{13}$, $R_{14}$, $R_{15}$, $R_{16}$, $R_{17}$, and $R_{18}$ may further have, can be enumerated the substituents that $Y_1$ to $Y_4$ and Z in the foregoing general formula (I) can have.

Preferably, the sulfamoyl group represented by $R_{11}$, $R_{12}$, $R_{13}$, $R_{14}$, $R_{15}$, $R_{16}$, $R_{17}$, and $R_{18}$ is a sulfamoyl group having a substituent. Examples of the substituent include an alkyl group and an aryl group.

Preferably, in the substituted sulfamoyl group represented by $R_{11}$, $R_{12}$, $R_{13}$, $R_{14}$, $R_{15}$, $R_{16}$, $R_{17}$, and $R_{18}$, as the group with which the substituent may further be substituted, the groups enumerated above for the substituents $R_1$ to $R_8$ can be enumerated.

M represents a hydrogen atom, a metal element, a metal oxide, a metal hydroxide, or a metal halide. Preferred examples of M are the same as in M of the general formula (I).

In addition, in the phthalocyanine compound represented by the general formula (II), Pc (phthalocyanine ring) may form a dimer (such as Pc-M-L-M-Pc) or a trimer via L (divalent connecting group). At that time, plural Ms that are present may be the same or different.

Preferred examples of the divalent connecting group represented by L include an oxy group (—O—), a thio group (—S—), a carbonyl group (—CO—), a sulfonyl group (—SO$_2$—), an imino group (—NH—), a methylene group (—CH$_2$—), and a combination thereof.

Particularly preferred compounds as the phthalocyanine compound represented by the general formula (II) are those having the following combinations (a) to (d).

(a) Preferably, $R_1$, $R_2$, $R_3$, $R_4$, $R_5$, $R_6$, $R_7$, and $R_8$ each independently represents a hydrogen atom, a halogen atom, or a cyano group, particularly preferably a hydrogen atom or a halogen atom, and most preferably a hydrogen atom.

(b) Preferably, $R_{11}$, $R_{12}$, $R_{13}$, $R_{14}$, $R_{15}$, $R_{16}$, $R_{17}$, and $R_{18}$ each independently represents a hydrogen atom or a substituted sulfamoyl group. Particularly preferably, with respect to each combination of $R_{11}$ and $R_{12}$, $R_{13}$ and $R_{14}$, $R_{15}$ and $R_{16}$, and $R_{17}$ and $R_{18}$, at least either one represents a substituted sulfamoyl group. Most preferably, all of the substituents of the sulfamoyl group have a substituent having 2 or more carbon atoms.

(c) Preferably, M represents Cu, Ni, Zn, or Al, and most preferably Cu.

In the phthalocyanine compound represented by the general formula (II), it is preferred that at least one oleophilic group having 2 or more carbon atoms is present in the molecule thereof. Particularly preferably, the oleophilic group has 3 or more carbon atoms. Most preferably, the total sum of carbon atoms of the oleophilic groups is 8 or more.

In the phthalocyanine compound represented by the general formula (II), in the case where substituents, the sum of carbon atoms of which is 8 or more, are present in one molecule of the phthalocyanine compound, the solubility or dispersibility in an oleophilic medium is particularly good.

Incidentally, with respect to the combination of the preferred substituents of the compound represented by the general formula (II), compounds in which at least one of the various substituents is a preferred group as described above are preferred, those in which more of the various substituents are a preferred group as described above are more preferred, and those in which all of the substituents are a preferred group as described above are most preferred.

Of the phthalocyanine compounds represented by the general formula (II) are more preferable phthalocyanine compounds having a structure represented by the general formula (VI). The phthalocyanine compounds represented by the general formula (VI) according to the invention will be described below in detail.

General formula (VI)

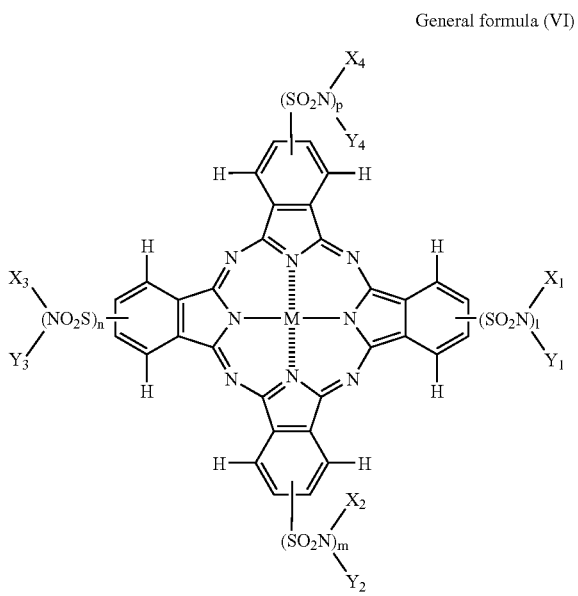

In the general formula (VI), $X_1$, $X_2$, $X_3$, and $X_4$ each independently represents a hydrogen atom, a substituted or unsubstituted alkyl group, a substituted or unsubstituted aryl group, a substituted or unsubstituted cycloalkyl group, a substituted or unsubstituted alkenyl group, a substituted or unsubstituted aralkyl group, a substituted or unsubstituted amino group, or a substituted or unsubstituted heterocyclic group, preferably a hydrogen atom, a substituted or unsubstituted alkyl group, or a substituted or unsubstituted aryl group, and particularly preferably a hydrogen atom.

The alkyl group represented by $X_1$, $X_2$, $X_3$, and $X_4$ includes an alkyl group having a substituent and an unsubstituted alkyl group. As the alkyl group is preferable an alkyl group having from 1 to 12 carbon atoms. Examples of the substituent include a hydroxyl group, an alkoxy group, a cyano group, and a halogen atom. Examples of the alkyl group include methyl, ethyl, butyl, isopropyl, t-butyl, hydroxymethyl, methoxyethyl, cyanoethyl, and trifluoromethyl.

The aryl group represented by $X_1$, $X_2$, $X_3$, and $X_4$ includes an aryl group having a substituent and an unsubstituted aryl group. As the aryl group is preferable an aryl group having from 6 to 12 carbon atoms. Examples of the substituent include an alkyl group, an alkoxy group, a halogen atom, and an alkylamino group. Examples of the aryl group include phenyl, p-tolyl, p-methoxyphenyl, and o-chlorophenyl.

The cycloalkyl group represented by $X_1$, $X_2$, $X_3$, and $X_4$ includes a cycloalkyl group having a substituent and an unsubstituted cycloalkyl group. As the cycloalkyl group is preferable a cycloalkyl group having from 5 to 12 carbon atoms. Examples of the cycloalkyl group include a cyclohexyl group.

The alkenyl group represented by $X_1$, $X_2$, $X_3$, and $X_4$ includes an alkenyl group having a substituent and an unsubstituted alkenyl group. As the alkenyl group is preferable an alkenyl group having from 2 to 12 carbon atoms. Examples of the alkenyl group include a vinyl group and an allyl group.

The aralkyl group represented by $X_1$, $X_2$, $X_3$, and $X_4$ includes an aralkyl group having a substituent and an unsubstituted aralkyl group. As the alkenyl group is preferable an aralkyl group having from 7 to 12 carbon atoms. Examples of the aralkyl group include a benzyl group and a 2-phenethyl group.

The heterocyclic group represented by $X_1$, $X_2$, $X_3$, and $X_4$ includes a heterocyclic group having a substituent and an unsubstituted heterocyclic group. As the heterocyclic group is preferable a 5- or 6-membered heterocyclic group. Examples of the heterocyclic group include a 2-pyridyl group, a 2-thienyl group, and a 2-furyl group.

Examples of the substituent which $X_1$, $X_2$, $X_3$, and $X_4$ may further have are the same as in those of $R_1$, $R_2$, $R_3$, $R_4$, $R_5$, $R_6$, $R_7$, $R_8$, $R_{11}$, $R_{12}$, $R_{13}$, $R_{14}$, $R_{15}$, $R_{16}$, $R_{17}$, and $R_{18}$ in the general formula (II), and preferred examples thereof are also the same.

$Y_1$, $Y_2$, $Y_3$, and $Y_4$ each independently represents a substituted or unsubstituted alkyl group or aryl group.

l, m, n, and p each independently represents an integer of 1 or 2, and particularly preferably 1.

Particularly preferred compounds as the phthalocyanine compound represented by the general formula (VI) are those having the following combinations (a) to (e).

(a) Preferably, $X_1$, $X_2$, $X_3$, and $X_4$ each independently represents a hydrogen atom, a substituted or unsubstituted alkyl group, or a substituted or unsubstituted aryl group, particularly preferably a hydrogen atom or a substituted or unsubstituted alkyl group, and most preferably a hydrogen atom.

(b) Preferably, $Y_1$, $Y_2$, $Y_3$, and $Y_4$ each independently represents a substituted alkyl group or a substituted aryl group, and particularly preferably a sulfo group, a sulfonyl group, a sulfamoyl group, or an acyl group, or a substituted aryl group having such a group as the substituent.

(c) Preferably, l, m, n, and p each represents 1.

(d) Preferably, M represents Cu, Ni, Zn, or Al, and most preferably Cu.

(e) Preferably, at least one of $X_1$, $X_2$, $X_3$, $X_4$, $Y_1$, $Y_2$, $Y_3$, and $Y_4$ represents a substituent having 2 or more carbon atoms, and the total sum of carbon atoms of the substituents represented by $X_1$, $X_2$, $X_3$, $X_4$, $Y_1$, $Y_2$, $Y_3$, and $Y_4$ is 8 or more. Particularly preferably, at least one of $Y_1$, $Y_2$, $Y_3$, and $Y_4$ represents a substituent having 2 or more carbon atoms, and the total sum of carbon atoms of the substituents represented by $X_1$, $X_2$, $X_3$, $X_4$, $Y_1$, $Y_2$, $Y_3$, and $Y_4$ is 8 or more. Most preferably, at least one of $Y_1$, $Y_2$, $Y_3$, and $Y_4$ represents a substituent having 2 or more carbon atoms, and the total sum of carbon atoms of the substituents represented by $X_1$, $X_2$, $X_3$, $X_4$, $Y_1$, $Y_2$, $Y_3$, and $Y_4$ is 10 or more.

Since each of the phthalocyanine compounds represented by the general formulae (II) and (VI) has at least four substituted sulfamoyl groups in the molecule thereof, the solubility or dispersibility in an oleophilic medium is particularly good.

Incidentally, with respect to the combination of the preferred substituents of the compound represented by the general formula (VI), compounds in which at least one of the various substituents is a preferred group as described above are preferred, those in which more of the various substituents are a preferred group as described above are more preferred, and those in which all of the substituents are a preferred group as described above are most preferred.

Of the phthalocyanine compounds represented by the general formula (VI) are more preferable phthalocyanine compounds having a structure represented by the foregoing general formula (X). The phthalocyanine compounds represented by the general formula (X) according to the invention will be described below in detail.

General formula (X)

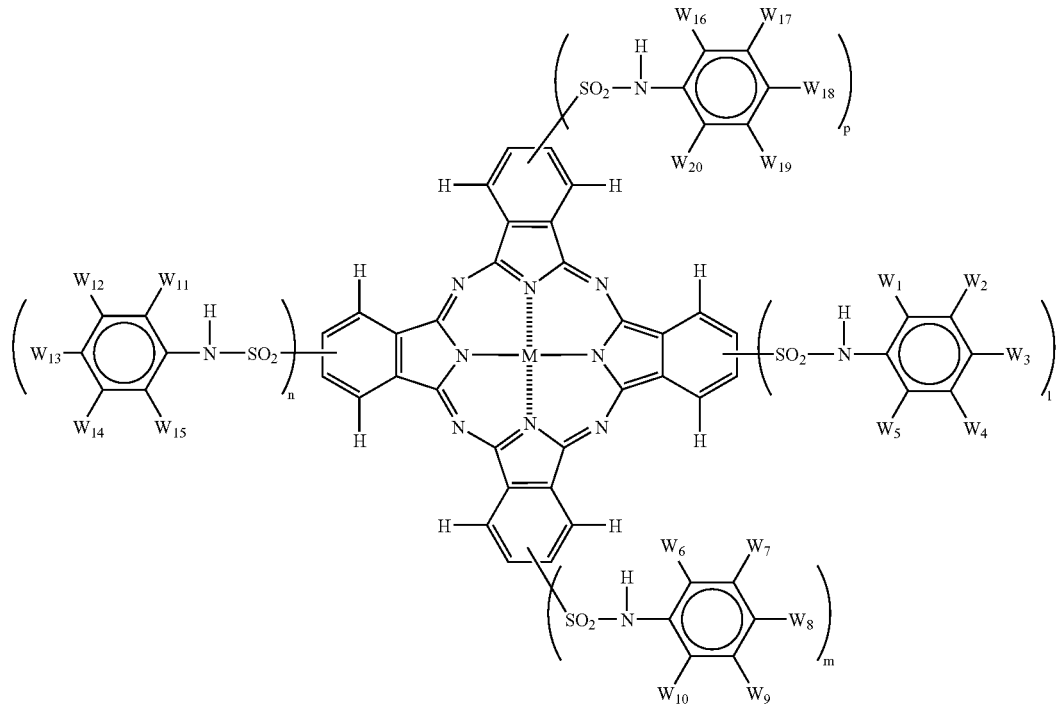

In the general formula (X), $W_1$ to $W_{20}$ each independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amide group, an arylamino group, an ureido group, a sulfamoylamino group, an alkylthio group, an arylthio group, an alkoxycarbonylamino group, a sulfonamide group, a carbamoyl group, a sulfamoyl group, a sulfonyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a sulfinyl group, a phosphoryl group, or an acyl group; and each group may be further substituted.

Of these, a hydrogen atom, a halogen atom, an alkyl group, an aryl group, a heterocyclic group, a cyano group, a hydroxyl group, an alkylamino group, an alkoxy group, an amide group, an arylamino group, a sulfonamide group, a carbamoyl group, a sulfamoyl group, a sulfonyl group, an alkoxycarbonyl group, an acyl group, and an ionic hydrophilic group are preferable; a hydrogen atom, a halogen atom, a cyano group, an alkylamino group, a carbamoyl group, a sulfamoyl group, and a sulfonyl group are more preferable; a hydrogen atom, a halogen atom, an alkylamino group, a sulfamoyl group, and a sulfonyl group are particularly preferable; and a hydrogen atom is most preferable.

However, with respect to each of $W_1$ to $W_5$, $W_6$ to $W_{10}$, $W_{11}$ to $W_{15}$, and $W_{16}$ to $W_{20}$, it is preferred that either one of them is a substituted sulfamoyl group.

M, l, m, n, and p are synonymous with M, l, m, n, and p in the foregoing general formula (VI), and preferred examples of M, l, m, n, and p are also the same.

Particularly referred combinations as the phthalocyanine compound represented by the general formula (X) are as follows.

Preferably, $W_1$ to $W_{20}$ each independently represents a hydrogen atom, a halogen atom, an alkylamino group, an acylamino group (—NHCOR), a sulfonamide group (—NHSO$_2$—R), a carbamoyl group (—CONHR), a sulfamoyl group, a sulfonyl group, or an ionic hydrophilic group, particularly preferably a hydrogen atom, an alkylamino group, an acylamino group (—NHCOR), a sulfonamide group (—NHSO$_2$—R), a carbamoyl group (—CONHR), or a sulfamoyl group, and most preferably a hydrogen atom, a carbamoyl group, or a sulfamoyl group. Incidentally, R in the parentheses represents a substituent.

l, m, n, and p each independently represents an integer of 1 or 2 within the range of $4 \leq (l+m+n+p) \leq 8$, and particularly preferably $4 \leq (l+m+n+p) \leq 6$, with the case where they each independently represents 1 (l=m=n=1) being most preferred.

M preferably represents Cu, Ni, Zn, or Al, particularly preferably Cu, Ni, or Zn, and most preferably Cu.

In the phthalocyanine compound represented by the general formula (X), it is preferred that at least one group of $W_1$ to $W_5$, $W_6$ to $W_{10}$, $W_{11}$ to $W_{15}$, and $W_{16}$ to $W_{20}$ represents a substituent having 2 or more carbon atoms, and the total sum of carbon atoms of the substituents represented by $W_1$ to $W_{20}$ is 8 or more. It is particularly preferred that $W_1$ to $W_5$, $W_6$ to $W_{10}$, $W_{11}$ to $W_{15}$, and $W_{16}$ to $W_{20}$ each independently has a substituent having 2 or more carbon atoms, and the total sum of carbon atoms of the substituents represented by $W_1$ to $W_{20}$ is 8 or more. It is most preferred that $W_1$ to $W_5$, $W_6$ to $W_{10}$, $W_{11}$ to $W_{15}$, and $W_{16}$ to $W_{20}$ each independently has a substituent having 3 or more carbon atoms, and the total sum of carbon atoms of the substituents represented by $W_1$ to $W_{20}$ is 12 or more.

Since the phthalocyanine compound represented by the general formula (X) has at least four substituted sulfamoyl groups in the molecule thereof, the solubility or dispersibility in an oleophilic medium is particularly good.

Incidentally, with respect to the combination of the preferred substituents of the compound represented by the general formula (X), compounds in which at least one of the various substituents is a preferred group as described above are preferred, those in which more of the various substituents are a preferred group as described above are more preferred, and those in which all of the substituents are a preferred group as described above are most preferred.

The compound represented by the general formula (X) is a novel compound having a specific structure, which has not hitherto been known, and is useful as a water-soluble dye for inkjet and an intermediate for synthesis of the water-soluble dye. Also, it is a compound that can be an intermediate for useful chemical, medical and pesticidal organic compounds.

A phthalocyanine compound represented by the following general formula (XX) representing the general formulae (VI), (X) and (X) as the preferred phthalocyanine compound of the invention is synthesized by, for example, reacting a phthalonitrile compound represented by the general formula (XXa) and/or a diiminoisoindoline derivative represented by the general formula (XXb) with a metal derivative represented by M-(Y)$_d$.

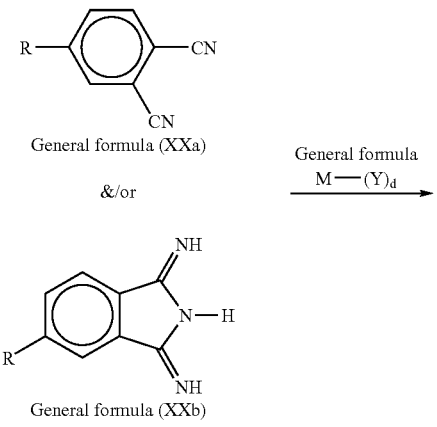

General formula (XXa)

&/or

General formula (XXb)

General formula
M—(Y)$_d$
→

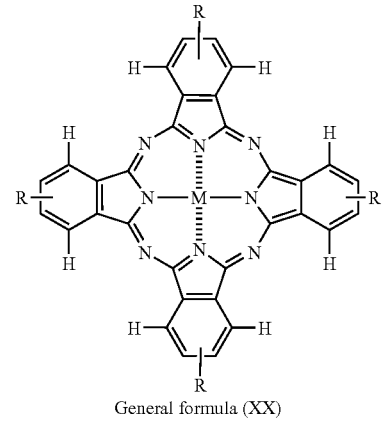

General formula (XX)

In the general formulae (XXa) and (XXb), R represents a substituted sulfamoyl group, and examples of the substituent are the same as the substituents in $X_1$, $X_2$, $X_3$, $X_4$, $Y_1$, $Y_2$, $Y_3$, and $Y_4$ in the explanation for the general formulae (VI) and (X) as described above.

In the general formula (XX), M is the same as M in the foregoing general formulae (II), (VI) and (X). The metal derivative represented by M-(Y)$_d$ is synonymous with that explained for the foregoing general formula (IX).

An amount of the metal derivative and the phthalonitrile compound represented by the general formula (XXa) to be used is preferably from 1:3 to 1:6 in terms of a molar ratio. Further, an amount of the metal derivative and the diiminoisoindoline derivative represented by the general formula (XXb) to be used is preferably from 1:3 to 1:6 in terms of a molar ratio.

The reaction conditions are also the same as in the foregoing general formula (IX), and preferred examples are the same, too.

Specific examples (Illustrative Compounds II-101 to II-145) of the phthalocyanine compound represented by the general formula (II) will be given with reference to the following Table II-1 to Table II-9 while using the following general formula (IX'), it should not be construed that the phthalocyanine compound used in the invention is limited thereto.

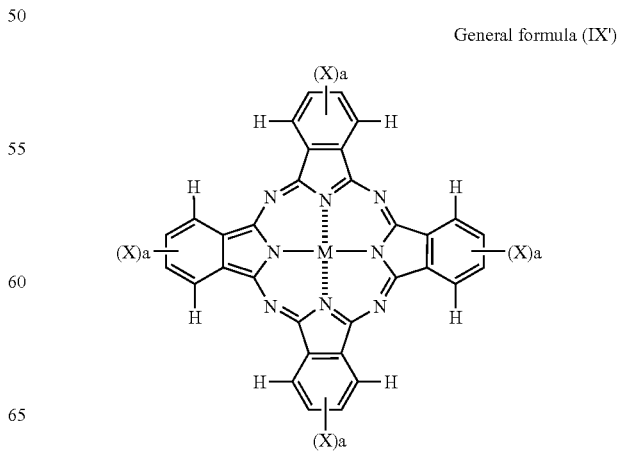

General formula (IX')

TABLE II-1

| Compound No. | M | X | a |
|---|---|---|---|
| II-101 | Cu | —SO$_2$NH—⟨C$_6$H$_4$⟩—C$_8$H$_{17}$(n) | 1 |
| II-102 | Cu | —SO$_2$NH—⟨C$_6$H$_3$(Cl)⟩—SO$_2$NHC$_4$H$_9$(i) | 1 |
| II-103 | Cu | —SO$_2$NH—⟨C$_6$H$_3$(OCH$_3$)⟩—SO$_2$NHC$_3$H$_7$(i) | 1 |
| II-104 | Cu | —SO$_2$NH—⟨C$_6$H$_3$(Cl)⟩—SO$_2$NHCH$_2$CH(C$_2$H$_5$)C$_4$H$_9$(n) | 1 |
| II-105 | Cu | —SO$_2$NH—⟨C$_6$H$_3$(OC$_2$H$_4$OCH$_3$)⟩—SO$_2$NH(CH$_2$)$_3$OCH$_2$CH(C$_2$H$_5$)C$_4$H$_9$(n) | 1 |

TABLE II-2

| Compound No. | M | X | a |
|---|---|---|---|
| II-106 | Cu | —SO$_2$NH—⟨C$_6$H$_3$(morpholino)⟩—SO$_2$NH(CH$_2$)$_3$OC$_2$H$_5$ | 1 |
| II-107 | Cu | —SO$_2$NH—⟨C$_6$H$_4$⟩—SO$_2$C$_3$H$_7$(n) | 1 |
| II-108 | Cu | —SO$_2$NH—⟨C$_6$H$_4$⟩—SO$_2$—⟨C$_6$H$_5$⟩ | 1 |
| II-109 | Cu | —SO$_2$NH—⟨C$_6$H$_4$⟩—SO$_2$NH(CH$_2$)$_3$OC$_{12}$H$_{25}$(n) | 1 |
| II-110 | Cu | —SO$_2$NH—⟨C$_6$H$_2$(Cl)(Cl)⟩—SO$_2$NH(CH$_2$)$_3$OCH$_3$ | 1 |

TABLE II-3

| Compound No. | M | X | a |
|---|---|---|---|
| II-111 | Cu | —SO$_2$NH—(2,6-di-Cl phenyl)—SO$_2$NHC$_4$H$_9$(s) | 1 |
| II-112 | Cu | —SO$_2$NH—(phenyl)—NHCO—(phenyl)—SO$_2$NHC$_3$H$_7$(i) | 1 |
| II-113 | Cu | —SO$_2$NH—(phenyl)—NHSO$_2$—(phenyl)—SO$_2$NHC$_6$H$_{13}$(n) | 1 |
| II-114 | Cu | —SO$_2$NH—(phenyl)—NHCO—(phenyl with CO$_2$C$_5$H$_{11}$(n) and CO$_2$C$_5$H$_{11}$(n)) | 1 |
| II-115 | Cu | —SO$_2$NH—(2,6-di-CH$_3$ phenyl)—SO$_2$NHC$_8$H$_{17}$(t) | 1 |

TABLE II-4

| Compound No. | M | X | a |
|---|---|---|---|
| II-116 | Cu | —SO$_2$NH—(phenyl)—SO$_2$NH—(phenyl with SO$_2$NHC$_3$H$_7$(i) and SO$_2$NHC$_3$H$_7$(i)) | |
| II-117 | Cu | —SO$_2$NH—(phenyl)—SO$_2$NH—(1-C$_4$H$_9$(n), 3-C$_4$H$_9$(t) pyrazol-5-yl) | 1 |
| II-118 | Cu | —SO$_2$NH—(phenyl)—SO$_2$NHC$_4$H$_9$(n) | 1 |

TABLE II-4-continued

| Compound No. | M | X | a |
|---|---|---|---|
| II-119 | Cu | —SO$_2$NH—C$_6$H$_3$(H$_3$CO$_2$S)—SO$_2$NH(CH$_2$)$_3$OC$_2$H$_5$ | 1 |
| II-120 | Cu | —SO$_2$NH—C$_6$H$_3$(NC)—SO$_2$NH(CH$_2$)$_3$OCH$_3$ | 1 |

TABLE II-5

| Compound No. | M | X | a |
|---|---|---|---|
| II-121 | Cu | —SO$_2$NH—C$_6$H$_4$—NHSO$_2$—C$_6$H$_4$(CO$_2$C$_5$H$_{11}$(i)) | 1 |
| II-122 | Cu | —SO$_2$NH—C$_6$H$_4$—NHSO$_2$C$_4$H$_9$(n) | 1 |
| II-123 | Cu | —SO$_2$NH—C$_6$H$_4$—NHSO$_2$C$_8$H$_{17}$(n) | 1 |
| II-124 | Cu | —SO$_2$NH—C$_6$H$_4$—NHCOCH(C$_2$H$_5$)O—C$_6$H$_3$((t)C$_5$H$_{11}$)—C$_5$H$_{11}$(t) | 1 |
| II-125 | Cu | —SO$_2$NH—C$_6$H$_4$—NHCOCH(C$_2$H$_5$)C$_4$H$_9$(n) | 1 |

TABLE II-6

| Compound No. | M | X | a |
|---|---|---|---|
| II-126 | Cu | —SO$_2$NH—C$_6$H$_4$—CONH(CH$_2$)$_3$OCH$_2$CH(C$_2$H$_5$)C$_4$H$_9$(n) | 1 |
| II-127 | Cu | —SO$_2$NH—C$_6$H$_3$(Cl)—CONH(CH$_2$)$_3$OC$_{12}$H$_{25}$(n) | 1 |

TABLE II-6-continued
| Compound No. | M | X | a |
|---|---|---|---|
| II-128 | Cu | 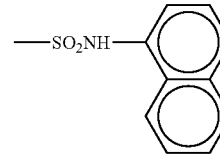 | 1 |
| II-129 | Cu | 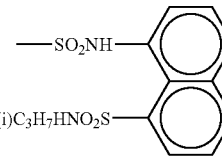 | 1 |
| II-130 | Cu | 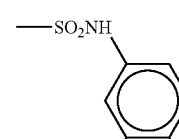 | 1 |
TABLE II-7
| Compound No. | M | X | a |
|---|---|---|---|
| II-131 | Cu | 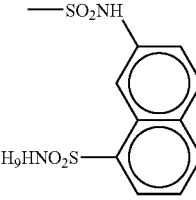 | 1 |
| II-132 | Cu |  | 1 |
| II-133 | Cu | 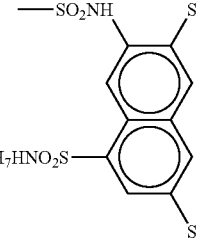 | 1 |
| II-134 | Cu | 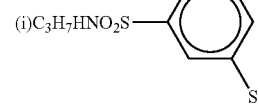 | 1 |
| II-135 | Cu |  | 1 |

TABLE II-8
| Compound No. | M | X | a |
|---|---|---|---|
| II-136 | Ni | 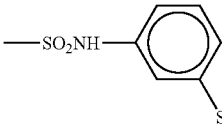 | 1 |
| II-137 | Ni | 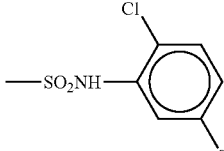 | 1 |
| II-138 | Ni | 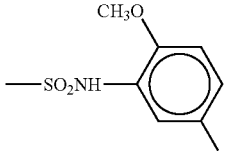 | 1 |
| II-139 | Ni | 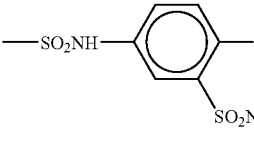 | 1 |
| II-140 | Ni | 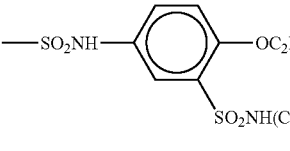 | 1 |
TABLE II-9
| Compound No. | M | X | a |
|---|---|---|---|
| II-141 | Zn | 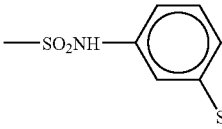 | 1 |
| II-142 | Zn | 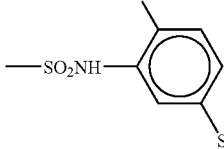 | 1 |

TABLE II-9-continued

| Compound No. | M | X | a |
|---|---|---|---|
| II-143 | Zn | —SO$_2$NH—C$_6$H$_3$(OCH$_3$)(SO$_2$NHC$_3$H$_7$(i)) | 1 |
| II-144 | Zn | —SO$_2$NH—C$_6$H$_3$(Cl)(SO$_2$NHCH$_2$CH(C$_2$H$_5$)C$_4$H$_9$(n)) | 1 |
| II-145 | Zn | —SO$_2$NH—C$_6$H$_3$(OC$_2$H$_4$OCH$_3$)(SO$_2$NH(CH$_2$)$_3$OCH$_2$CH(C$_2$H$_5$)C$_4$H$_9$(n)) | 1 |

Further, specific examples of the phthalocyanine compound of the invention will be given with reference to the following Table II-10 (Illustrative Compounds II-146 to II-150) while using the following general formula (I'), it should not be construed that the phthalocyanine compound used in the invention is limited thereto. Incidentally, in the tables, specific examples of each group of ($X_1$, $X_2$), ($Y_{11}$, $Y_{12}$), ($Y_{13}$, $Y_{14}$), ($Y_{15}$, $Y_{16}$), and ($Y_{17}$, $Y_{18}$) are each independently not in order.

General formula (I')

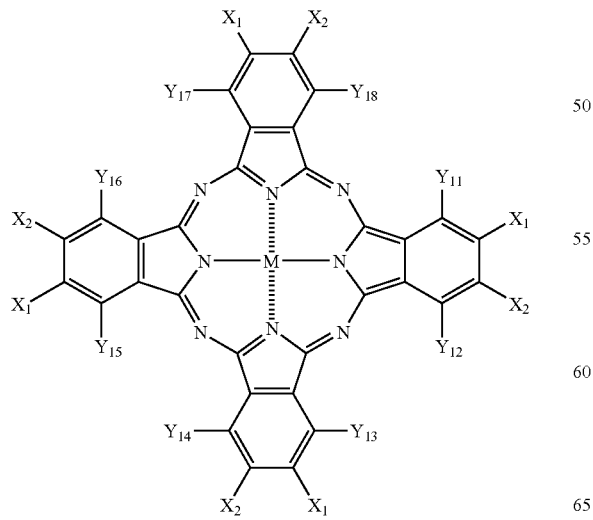

TABLE II-10

| Compound No. | M | X₁ | X₂ | $Y_{11}, Y_{12}$ | $Y_{13}, Y_{14}$ | $Y_{15}, Y_{16}$ | $Y_{17}, Y_{18}$ |
|---|---|---|---|---|---|---|---|
| II-146 | Cu | 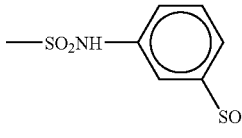 | —Cl | —H, —H | —H, —H | —H, —H | —H, —H |
| II-147 | Cu | 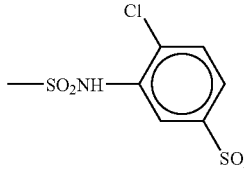 | —H | —Cl, —H | —Cl, —H | —Cl, —H | —Cl, —H |
| II-148 | Cu | 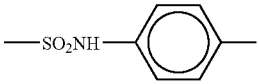 | —Cl | —H, —H | —H, —H | —H, —H | —H, —H |
| II-149 | Cu | 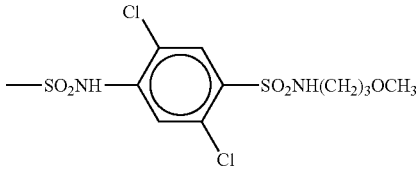 | —Cl | —Cl, —H | —Cl, —H | —Cl, —H | —Cl, —H |
| II-150 | Cu | 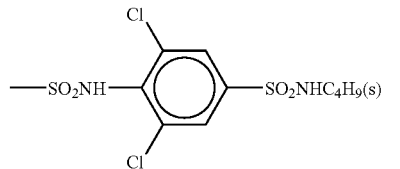 | —Cl | —H, —H | —H, —H | —H, —H | —H, —H |

SYNTHESIS EXAMPLES

The synthesis method of the phthalocyanine compound derivatives of the invention will be described below with reference to the following Synthesis Examples, but it should not be construed that the starting substances, dye intermediates and synthesis routes are limited thereto. Incidentally, λmax means an absorption maximum wavelength, and εmax means a molar absorption coefficient at the absorption maximum wavelength.

Representative phthalocyanine compounds of the invention can be derived from, for example, the following synthesis routes.

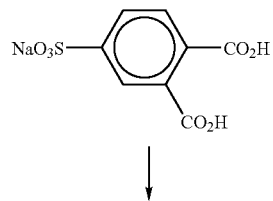
↓
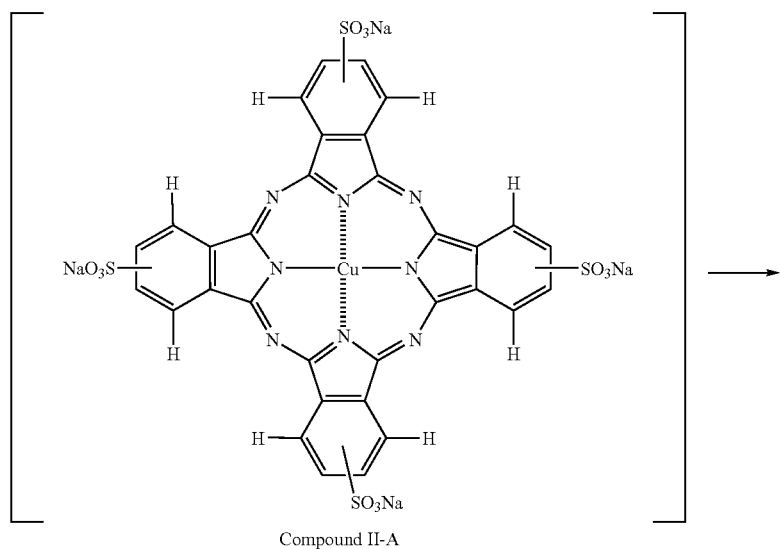
Compound II-A
→
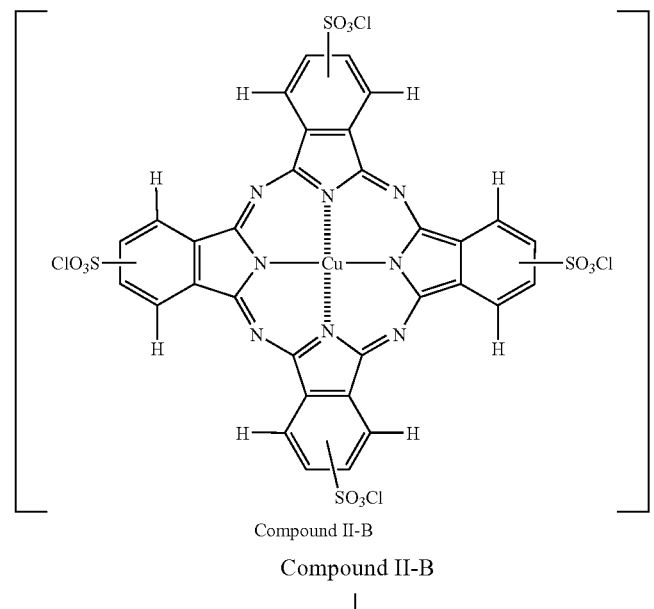
Compound II-B
Compound II-B
↓

-continued
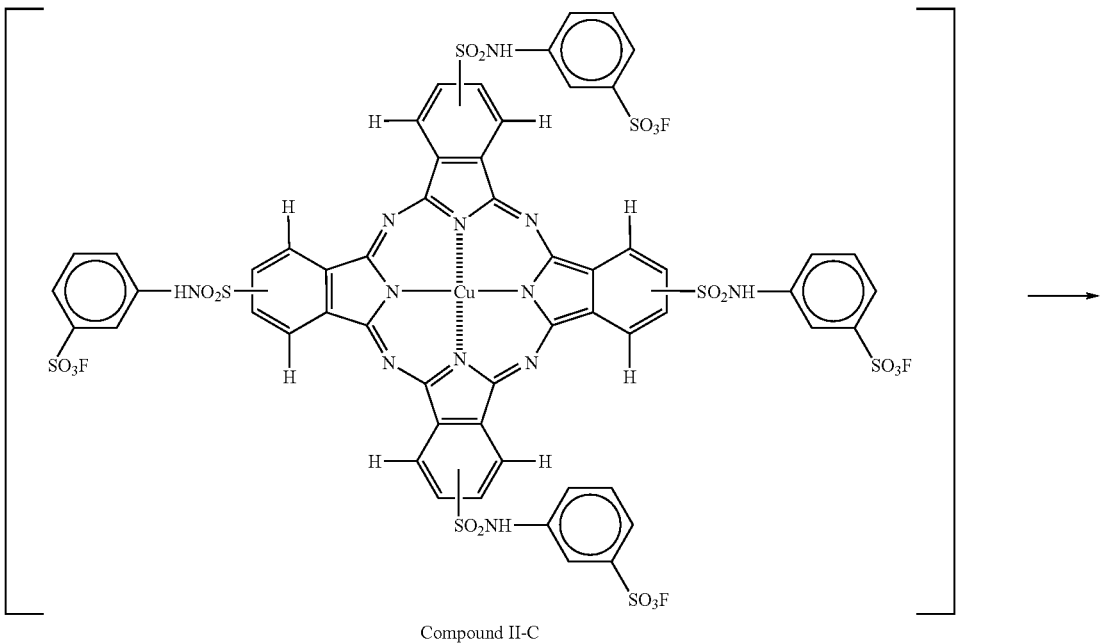
Compound II-C
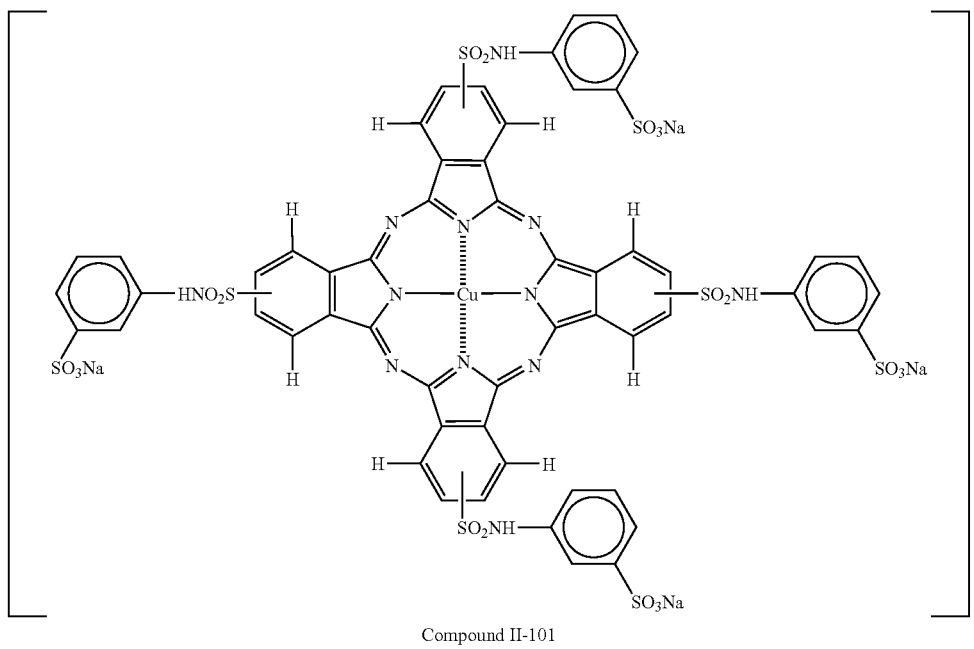
Compound II-101
Compound II-B

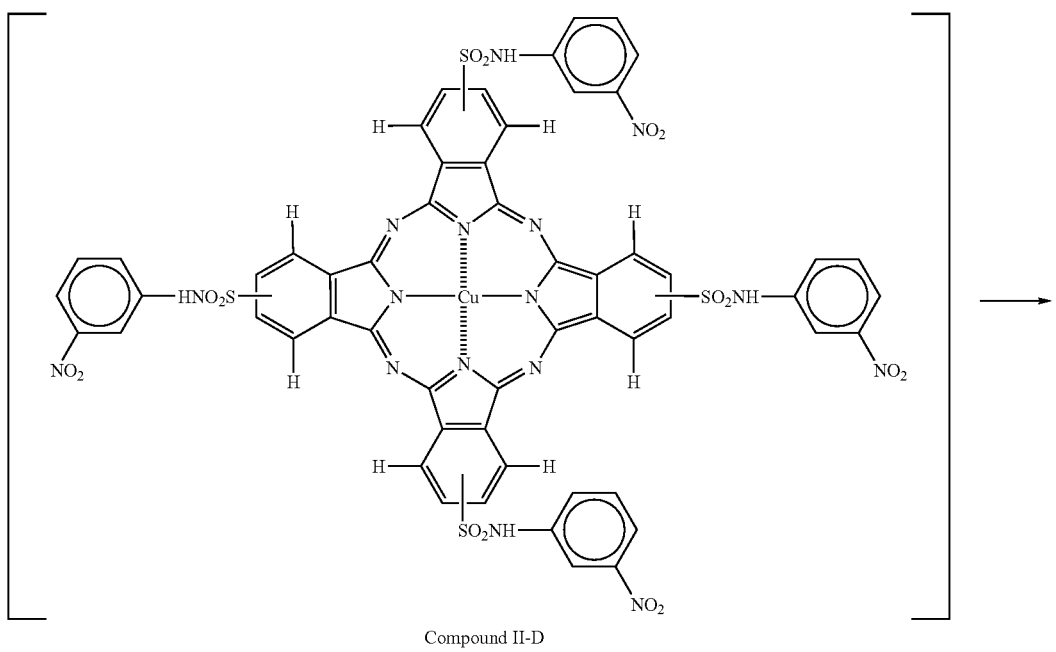
Compound II-D
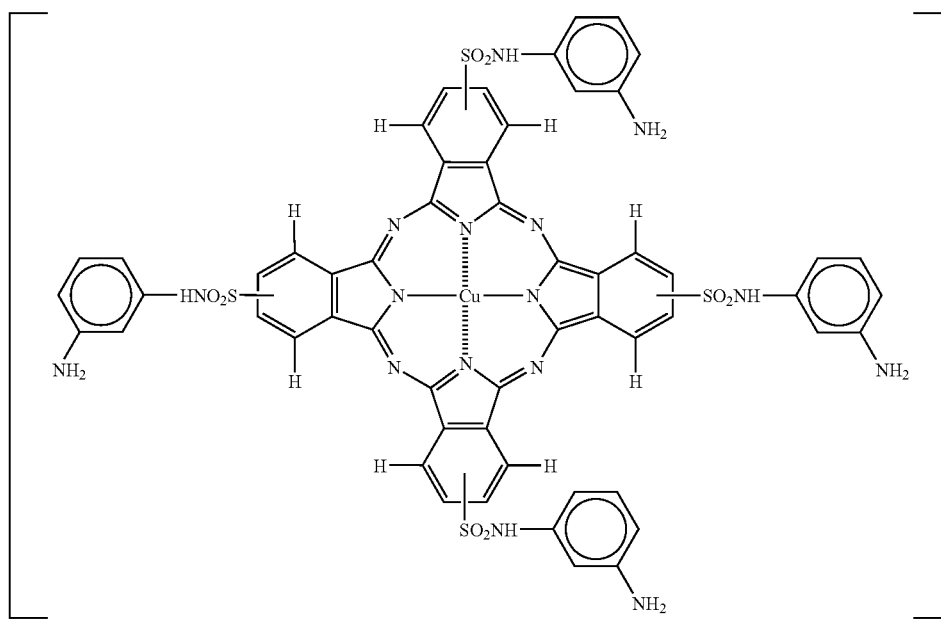
Compound II-E

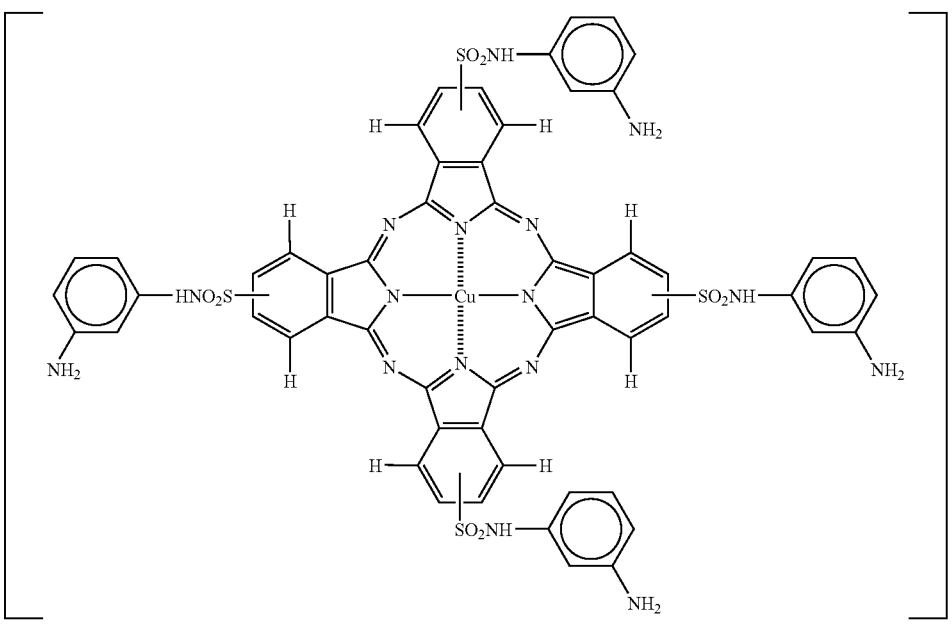
Compound II-E
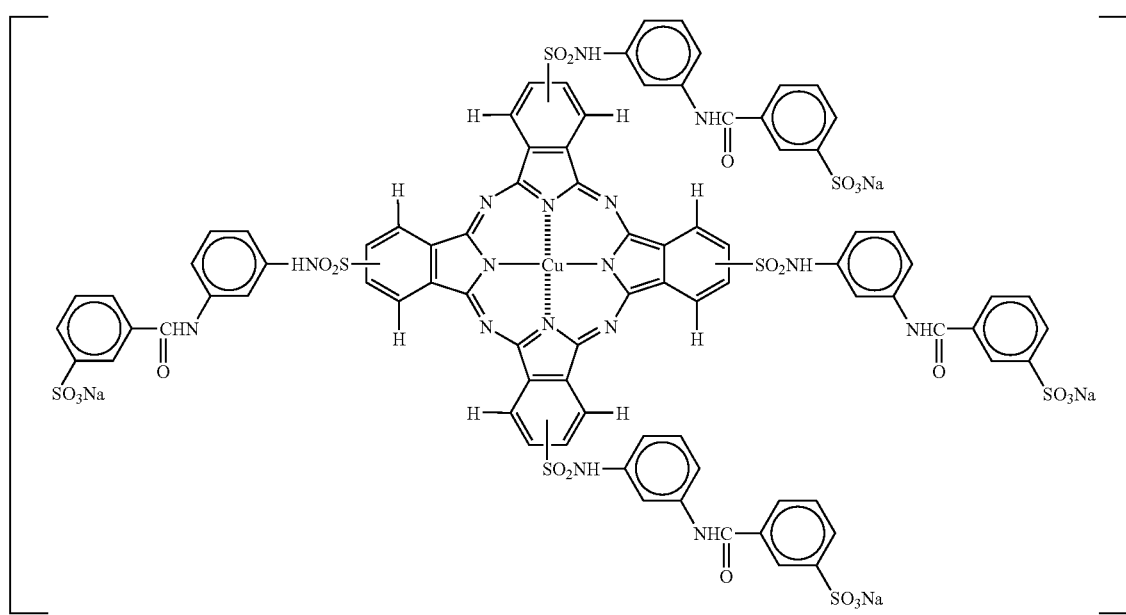
Compound II-110

Synthesis Example II-1

Synthesis of Compound II-A

Nitrobenzene (100 mL) was charged in a three-necked flask equipped with a condenser and elevated to 180° C. over one hour. Then, 43.2 g of sodium 4-sulfophthalate, 4.7 g of ammonium chloride, 58 g of urea, 0.68 g of ammonium molybdate, and 6.93 g of copper(II) chloride were added thereto, and the mixture was stirred at that temperature for 6 hours. After cooling to 40° C., 200 mL of methanol heated at 50° C. was poured into the reaction mixture, and the mixture was stirred while pulverizing formed solids. The obtained dispersion was filtered by a Nutsche filter and washed with 400 mL of methanol. Thereafter, the obtained solids were added to 1,000 mL of an aqueous 1M hydrochloric acid solution saturated with sodium chloride, and the mixture was boiled to dissolve out the unreacted copper salt. After cooling, precipitated solids were filtered by a Nutsche filter and washed with 100 mL of an aqueous salt solution saturated with 1M hydrochloric acid solution. The obtained solids were dissolved in 700 mL of an aqueous 0.1M sodium hydroxide solution. The solution was elevated to 80° C. with stirring, and the stirring was continued at that temperature for an additional one hour. The aqueous solution was filtered under heating to eliminate contaminants, and 270 mL of sodium chloride was gradually added to the filtrate with stirring to undergo salting-out. The salting-out solution was elevated to 80° C. with stirring, and the stirring was continued at that temperature for an additional one hour. After cooling to room temperature, deposited crystals were filtered and washed with 150 mL of 20% salt water. Subsequently, the obtained crystals were added to 200 mL of 80% ethanol and stirred under reflux for one hour. After cooling to room temperature, deposited crystals were filtered and added to 200 mL of an aqueous 60% ethanol solution, followed by stirring under reflux for one hour. After cooling to room temperature, deposited crystals were filtered and washed with 300 mL of ethanol, followed by drying to obtain 29.25 g of Compound II-A as a blue crystal. λmax: 629.9 nm; εmax=6.11×10$^4$ (in aqueous solution).

As a result of analyzing the obtained Compound II-A (mass analysis: ES1-MS, measured by various instrumental analysis methods such as elemental analysis and neutralization titration), it could be confirmed that the substitution position of phthalocyanine copper(II) as defined in this description was of a β-position substitution type [having one sulfo group at the (2- or 3-position), (6- or 7-position), (10- or 11-position), or (14- or 15-position) on each benzene nucleus and four (in total) sulfo groups in one molecule of the phthalocyanine copper].

Synthesis Example II-2

Synthesis of Compound II-B

In a three-necked flask equipped with a condenser was charged 150 mL of chlorosulfonic acid, and 19.0 g of Compound II-A as synthesized above was dividedly added step-by-step with stirring at 30° C. or lower. The stirring was continued at 20° C. for 30 minutes, and 60 g of phosphorus pentoxide was dividedly added step-by-step at 25° C. or lower. The reaction mixture was elevated to 140° C. and stirred at that temperature for 3 hours. After cooling to 80° C., 30 mL of thionyl chloride was added dropwise over 15 minutes. Subsequently, the reaction mixture was lowered to 80° C. and stirred at that temperature for 2 hours. After cooling to 10° C., the reaction mixture was gradually added to a mixture of 1,000 mL of water and 500 g of ice to deposit a desired product as a blue crystal. The temperature in the suspension was kept at 0 to 5° C. by supplementary addition of ice. After stirring at room temperature for an additional one hour, the crystals were filtered by a Nutsche filter and washed with 1,500 mL of cold water. Subsequently, the crystals were washed 150 mL of cold acetonitrile and dried within a desiccator charged with a drying agent in vacuo overnight to obtain 15.6 g of Compound II-B (M.W.: 970.09) as a blue crystal.

As a result of analyzing the obtained Compound II-B, it could be confirmed to be a tetrachlorosulfonyl chloride having a substitution position of phthalocyanine copper(II), as defined in this description, of a β-type. Further, 0.01 parts of the obtained crystals were quenched by 2-ethylhexyloxypropylamine/acetone and then subjected to purity examination (detection wavelength: 254 nm; a 0.1% acetic acid/triethylamine buffer system; THF/H$_2$O=7/3) by HPLC. As a result, the compound had a relative area of 90.95% [examined as the total sum of Cu-Pc-(—SO$_2$NH—R)$_4$ derivatives].

Synthesis Example II-3

Synthesis of Illustrative Compound II-101

4-Octylaniline (6.2 g) was dissolved in 50 mL of DMAc, and 3.0 g of Compound II-B as synthesized above was gradually added thereto for reaction with stirring at an internal temperature of 5° C. After stirring at room temperature for 30 minutes, the reaction mixture was elevated to 55° C. and stirred at that temperature for one hour. After cooling to 20° C., the reaction mixture was poured into 300 mL of water and then stirred at room temperature for 30 minutes. Deposited crude crystals were filtered by a Nutsche filter, washed with 100 mL of cold water, and then dried. The obtained crude crystals were subjected to removal of by-products [such as Cu-Pc-(SO$_3$X)$_m$(SO$_2$NHAr)$_n$ derivatives, wherein (m+n)=4, m≠0] by silica gel column chromatography (CH$_2$Cl$_2$/THF), to obtain 4.1 g of Illustrative Compound II-101. λmax: 628.5 nm; εmax=1.84×10$^5$ (in DMF).

Synthesis Example II-4

Synthesis of Illustrative Compound II-101 by Another Method

Using the following Compound (F) as a starting material, a Cu-Pc-{SO$_2$NH—(4-octylphenyl)}$_4$ derivative of a β-position substitution type was synthesized under the reaction conditions as described in detail.

As a result of analyzing the obtained compound, it was found that the compound was a derivative of a β-position substitution type as defined in this description, having four (in total) substituted sulfamoyl groups in one molecule of phthalocyanine copper, with a mixture distribution of the substitution positions [having one 4-octylphenyl group at the (2- or 3-position), (6- or 7-position), (10- or 11-position), or (14- or 15-position) on each benzene nucleus] being slightly different, however, and was the same as the compound synthesized in Synthesis Example II-3. (Clearly, what the compounds synthesized in Synthesis Example II-3 and Synthesis Example II-4 are the same phthalocyanine copper (II) of a β-position substitution type is within the range of a common knowledge in the organic synthesis.)

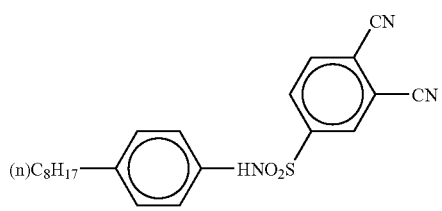

Compound F

SYNTHESIS EXAMPLES OF COMPARATIVE COMPOUNDS

Comparative Example II-1

(a) Synthesis of Comparative Compound II-1

A three-necked flask equipped with a condenser was charged with 150 mL of chlorosulfonic acid, and 25.0 g of phthalocyanine copper was dividedly added step-by-step while keeping a temperature not exceeding 20° C. (cooling was carried out at the same time because of heat generation).

Next, the mixture was elevated to 100° C. over one hour and further elevated to 135° C. over an additional one hour, and was stirred at that temperature for 4 hours until the generation of gases terminated. After cooling to 75° C., 30 mL of thionyl chloride was added dropwise to the reaction mixture over 30 minutes. Subsequently, the reaction mixture was elevated to 80° C. and stirred at that temperature for 2 hours, followed by cooling to 10° C.

Next, the reaction mixture was gradually added to a mixture of 1,500 mL of water and 500 g of ice to deposit a desired product as a blue crystal. The temperature in the suspension was kept at 0 to 5° C. by supplementary addition of ice. After stirring at room temperature for an additional one hour, the crystals were filtered by a Nutsche filter and washed with 2,500 mL of cold water. Subsequently, the crystals were washed with 100 mL of cold acetonitrile and dried within a desiccator charged with a drying agent in vacuo overnight to obtain 35.5 g of Comparative Compound II-1 as shown below as a blue crystal.

As a result of analyzing the obtained compound, it could be confirmed that the compound was of an α,β-positions-mixed substitution type of phthalocyanine copper(II) as defined in this description and was a sulfonyl chloride of a mixture of di-, tri- and tetra-compounds in terms of the number of substitutions. Further, 0.01 parts of the obtained crystals were quenched by 2-ethylhexyloxypropylamine/acetone and then subjected to purity examination (detection wavelength: 254 nm; a 0.1% acetic acid/triethylamine buffer system; THF/$H_2O$=7/3) by HPLC. As a result, the compound had a relative area of 80.52% [examined as the total sum of Cu-Pc(—$SO_2$NH—R)$_n$ derivatives].

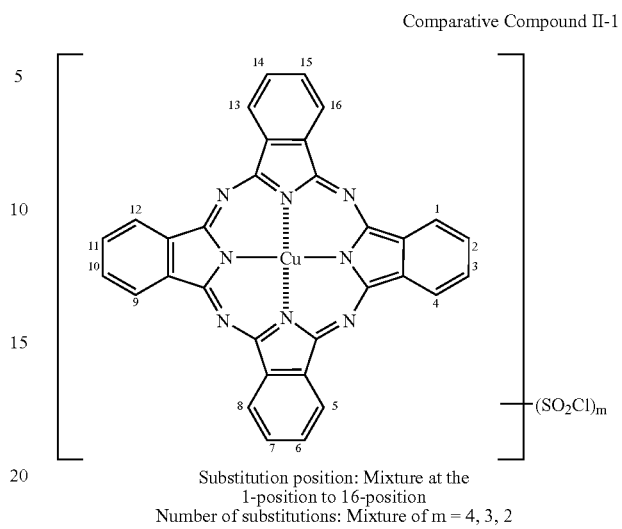

Comparative Compound II-1

Substitution position: Mixture at the 1-position to 16-position
Number of substitutions: Mixture of m = 4, 3, 2

(b) Synthesis of Comparative Compound II-2

Comparative Compound II-2 was synthesized in accordance with a method as described in, for example, JP-A-10-130517, WO 00/08101, and WO 00/08103. As a result of analyzing the obtained compound, it could be confirmed that any of Comparative Compound II-1 as synthesized as the described method (the synthesis method of Comparative Example 1) and Comparative Compound 11-2 were of an α,β-positions-mixed substitution type of phthalocyanine copper(II) as defined in this description and were a sulfonyl chloride of a mixture of di-, tri- and tetra-compounds in terms of the number of substitutions, though (1) a mixture distribution of the substitution positions was slightly different, (2) a mixture distribution of the number of substitutions (2-substituted material, 3-substituted material, and 4-substituted material) was slightly different, and (3) there was a difference in purity as the sulfonyl chloride [examined as the total sum of Cu-Pc(—$SO_2$NH—R)$_n$ derivatives], as compared with Comparative Compound II-1.

(c) Synthesis of Comparative Compound II-3

Using, as a starting material, the following Compound (G) as synthesized in accordance with a method as described in, for example, JP-A-10-204053, a phthalocyanine copper (II) derivative of an α-position substitution type as shown below was synthesized under the reaction conditions as described in detail in the above-cited patent. As a result of analyzing the obtained compound, it could be found that the substitution position of phthalocyanine copper(II) as defined in this description was of an α-position substitution type [having one sulfo group at the (1- or 4-position), (5- or 8-position), (9- or 12-position), or (13- or 16-position) on each benzene nucleus and four (in total) sulfo groups in one molecule of phthalocyanine copper].

Compound G

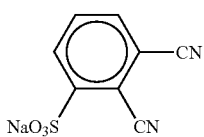

Comparative Compound II-3

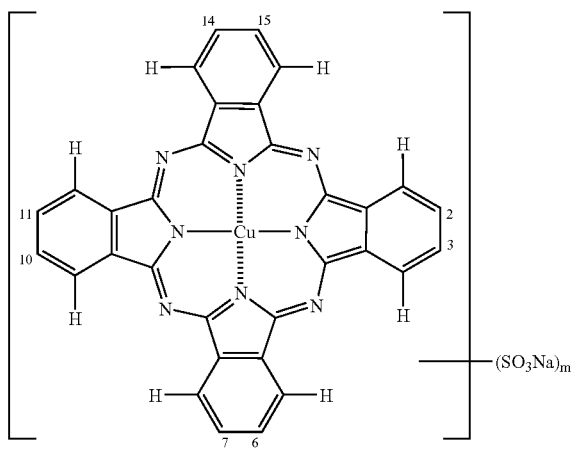

Number of substitutions: Mixture of m = 4, 3, 2

(d) Synthesis of Comparative Compound II-4

Using the foregoing Comparative Compound II-2 as a starting material, the same procedures as in Synthetic Example II-3 were followed to obtain Comparative Example II-4 (a comparative compound with Illustrative Example II-101 derivative) as shown below.

in detail. Incidentally, since the phthalocyanine compound is oil-soluble, it does not have an ionic hydrophilic group within the molecule thereof.

In the general formula (III), $R_1$, $R_2$, $R_3$, $R_4$, $R_5$, $R_6$, $R_7$, and $R_8$ are synonymous with those in the foregoing general formula (II), and preferred examples are the same.

$Z_1$, $Z_2$, $Z_3$, and $Z_4$ each independently represents a substituted or unsubstituted heterocyclic group. At least one of $Z_1$, $Z_2$, $Z_3$, $Z_4$, $R_1$, $R_2$, $R_3$, $R_4$, $R_5$, $R_6$, $R_7$, and $R_8$ represents a substituent having 2 or more carbon atoms, and the total sum of carbon atoms of the substituents further substituted in $Z_1$, $Z_2$, $Z_3$, $Z_4$, $R_1$, $R_2$, $R_3$, $R_4$, $R_5$, $R_6$, $R_7$, and $R_8$ is 8 or more.

l, m, n, and p each independently represents an integer of 1 or 2.

M represents a hydrogen atom, a metal element, a metal oxide, a metal hydroxide, or a metal halide.

As the substituent which $Z_1$, $Z_2$, $Z_3$, and $Z_4$ may further have, can be enumerated the substituents that $R_1$ to $R_8$ in the foregoing general formula (II) can have, and preferred examples are the same, too.

The heterocyclic groups represented by $Z_1$, $Z_2$, $Z_3$, and $Z_4$ may be each independently a saturated heterocyclic group or an unsaturated heterocyclic group. Further, the heterocyclic groups represented by $Z_1$, $Z_2$, $Z_3$, and $Z_4$ may be each independently taken with other ring to form a condensed ring.

Preferred examples of the heterocyclic groups represented by $Z_1$, $Z_2$, $Z_3$, and $Z_4$ and condensed ring groups thereof, in which the substitution position of the heterocyclic group is not limited, include an imidazole group, a benzimidazole group, a pyrazole group, a benzopyrazole group, a triazole group, a thiazole group, a b nzothiazole group, an isothiazole group, a benzoisothiazole group, an oxazole group, a benzoxazole group, a thiadiazole group, a pyrrole group, a benzopyrrole group, an indole group, an isoxazole group, a benzoisoxazole group, a thiophene group, a benzothiophene group, a furan group, a benzofuran group, a pyridine group, a quinoline group, an isoquinoline group, a pyridazine group, a primidine group, a pyrazine group, a cinnoline group, a phthalazine group, a quinazoline group, and a quinoxaline group.

Comparative Compound II-4

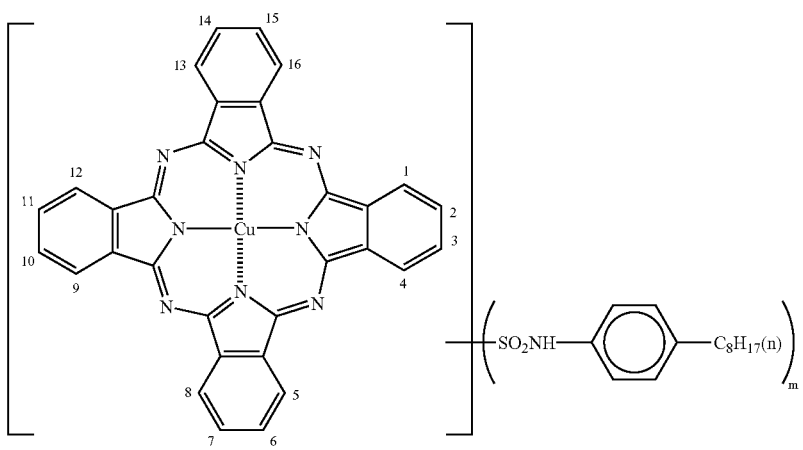

Substitution position: Mixture at the 1-position to 16-postition
Number of substitutions: Mixture of m = 4, 3, 2

[Phthalocyanine Compound]

In addition, the phthalocyanine compound represented by the general formula (III) of the invention will be described Preferred examples of the heterocyclic rings represented by $Z_1$, $Z_2$, $Z_3$, and $Z_4$ and condensed ring groups thereof are 5- to 6-membered nitrogen-containing heterocyclic groups (which may be further taken with other ring to form a condensed ring). However, in the case where $W_1$, $W_2$, $W_3$, and $W_4$ each independently represents a 6-membered nitrogen-containing hetero ring or forms a condensed ring between the hetero ring and other ring, the number of nitrogen atoms constituting the 6-membered nitrogen-containing hetero ring is one or two (exclusive of those having a number of nitrogen atoms constituting the 6-membered nitrogen-containing hetero ring of 3 or more, such as a triazine ring).

More preferred examples of the 5- to 6-memberd nitrogen-containing heterocyclic rings represented by $Z_1$, $Z_2$, $Z_3$, and $Z_4$ and condensed ring groups thereof, in which the substitution position of the hetero ring is not limited, include an imidazole group, a benzimidazole group, a pyrazole group, a benzopyrazole group, a triazole group, a thiazole group, a benzothiazole group, an isothiazole group, a benzoisothiazole group, an oxazole group, a benzoxazole group, a thiadiazole group, a pyrrole group, a benzopyrrole group, an indole group, an isoxazole group, a benzoisoxazole group, a pyridine group, a quinoline group, an isoquinoline group, a pyridazine group, a primidine group, a pyrazine group, a cinnoline group, a phthalazine group, and a quinazoline group, and further preferably an imidazole group, a benzimidazole group, a pyrazole group, a benzopyrazole group, a triazole group, a thiazole group, a benzothiazole group, an isothiazole group, a benzoisothiazole group, an oxazole group, a benzoxazole group, a thiadiazole group, a pyrrole group, a benzopyrrole group, an indole group, an isoxazole group, and a benzoisoxazole group. Of these are most preferable a pyrazole group, a triazole group, a benzothiazole group, and a benzoisothiazole group.

In the hetero rings represented by $Z_1$, $Z_2$, $Z_3$, and $Z_4$ and condensed rings thereof, the rings that can be further substituted may be additionally substituted with the foregoing group as the substituent that each of $R_1$, $R_2$, $R_3$, $R_4$, $R_5$, $R_6$, $R_7$, and $R_8$ can have.

M represents a hydrogen atom, a metal element, a metal oxide, a metal hydroxide, or a metal halide. Preferred examples of M are the same as in M in the foregoing general formula (I).

In addition, in the phthalocyanine compound represented by the general formula (III), Pc (phthalocyanine ring) may form a dimer (such as Pc-M-L-M-Pc) or a trimer via L (divalent connecting group). At that time, plural Ms that are present may be the same or different.

Preferred examples of the divalent connecting group represented by L include an oxy group (—O—), a thio group (—S—), a carbonyl group (—CO—), a sulfonyl group (—SO$_2$—), an imino group (—NH—), a methylene group (—CH$_2$—), and a combination thereof.

l, m, n, and p each independently represents an integer of 1 or 2 within the range of $4 \leq (l+m+n+p) \leq 8$, and particularly preferably $4 \leq (l+m+n+p) \leq 6$, with the case where they each independently represents 1 (l=m=n=p=1) being most preferred.

As the phthalocyanine compound represented by the general formula (III) are preferable the following combinations.

(a) $R_1$, $R_2$, $R_3$, $R_4$, $R_5$, $R_6$, $R_7$, and $R_8$ each independently represents a hydrogen atom, a halogen atom, or a cyano group, particularly preferably a hydrogen atom or a halogen atom, and most preferably a hydrogen atom.

(b) (1) At least one of hetero rings represented by $Z_1$, $Z_2$, $Z_3$, and $Z_4$ and condensed rings thereof is a hetero ring having a substituent having 2 or more carbon atoms or a condensed ring thereof.

(2) At least one of $Z_1$, $Z_2$, $Z_3$, $Z_4$, $R_1$, $R_2$, $R_3$, $R_4$, $R_5$, $R_6$, $R_7$, and $R_8$ represents a substituent having 2 or more carbon atoms, and the total sum of carbon atoms of the substituents substituted in $Z_1$, $Z_2$, $Z_3$, $Z_4$, $R_1$, $R_2$, $R_3$, $R_4$, $R_5$, $R_6$, $R_7$, and $R_8$ is 8 or more; or (3) At least one of $Z_1$, $Z_2$, $Z_3$, and $Z_4$ represents a substituent having 2 or more carbon atoms, and the total sum of carbon atoms of the substituents substituted in $Z_1$, $Z_2$, $Z_3$, and $Z_4$ is 8 or more.

(4) More preferably, at least one of $Z_1$, $Z_2$, $Z_3$, and $Z_4$ represents a substituent having 2 or more carbon atoms, and the total sum of carbon atoms of the substituents substituted in $Z_1$, $Z_2$, $Z_3$, and $Z_4$ is 10 or more; or at least one of $Z_1$, $Z_2$, $Z_3$, and $Z_4$ represents a substituent having 3 or more carbon atoms, and the total sum of carbon atoms of the substituents substituted in $Z_1$, $Z_2$, $Z_3$, and $Z_4$ is 10 or more.

(c) The hetero rings represented by represented by $Z_1$, $Z_2$, $Z_3$, and $Z_4$ and condensed rings thereof, in which the substitution position of the hetero ring is not limited, are each an imidazole group, a benzimidazole group, a pyrazole group, a benzopyrazole group, a triazole group, a thiazole group, a benzothiazole group, an isothiazole group, a benzoisothiazole group, an oxazole group, a benzoxazole group, a thiadiazole group, a pyrrole group, a benzopyrrole group, an indole group, an isoxazole group, or a benzoisoxazole group, with a pyrazole group, a triazole group, a benzothiazole group, and a benzoisothiazole group being most preferred.

(d) l, m, n, and p each independently represents an integer of 1 or 2, and particularly preferably 1.

(e) M represents a hydrogen atom, a metal element, a metal oxide, a metal hydroxide, or a metal halide, particularly preferably Cu, Ni, Zn, Al, and most preferably Cu.

Of the phthalocyanine compounds represented by the general formula (III) are more preferable phthalocyanine compounds having a structure represented by the foregoing general formula (VII). The phthalocyanine compounds represented by the general formula (VII) of the invention will be described in detail.

In the general formula (VII), $Z_1$, $Z_2$, $Z_3$, $Z_4$, l, m, n, p, and M are each synonymous with $Z_1$, $Z_2$, $Z_3$, $Z_4$, l, m, n, p, and M in the foregoing general formula (III), and preferred examples thereof are also the same.

Of the phthalocyanine compounds represented by the general formula (VII), particularly preferred combinations of the substituents are the same as the particularly preferred combinations of the substituents in the foregoing general formula (III). Incidentally, with respect to the combination of the preferred substituents of the compound represented by the general formula (VII), compounds in which at least one of the various substituents is a preferred group as described above are preferred, those in which more of the various substituents are a preferred group as described above are more preferred, and those in which all of the substituents are a preferred group as described above are most preferred.

Of the phthalocyanine compounds represented by the general formula (VII) are more preferable phthalocyanine compounds having a structure represented by the foregoing general formula (XI). The phthalocyanine compounds represented by the general formula (XI) according to the invention will be described below in detail.

$W_1$, $W_2$, $W_3$, and $W_4$ each independently represents an atomic group necessary for forming a 5- to 6-membered nitrogen-containing heterocyclic ring or a condensed ring of the heterocyclic ring with other ring. However, in the case where $W_1$, $W_2$, $W_3$, and/or $W_4$ is an atomic group for forming a 6-membered nitrogen-containing heterocyclic ring or a condensed ring of the heterocyclic ring with other ring, the number of nitrogen atoms constituting the 6-membered heterocyclic ring or the condensed ring is 1 or 2, provided that rings having a number of nitrogen atoms constituting the 6-membered nitrogen-containing h tero ring of 3 or more, such as a triazine ring, are excluded.

M is synonymous with M in the general formula (VII).

In the general formula (XI), preferred examples of the hetero rings represented by represented by $W_1$, $W_2$, $W_3$, and $W_4$ and condensed rings thereof include an imidazole group, a benzimidazole group, a pyrazole group, a benzopyrazole group, a triazole group, a thiazole group, a benzothiazole group, an isothiazole group, a benzoisothiazole group, an oxazole group, a benzoxazole group, a thiadiazole group, a pyrrole group, a benzopyrrole group, an indole group, an isoxazole group, a benzoisoxazole group, a pyridine group, a quinoline group, an isoquinoline group, a pyridazine group, a pyrimidine group, a pyradine group, a cinnoline group, a phthalazine group, and a quinazoline group, and more preferably an imidazole group, a benzimidazole group, a pyrazole group, a benzopyrazole group, a triazole group, a thiazole group, a benzothiazole group, an isothiazole group, a benzoisothiazole group, an oxazole group, a benzoxazole group, a thiadiazole group, a pyrrole group, a benzopyrrole group, an indole group, an isoxazole group, and a benzoisoxazole group, and most preferably a pyrazole group, a triazole group, a benzothiazole group, and a benzoisothiazole group.

When the phthalocyanine compound represented by the general formula (XI) has at least one, and preferably four substituents having 2 or more carbon atoms in the molecular thereof, the solubility or dispersibility in an oleophilic medium is good.

M is preferably Cu, Ni, Zn, or Al, particularly preferably Cu, Ni, or Zn, and most preferably cu.

In the phthalocyanine compounds represented by the general formula (XI), as a particularly preferred combination of the substituents, the 5- to 6-membered nitrogen-containing hetero rings represented by represented by $W_1$, $W_2$, $W_3$, and $W_4$ and condensed rings thereof each independently represents an imidazole group, a benzimidazole group, a pyrazole group, a benzopyrazole group, a triazole group, a thiazole group, a benzothiazole group, an isothiazole group, a benzoisothiazole group, an oxazole group, a benzoxazole group, a thiadiazole group, a pyrrole group, a benzopyrrole group, an indole group, an isoxazole group, or a benzoisoxazole group, with a pyrazole group, a triazole group, a benzothiazole group, and a benzoisothiazole group being preferred.

In the phthalocyanine compounds represented by the general formula (XI), it is preferred that at least one of the 5- to 6-membered nitrogen-containing hetero rings formed from $W_1$, $W_2$, $W_3$, and $W_4$, and the condensed rings thereof has a substituent having 2 or more carbon atoms, and the total sum of carbon atoms of the substituents that $W_1$, $W_2$, $W_3$, and $W_4$ have is 8 or more. Particularly preferably, $W_1$, $W_2$, $W_3$, and $W_4$ each independently has a substituent having 2 or more carbon atoms, and the total sum of carbon atoms of the substituents is 8 or more. Most preferably, each of $W_1$, $W_2$, $W_3$, and $W_4$ has a substituent having 3 or more carbon atoms, and the total sum of carbon atoms of the substituents is 12 or more.

Incidentally, with respect to the combination of the preferred substituents of the compound represented by the general formula (XI), compounds in which at least one of the various substituents is a preferred group as described above are preferred, those in which more of the various substituents are a preferred group as described above are more preferred, and those in which all of the substituents are a preferred group as described above are most preferred.

The compound represented by the general formula (III) of the invention can be synthesized in the same manner as in the reaction in the foregoing general formula (XX).

An amount of the metal derivative and the phthalonitrile compound represented by the general formula (XXa) to be used is preferably from 1:3 to 1:6 in terms of a molar ratio. Further, an amount of the metal derivative and the diiminoisoindoline derivative represented by the general formula (XXb) to be used is preferably from 1:3 to 1:6 in terms of a molar ratio.

Specific examples (Illustrative Compounds III-101 to III-145) of the phthalocyanine compound represented by the general formula (III) will be given with reference to the following Table III-1 to Table III-9 while using the following general formula (IX'), it should not be construed that the phthalocyanine compound used in the invention is limited thereto.

General formula (IX')

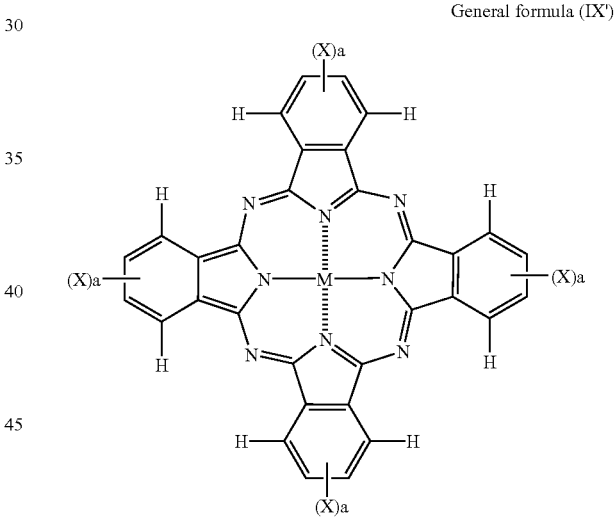

TABLE III-1

| Compound No. | M | X | a |
|---|---|---|---|
| III-101 | Cu | NC—⟨pyrazole with SO₂NH—, N-(2,4-Cl₂-phenyl with CO₂C₂H₅)⟩ | 1 |

TABLE III-1-continued

| Compound No. | M | X | a |
|---|---|---|---|
| III-102 | Cu | 1-(2,6-dichloro-4-(n-octylsulfamoyl)phenyl)-4-bromo-pyrazol-5-yl-sulfonamide | 1 |
| III-103 | Cu | 1-(2,5-dichloro-4-(2-ethylhexylsulfamoyl)phenyl)-3-isopropyl-pyrazol-5-yl-sulfonamide | 1 |
| III-104 | Cu | 1-(2,6-dichloro-4-(2-ethylhexylsulfamoyl)phenyl)-4-cyano-3-methyl-pyrazol-5-yl-sulfonamide | 1 |
| III-105 | Cu | 1-(2-(n-butylsulfamoyl)-4-(n-butylsulfamoyl)phenyl)-3-methyl-pyrazol-5-yl-sulfonamide | 1 |

TABLE III-2

| Compound No. | M | X | a |
|---|---|---|---|
| III-106 | Cu | 1-(3,5-bis(isopropylsulfamoyl)phenyl)-3-tert-butyl-pyrazol-5-yl-sulfonamide | 1 |
| III-107 | Cu | 1-(2,6-dichloro-4-(2-ethylhexyloxycarbonyl)phenyl)-3-phenyl-pyrazol-5-yl-sulfonamide | 1 |
| III-108 | Cu | 1-(2,4-bis(n-octylsulfamoyl)phenyl)-3-methylthio-1,2,4-triazol-5-yl-sulfonamide | 1 |
| III-109 | Cu | 3-(2-(i-butylsulfamoyl)ethylthio)-1,3,4-thiadiazol-5-yl-sulfonamide | 1 |
| III-110 | Cu | 2-(2-(n-butylsulfamoyl)ethylthio)-1,3,4-thiadiazol-5-yl-sulfonamide | 1 |

TABLE III-3

| Compound No. | M | X | a |
|---|---|---|---|
| III-111 | Cu | —SO$_2$NH-[thiazole with H at 4-position]-SC$_2$H$_4$SO$_2$N(C$_2$H$_5$)$_2$ | 1 |
| III-112 | Cu | —SO$_2$NH-[benzisothiazole]-SO$_2$NHC$_6$H$_{13}$(s) | 1 |
| III-113 | Cu | —SO$_2$NH-[benzothiazole]-SO$_2$NHC$_6$H$_{13}$(n) | 1 |
| III-114 | Cu | —SO$_2$NH-[thiazole with H at 5-position]-C$_3$H$_6$SO$_2$NHC$_3$H$_7$(i) | 1 |
| III-115 | Cu | —SO$_2$NH-[imidazole with H substituents]-N(CH$_2$)$_4$SO$_2$NH(CH$_2$)$_3$OCH$_2$CHC$_5$H$_9$(n) with C$_2$H$_5$ branch | 1 |

TABLE III-4

| Compound No. | M | X | a |
|---|---|---|---|
| III-116 | Cu | —SO$_2$NH-[pyrrole with NC and phenyl substituents]-N(CH$_2$)$_4$SO$_2$NHC$_8$H$_{17}$(t) | 1 |
| III-117 | Cu | —SO$_2$NH-[pyridine]-NHSO$_2$-[phenyl]-SO$_2$NHC$_3$H$_7$(i) | 1 |
| III-118 | Cu | —SO$_2$NH-[pyrazine]-NHCO-[phenyl]-SO$_2$NHC$_4$H$_9$(i) | 1 |

TABLE III-4-continued
| Compound No. | M | X | a |
|---|---|---|---|
| III-119 | Cu | 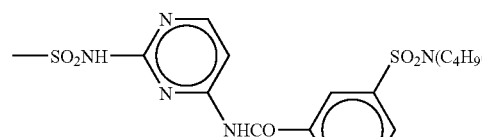 | 1 |
| III-120 | Cu | 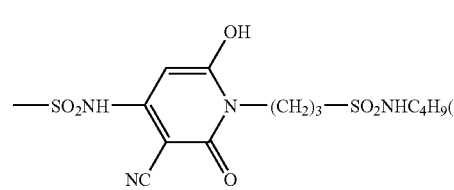 | 1 |
TABLE III-5
| Compound No. | M | X | a |
|---|---|---|---|
| III-121 | Cu | 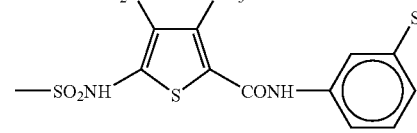 | 1 |
| III-122 | Cu | 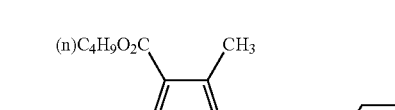 | 1 |
| III-123 | Cu | 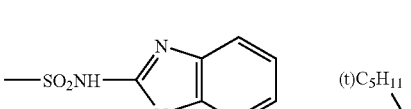 | 1 |
| III-124 | Cu | 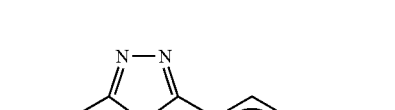 | 1 |
| III-125 | Cu |  | 1 |

TABLE III-6

| Compound No. | M | X | a |
|---|---|---|---|
| III-126 | Cu | —SO$_2$NH-[3-(pyrazol-5-ol)] with 1-(2,6-dichloro-4-(CO$_2$C$_8$H$_{17}$(n))phenyl) | 1 |
| III-127 | Cu | —SO$_2$NH-[3-(pyrazol-5-ol)] with 1-(4-(SO$_2$C$_3$H$_7$(n))phenyl) | 1 |
| III-128 | Cu | —SO$_2$NH-[3-(pyrazol-5-ol)] with 1-(2,6-dimethyl-4-(SO$_2$NH(CH$_2$)$_3$O-(2-(t)C$_5$H$_{11}$-4-C$_5$H$_{11}$(t))phenyl))phenyl) | 1 |
| III-129 | Cu | —SO$_2$NH-[3-(pyrazol-5-ol)] with 1-(2,6-dichloro-4-(SO$_2$NHC$_5$H$_{11}$(s))phenyl) | 1 |

TABLE III-6-continued

| Compound No. | M | X | a |
|---|---|---|---|
| III-130 | Cu | —SO$_2$NH- (pyrazole with OH, attached to 2,5-dichlorophenyl bearing SO$_2$N(C$_2$H$_5$)$_2$) | 1 |

TABLE III-7

| Compound No. | M | X | a |
|---|---|---|---|
| III-131 | Cu | —SO$_2$NH- (3-phenyl pyrazole, N-substituted with 2,6-dichlorophenyl bearing CONHC$_8$H$_{17}$(n)) | 1 |
| III-132 | Cu | —SO$_2$NH- (pyrazole with NC, SCH$_3$, N-phenyl bearing CON(C$_3$H$_7$(i))$_2$) | 1 |
| III-133 | Cu | —SO$_2$NH- (benzisothiazole bearing CONHC$_5$H$_{11}$(s)) | 1 |
| III-134 | Cu | —SO$_2$NH- (benzothiazole bearing CONHHC$_3$H$_7$(i)) | 1 |

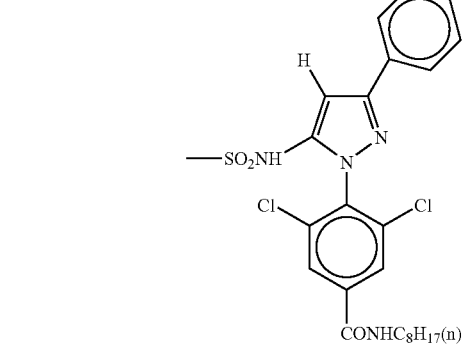
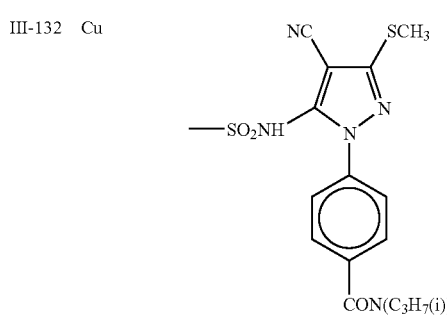
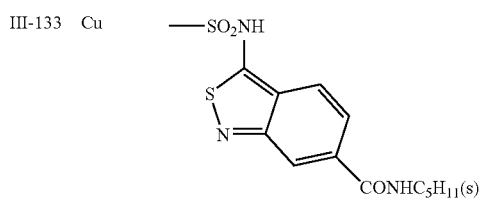
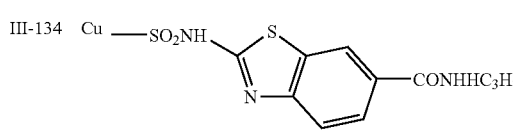

TABLE III-7-continued

| Compound No. | M | X | a |
|---|---|---|---|
| III-135 | Cu | —SO$_2$NH- (pyrazole with SC$_2$H$_4$SO$_2$NHC$_3$H$_7$(i), N-phenyl bearing CO$_2$C$_4$H$_9$(s)) | 1 |

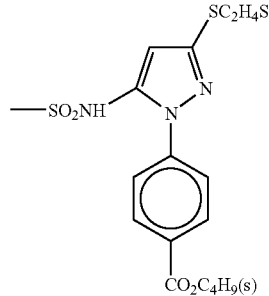

TABLE III-8

| Compound No. | M | X | a |
|---|---|---|---|
| III-136 | Ni | —SO$_2$NH- (pyrazole with NC, H, N-2,6-dichlorophenyl bearing CO$_2$C$_2$H$_5$) | 1 |
| III-137 | Ni | —SO$_2$NH- (pyrazole with Br, H, N-2,6-dichlorophenyl bearing SO$_2$NHC$_8$H$_{17}$(n)) | 1 |

TABLE III-8-continued

| Compound No. | M | X | a |
|---|---|---|---|
| III-138 | Ni | (pyrazole with H, C₃H₇(i), —SO₂NH—, N-aryl with 2,6-Cl and 4-SO₂NHCH₂CH(C₂H₅)C₄H₉(n)) | 1 |
| III-139 | Ni | (pyrazole with NC, CH₃, —SO₂NH—, N-aryl with 2,6-Cl and 4-SO₂NHCH₂CH(C₂H₅)C₄H₉(n)) | 1 |
| III-140 | Ni | (pyrazole with H, CH₃, —SO₂NH—, N-aryl with 2-SO₂NHC₄H₉(n) and 5-SO₂NHC₄H₉(n)) | 1 |

TABLE III-9

| Compound No. | M | X | a |
|---|---|---|---|
| III-141 | Zn | (pyrazole with NC, H, —SO₂NH—, N-aryl with 2,6-Cl and 4-CO₂C₂H₅) | 1 |
| III-142 | Zn | (pyrazole with Br, H, —SO₂NH—, N-aryl with 2,6-Cl and 4-SO₂NHC₈H₁₇(n)) | 1 |
| III-143 | Zn | (pyrazole with H, C₃H₇(i), —SO₂NH—, N-aryl with 2,5-Cl and 4-SO₂NHCH₂CH(C₂H₅)C₄H₉(n)) | 1 |
| III-144 | Zn | (pyrazole with NC, CH₃, —SO₂NH—, N-aryl with 2,6-Cl and 4-SO₂NHCH₂CH(C₂H₅)C₄H₉(n)) | 1 |
| III-145 | Zn | (pyrazole with H, CH₃, —SO₂NH—, N-aryl with 2-SO₂NHC₄H₉(n) and 5-SO₂NHC₄H₉(n)) | 1 |

Further, specific examples of the phthalocyanine compound of the invention will be given with reference to the following Table III-10 (Illustrative Compounds III-146 to III-150) while using the following general formula (I'), it should not be construed that the phthalocyanine compound used in the invention is limited thereto. Incidentally, in the tables, specific examples of each group of $(X_1, X_2)$, $(Y_{11}, Y_{12})$, $(Y_{13}, Y_{14})$, $(Y_{15}, Y_{16})$, and $(Y_{17}, Y_{19})$ are each independently not in order.

General formula (I')
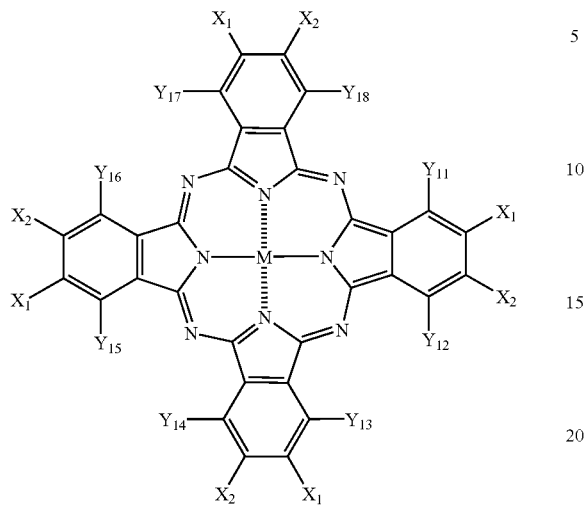
TABLE III-10
| Compound No. | M | X₁ | X₂ | $Y_{11}, Y_{12}$ | $Y_{13}, Y_{14}$ | $Y_{15}, Y_{16}$ | $Y_{17}, Y_{18}$ |
|---|---|---|---|---|---|---|---|
| III-146 | Cu | ![pyrazole with SO₂NH, CN, 2,6-dichloro-4-(CO₂C₂H₅)phenyl] | —Cl | —H, —H | —H, —H | —H, —H | —H, —H |
| III-147 | Cu | ![pyrazole with SO₂NH, CN, 2,6-dichloro-4-(CO₂C₂H₅)phenyl] | —H | —Cl, —H | —Cl, —H | —Cl, —H | —Cl, —H |
| III-148 | Cu | —SO₂NH—[thiadiazole]—SC₂H₄SO₂NHC₄H₉(i) | —Cl | —H, —H | —H, —H | —H, —H | —H, —H |
| III-149 | Cu | —SO₂NH—[thiadiazole]—SC₂H₄SO₂NHC₄H₉(i) | —Cl | —Cl, —H | —Cl, —H | —Cl, —H | —Cl, —H |

TABLE III-10-continued

| Compound No. | M | $X_1$ | $X_2$ | $Y_{11}, Y_{12}$ | $Y_{13}, Y_{14}$ | $Y_{15}, Y_{16}$ | $Y_{17}, Y_{18}$ |
|---|---|---|---|---|---|---|---|
| III-150 | Cu | —SO$_2$NH—(C$_6$H$_4$)—NHSO$_2$—(C$_6$H$_4$)—SO$_2$NHC$_3$H$_7$(i) | —Cl | —H, —H | —H, —H | —H, —H | —H, —H |

SYNTHESIS EXAMPLES

The synthesis method of the phthalocyanine compound of the invention will be described below with reference to the following Synthesis Examples, but it should not be construed that the starting substances, dye intermediates and synthesis routes are limited thereto.

Representative phthalocyanine compounds of the invention can be derived from, for example, the following synthesis routes.

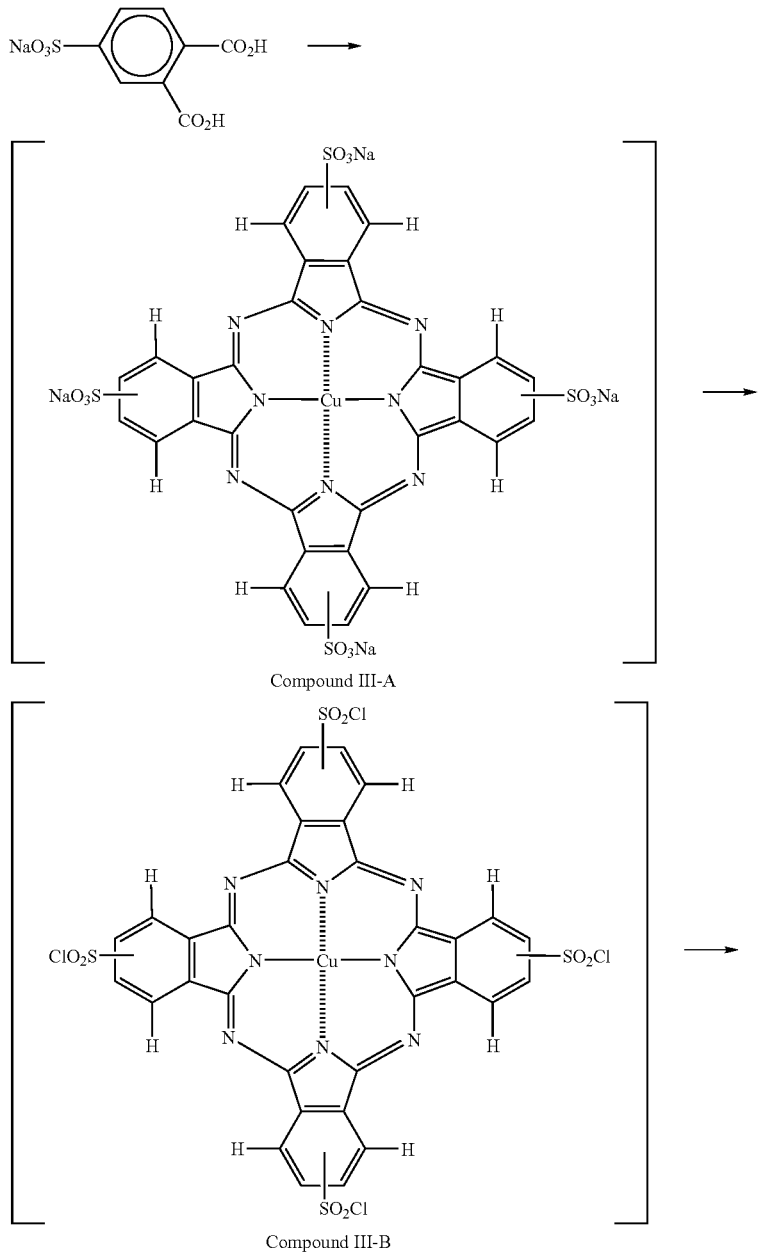

Compound III-A

Compound III-B

-continued
Compound III-B

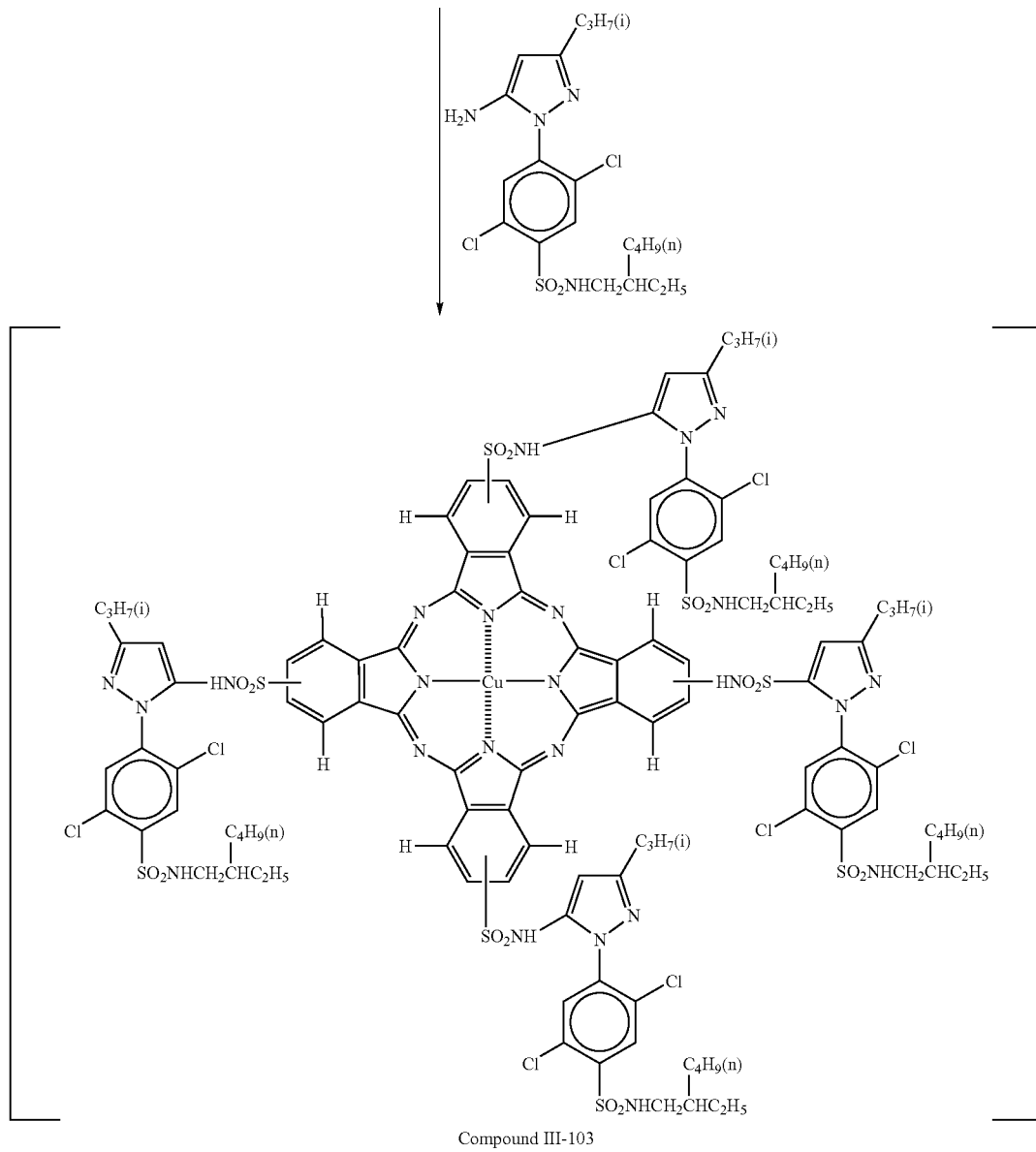

Compound III-103

Synthesis Example III-1

Synthesis of Compound III-A

Nitrobenzene (100 mL) was charged in a three-necked flask equipped with a condenser and elevated to 180° C. over one hour. Then, 43.2 g of sodium 4-sulfophthalate, 4.7 g of ammonium chloride, 58 g of urea, 0.68 g of ammonium molybdate, and 6.93 g of copper (II) chloride were added thereto, and the mixture was stirred at that temperature for 6 hours. After cooling to 40° C., 200 mL of methanol heated at 50° C. was poured into the reaction mixture, and the mixture was stirred at room temperature for one hour while pulverizing formed solids. The obtained dispersion was filtered by a Nutsche filter and washed with 400 mL of methanol. Thereafter, the obtained solids were added to 1,000 mL of an aqueous 1M hydrochloric acid solution saturated with sodium chloride, and the mixture was boiled to dissolve out the unreacted copper salt. After cooling, precipitated solids were filtered by a Nutsche filter and washed with 100 mL of an aqueous salt solution saturated with 1M hydrochloric acid solution. The obtained solids were dissolved in 700 mL of an aqueous 0.1M sodium hydroxide solution. The solution was elevated to 80° C. with stirring, and the stirring was continued at that temperature for an additional one hour. The aqueous solution was filtered under heating to eliminate contaminants, and 270 mL of sodium chloride was gradually added the filtrate with stirring to undergo salting-out. The salting-out solution was elevated to 80° C. with stirring, and the stirring was continued at that temperature for additional one hour. After cooling to room temperature, deposited crystals were filtered and washed with 150 mL of 20% salt water. Subsequently, the obtained crystals were added to 200 mL of 80% ethanol and stirred under reflux for one hour. After cooling to room temperature, deposited crystals were filtered and added to 200 mL of an aqueous 60% ethanol solution, followed by stirring under reflux for one hour. After cooling to room temperature, deposited crystals were filtered and washed with 300 mL of ethanol, followed by drying to obtain 29.25 g of Compound A as a blue crystal. λmax: 629.9 nm; εmax=6.11×10$^4$ (in aqueous solution). As a result of analyzing the obtained compound (mass analysis: ES1-MS, measured by various instrumental analysis methods such as elemental analysis and neutralization titration), it could be confirmed that the substitution position of phthalocyanine copper(II) as defined in this description was of a β-position substitution type [having one sulfo group at the (2- or 3-position), (6- or 7-position), (10- or 11-position), or (14- or 15-position) on each benzene nucleus and four (in total) sulfo groups in one molecule of the phthalocyanine copper].

Synthesis Example III-2

Synthesis of Compound III-B

In a three-necked flask equipped with a condenser was charged 150 mL of chlorosulfonic acid, and 19.0 g of the above-described Compound III-A (a compound of Synthesis Example III-1) was dividedly added step-by-step with stirring at 30° C. or lower. The stirring was continued at 20° C. for 30 minutes, and 60 g of phosphorus pentoxide was dividedly added step-by-step at 25° C. or lower. The reaction mixture was elevated to 140° C. and stirred at that temperature for 3 hours. After cooling to 80° C., 30 mL of thionyl chloride was added dropwise over 15 minutes. Subsequently, the reaction mixture was elevated to 80° C. and stirred at that temperature for 2 hours. After cooling to 10° C., the reaction mixture was gradually added to a mixture of 1,000 mL of water and 500 g of ice to deposit a desired product as a blue crystal. The temperature in the suspension was kept at 0 to 5° C. by supplementary addition of ice. After stirring at room temperature for an additional one hour, the crystals were filtered by a Nutche filter and washed with 1,500 mL of cold water. Subsequently, the crystals were washed 150 mL of cold acetonitrile and dried within a desiccator charged with a drying agent in vacuo overnight to obtain 15.6 g of Compound III-B as a blue crystal. As a result of analyzing the obtained compound, it could be confirmed to be a tetrachlorosulfonyl chloride having a substitution position of phthalocyanine copper(II), as defined in this description, of a β-type. Further, 0.01 parts of the obtained crystals were quenched by 2-ethylhexyloxypropylamine/acetone and then subjected to purity examination (detection wavelength: 254 nm; a 0.1% acetic acid/triethylamine buffer system; THF/H$_2$O=7/3) by HPLC. As a result, the compound had a relative area of 90.95% [examined as the total sum of Cu-Pc(—SO$_2$NH—R)$_4$ derivatives].

Synthesis Example III-3

Synthesis of Illustrative Compound III-103

In 150 mL of DMAc was suspended 27.7 g of 1-{2,5-dichloro-4-(2-ethylhexylaminosulfonyl)phenyl}-3-isopropyl-5-aminopyrazole, and 6.5 mL of pyridine was added dropwise to the suspension with stirring at an internal temperature of 5° C. Subsequently, 9.7 g of the above-described Compound III-B (a compound of Synthesis Example III-2) was gradually added for reaction. After stirring at 5 to 10° C. for 30 minutes, the reaction mixture was elevated to 55° C. and stirred at that temperature for one hour. After cooling to 20° C., the reaction mixture was poured into 1,000 mL of water and then stirred at room temperature for 30 minutes. Deposited crude crystals were filtered by a Nutsche filter and washed with 100 mL of cold water, followed by drying. The obtained crude crystals were subjected to removal of by-products [such as Cu-Pc-(SO$_3$X)$_m$(SO$_2$NH-hetero ring)$_n$ derivatives, wherein (m+n)= 4, m≠0] by silica gel column chromatography (CH$_2$Cl$_2$/THF), to obtain 16.8 g of Illustrative Compound III-103. λmax: 671.9 nm; εmax=2.0×10$^5$ (in DMF).

As a result of analyzing the obtained compound (mass analysis: ES1-MS, measured by various instrumental analysis methods such as elemental analysis and neutralization titration), it could be confirmed that the substitution position of phthalocyanine copper(II) as defined in this description was of a P-position substitution type {having one —{SO$_2$NH-hetero ring} group at the (2- or 3-position), (6- or 7-position), (10- or 11-position), or (14- or 15-position) on each benzene nucleus and four (in total) —{SO$_2$NH-hetero ring} groups in one molecule of the phthalocyanine copper}.

[Phthalocyanine-based Compound]

In addition, the phthalocyanine compound represented by the general formula (IV) of the invention will be described in detail. Incidentally, since the phthalocyanine compound is oil-soluble, it does not have an ionic hydrophilic group within the molecule thereof.

In the general formula (IV), R$_1$, R$_2$, R$_3$, R$_4$, R$_5$, R$_6$, R$_7$, and R$_8$ are synonymous with those in the foregoing general formula (II), and preferred examples are the same.

W$_1$, W$_2$, W$_3$, and W$_4$ each independently represents an atomic group necessary for forming a nitrogen-containing hetero ring. The heterocyclic groups represented by W$_1$, W$_2$, W$_3$, and W$_4$ may be each independently a saturated hetero ring or an unsaturated hetero ring.

The heterocyclic groups represented by W$_1$, W$_2$, W$_3$, and W$_4$ may be each independently taken with other ring to form a condensed ring.

Preferred examples of the hetero rings represented by W$_1$, W$_2$, W$_3$, and W$_4$ and condensed rings thereof, in which the substitution position of the hetero ring is not limited, include an imidazole group, a benzimidazole group, a pyrazole group, a benzopyrazole group, a triazole group, a benzotriazole group, pyrazolotriazole group, a pyrrolotriazole group, a tetrazole group, a pyrrole group, an indole group, a pyrrolidine group, an imidazoline group, a pyrazolidine group, a piperidine group, a piperazine group, a morpholine group, an indoline group, an isoindoline group, a thiazolidine group, a benzothiazolidine group, an isothiazolidine group, a benzoisothiazolidine group, an oxazolidine group, a benzoxazolidine group, an isoxazolidine group, a benzoisoxazolidine group, a phenothiazine group, and a phenoxazine group.

Preferred examples of the hetero rings represented by W$_1$, W$_2$, W$_3$, and W$_4$ and condensed rings thereof are 5- to 6-membered nitrogen-containing hetero rings and condensed rings between the hetero ring and other ring. More preferred examples of the 5- to 6-memberd nitrogen-containing hetero rings represented by W$_1$, W$_2$, W$_3$, and W$_4$ and condensed rings thereof, in which the substitution position of the hetero ring is not limited, include an imidazole group, a benzimidazole group, a pyrazole group, a triazole group, a benzotriazole group, a pyrazolotriazole group, a pyrrolotriazole group, a tetrazole group, a pyrrole group, an indole group, a pyrrolidine group, a piperidine group, a piperazine group, a thiazolidine group, a benzothiazolidine group, an oxazolidine group, and a benzoxazolidine group, and further preferably an imidazole group, a pyrazole group, a triazole group, a pyrrole group, an indole group, a pyrrolidine group, a piperidine group, a piperazine group, and a thiazolidine group. Of these are most preferable an imidazole group, a pyrazole group, a pyrrole group, a pyrrolidine group, and a piperazine group.

At least one of the hetero rings represented by $W_1$, $W_2$, $W_3$, and $W_4$ and condensed rings thereof has a substituent having 2 or more carbon atoms, and the total sum of carbon atoms of the substituents further substituted on the groups represented by $W_1$, $W_2$, $W_3$, and $W_4$ is 8 or more. The groups with which $W_1$, $W_2$, $W_3$, and $W_4$ may further be substituted are those enumerated for the above-described groups, $R_1$, $R_2$, $R_3$, $R_4$, $R_5$, $R_6$, $R_7$, and $R_8$. These substituents may further be substituted. In that case, the groups with which these substituents may further be substituted are selected from those enumerated for the above-described $R_1$, $R_2$, $R_3$, $R_4$, $R_5$, $R_6$, $R_7$, and $R_8$. Preferred examples of the substituent having 2 or more carbon atom, which at least one of $W_1$, $W_2$, $W_3$, and $W_4$ may have, include a sulfamoyl group, a sulfoamino group, a sulfoalkyl group, a sulfoalkoxy group, an alkylthio group, and an acyl group. Preferred examples of the group with which the foregoing substituent may further be substituted include an aryl group and an alkyl group, and particularly a 3-sulfamoylphenyl group.

l, m, n, and p each independently represents an integer of 1 or 2, so as to meet the relation of $4 \leq (l+m+n+p) \leq 8$, and particularly preferably $4 \leq (l+m+n+p) \leq 6$, with the case where they each independently represents 1 (l=m=n=p=1) being most preferred.

M represents a hydrogen atom, a metal element, a metal oxide, a metal hydroxide, or a metal halide. Preferred examples of M are the same as in M in the foregoing general formula (I).

In addition, in the phthalocyanine-based compound represented by the general formula (IV), Pc (phthalocyanine ring) may form a dimer (such as Pc-M-L-M-Pc) or a trimer via L (divalent connecting group). At that time, Ms that are present may be the same or different. Preferred examples of the divalent connecting group represented by L include an oxy group (—O—), a thio group (—S—), a carbonyl group (—CO—), a sulfonyl group (—SO$_2$—), an imino group (—NH—), a methylene group (—CH$_2$—), and a combination thereof.

The groups represented by $R_1$, $R_2$, $R_3$, $R_4$, $R_5$, $R_6$, $R_7$, and $R_8$ and the hereto rings formed by $W_1$, $W_2$, $W_3$, and $W_4$ may further have the substituents as in $R_1$ to $R_8$ in the foregoing general formula (II), and preferred examples are the same, too.

As the phthalocyanine-based compound represented by the general formula (IV), the following combinations are particularly preferred.

(a) $R_1$, $R_2$, $R_3$, $R_4$, $R_5$, $R_6$, $R_7$, and $R_8$ each independently represents a hydrogen atom, a halogen atom, or a cyano group, particularly a hydrogen atom or a halogen atom, and most preferably a hydrogen atom.

(b) At least one of the hetero rings represented by $W_1$, $W_2$, $W_3$, and $W_4$ and condensed rings thereof has a substituent having 2 or more carbon atoms, and the total sum of carbon atoms of the substituents is 8 or more. Preferably, all of $W_1$, $W_2$, $W_3$, and $W_4$ are a hetero ring having 2 or more carbon atoms or a condensed ring thereof.

In addition, preferably the hetero rings represented by $W_1$, $W_2$, $W_3$, and $W_4$ and condensed rings thereof, in which the substitution position of the hetero ring is not limited, each represents an imidazole group, a benzimidazole group, a pyrazole group, a triazole group, a benzotriazole group, a pyrazolotriazole group, a pyrrolotriazole group, a tetrazole group, a pyrrole group, an indole group, a pyrrolidine group, a piperidine group, a piperazine group, a thiazolidine group, a benzothiazolidine group, an oxazolidine group, or a benzoxazolidine group, and more preferably an imidazole group, a pyrazole group, a triazole group, a pyrrole group, an indole group, a pyrrolidine group, a piperidine group, a piperazine group, or a thiazolidine group. Of these are most preferable an imidazole group, a pyrazole group, a pyrrole group, a pyrrolidine group, and a piperazine group.

(c) Preferably, l, m, n, and p each represents 1.

(d) M represents a hydrogen atom, a metal element, or an oxide, hydroxide or halide thereof, particularly preferably Cu, Ni, Zn, or Al, and most preferably Cu.

Since the phthalocyanine-based compound represented by the general formula (IV) has at least one substituent having 2 or more carbon atoms in the molecular thereof, the dispersibility in an aqueous medium, or the solubility or dispersibility in an oleophilic medium, is good.

From such point of view, it is preferred that the phthalocyanine-based compound represented by the general formula (IV) has at least four substituents having 2 or more carbon atoms in the molecular thereof. Particularly preferably, the oleophilic group is a sulfamoyl group.

Of the phthalocyanine compounds represented by the general formula (IV) are more preferable phthalocyanine compounds having a structure represented by the foregoing general formula (VIII). The phthalocyanine compounds represented by the general formula (VIII) of the invention will be described in detail.

In the general formula (VIII), $W_1$, $W_2$, $W_3$, $W_4$, l, m, n, p, and M are each synonymous with $W_1$, $W_2$, $W_3$, $W_4$, l, m, n, p, and M in the foregoing general formula (IV), and preferred examples thereof are also the same.

Of the phthalocyanine-based compounds represented by the general formula (VIII), particularly preferred combinations of the substituents are the same as the particularly preferred combinations of the substituents in the foregoing general formula (IV).

Incidentally, with respect to the combination of the preferred substituents of the compound represented by the general formula (VIII), compounds in which at least one of the various substituents is a preferred group as described above are preferred, those in which more of the various substituents are a preferred group as described above are more preferred, and those in which all of the substituents are a preferred group as described above are most preferred.

Of the phthalocyanine compounds represented by the general formula (VIII) are more preferable phthalocyanine compounds having a structure represented by the foregoing general formula (XII). The phthalocyanine compounds represented by the general formula (XII) of the invention will be described in detail.

In the general formula (XII), $W_1$, $W_2$, $W_3$, and $W_4$ each independently represents an atomic group necessary for forming a 5- to 6-membered nitrogen-containing hetero ring or a condensed ring of the hetero ring with other ring.

In the general formula (XII), preferred examples of the 5- to 6-membered nitrogen-containing hetero rings formed by $W_1$, $W_2$, $W_3$, $W_4$ and the condensed rings thereof are the same as those of the 5- to 6-membered nitrogen-containing hetero rings formed by $W_1$, $W_2$, $W_3$, and $W_4$ in the foregoing general formula (VIII) and the condensed rings thereof.

M is synonymous with M in the foregoing general formula (VIII), and preferred examples are also the same.

In the phthalocyanine compound represented by the general formula (XII), it is preferred that at least one group of $W_1$, $W_2$, $W_3$, and $W_4$ represents a substituent having 2 or more carbon atoms, and the total sum of carbon atoms of the substituents represented by $W_1$ to $W_4$ is 8 or more. It is particularly preferred that $W_1$, $W_2$, $W_3$, and $W_4$ each independently has a substituent having 2 or more carbon atoms, and the total sum of carbon atoms of the substituents represented by $W_1$ to $W_4$ is 8 or more. It is most preferred that $W_1$, $W_2$, $W_3$, and $W_4$ each independently has a substituent having 3 or more carbon atoms, and the total sum of carbon atoms of the substituents represented by $W_1$ to $W_4$ is 12 or more.

Since the phthalocyanine compound represented by the general formula (XII) has at least four substituted sulfamoyl groups in the molecule thereof, the solubility or dispersibility in an oleophilic medium is good.

Incidentally, with respect to the combination of the preferred substituents of the compound represented by the general formula (XII), compounds in which at least one of the various substituents is a preferred group as described above are preferred, those in which more of the various substituents are a preferred group as described above are more preferred, and those in which all of the substituents are a preferred group as described above are most preferred.

The compound represented by the general formula (IV) of the invention can be synthesized in the same manner as in the reaction in the foregoing general formula (XX).

An amount of the metal derivative and the phthalonitrile compound represented by the general formula (XXa) to be used is preferably from 1:3 to 1:6 in terms of a molar ratio.

Further, an amount of the metal derivative and the diiminoisoindoline derivative represented by the general formula (XXb) to be used is preferably from 1:3 to 1:6 in terms of a molar ratio.

Specific examples (Illustrative Compounds IV-101 to IV-145) of the phthalocyanine compound represented by the general formula (IV) will be given with reference to the following Table IV-1 to Table IV-9 while using the following general formula (IX'), it should not be construed that the phthalocyanine compound used in the invention is limited thereto.

General formula (IX')

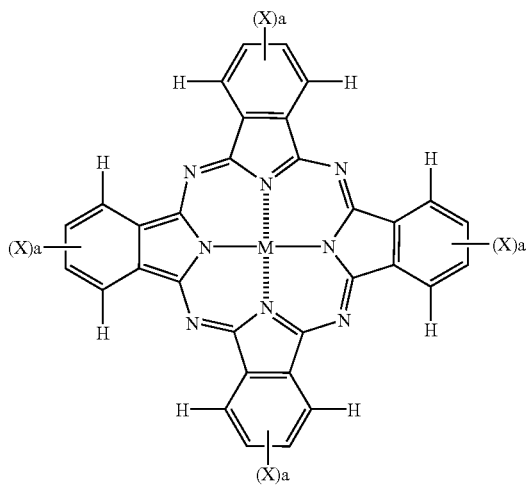

TABLE IV-1

| Compound No. | M | X | a |
|---|---|---|---|
| IV-101 | Cu | —SO$_2$—N⟨pyrrolidine-3-yl⟩—NHSO$_2$—C$_6$H$_4$—SO$_2$NHC$_4$H$_9$(n) | 1 |
| IV-102 | Cu | —SO$_2$—N⟨pyrrolidine-3-yl⟩—O(CH$_2$)$_3$SO$_2$C$_8$H$_{17}$(n) | 1 |
| IV-103 | Cu | —SO$_2$—N⟨pyrrole with phenyl, CN, and C$_6$H$_4$—NHSO$_2$—C$_6$H$_4$—SO$_2$NHC$_3$H$_7$(i)⟩ | 1 |

TABLE IV-1-continued
| Compound No. | M | X | a |
|---|---|---|---|
| IV-104 | Cu | 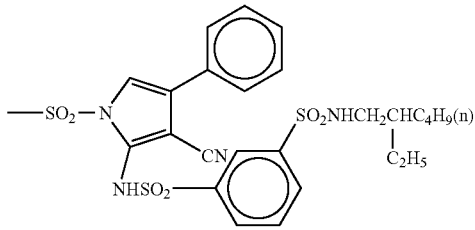 | 1 |
| IV-105 | Cu | 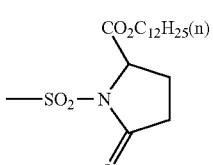 | 1 |
TABLE IV-2
| Compound No. | M | X | a |
|---|---|---|---|
| IV-106 | Cu | 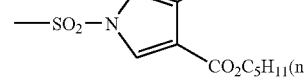 | 1 |
| IV-107 | Cu | 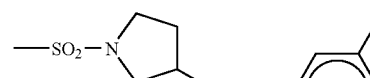 | 1 |
| IV-108 | Cu | 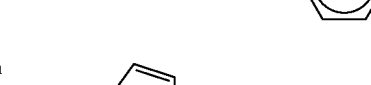 | 1 |
| IV-109 | Cu | 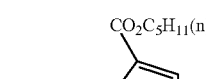 | 1 |
| IV-110 | Cu |  | 1 |

TABLE IV-3
| Compound No. | M | X | a |
|---|---|---|---|
| IV-111 | Cu | 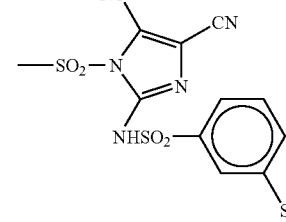 | 1 |
| IV-112 | Cu | 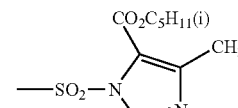 | 1 |
| IV-113 | Cu | 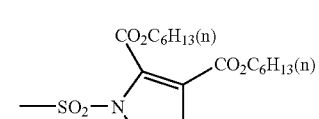 | 1 |
| IV-114 | Cu | 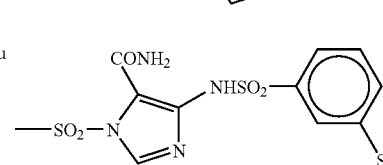 | 1 |
| IV-115 | Cu | 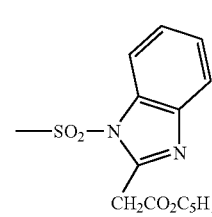 | 1 |
TABLE IV-4
| Compound No. | M | X | a |
|---|---|---|---|
| IV-116 | Cu | 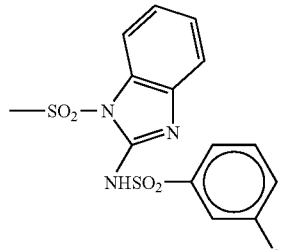 | 1 |
| IV-117 | Cu | 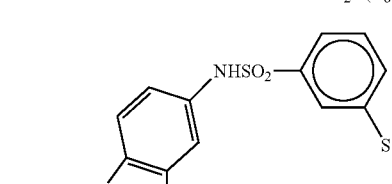 | 1 |

TABLE IV-4-continued

| Compound No. | M | X | a |
|---|---|---|---|
| IV-118 | Cu | 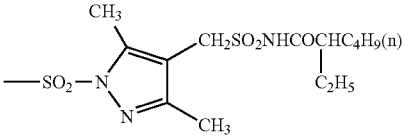 —SO$_2$—pyrazole with CH$_3$ (5-position), CH$_3$ (3-position), and CH$_2$SO$_2$NHCOCH(C$_2$H$_5$)C$_4$H$_9$(n) (4-position) | 1 |
| IV-119 | Cu | 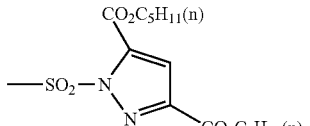 —SO$_2$—pyrazole with CO$_2$C$_5$H$_{11}$(n) (5-position) and CO$_2$C$_5$H$_{11}$(n) (3-position) | 1 |
| IV-120 | Cu | 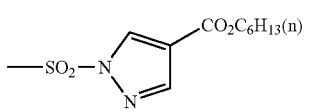 —SO$_2$—pyrazole with CO$_2$C$_6$H$_{13}$(n) (4-position) | 1 |

TABLE IV-5

| Compound No. | M | X | a |
|---|---|---|---|
| IV-121 | Cu | 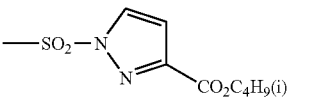 —SO$_2$—pyrazole with CO$_2$C$_4$H$_9$(i) | 1 |
| IV-122 | Cu | 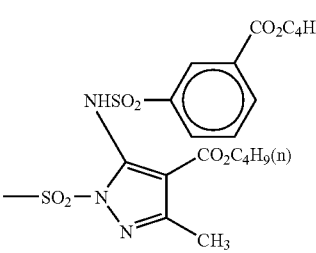 —SO$_2$—pyrazole with NHSO$_2$-phenyl-CO$_2$C$_4$H$_9$(n) (5-position), CO$_2$C$_4$H$_9$(n) (4-position), CH$_3$ (3-position) | 1 |
| IV-123 | Cu | 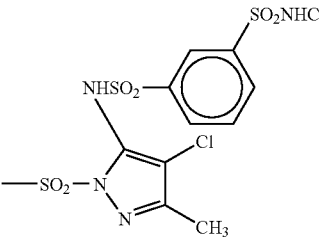 —SO$_2$—pyrazole with NHSO$_2$-phenyl-SO$_2$NHC$_4$H$_9$(n) (5-position), Cl (4-position), CH$_3$ (3-position) | 1 |
| IV-124 | Cu | 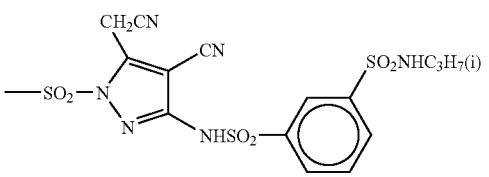 —SO$_2$—pyrazole with CH$_2$CN (5-position), CN (4-position), NHSO$_2$-phenyl-SO$_2$NHC$_3$H$_7$(i) (3-position) | 1 |
| IV-125 | Cu | 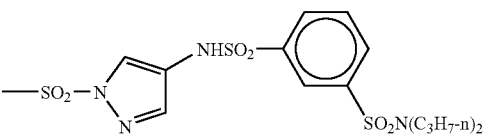 —SO$_2$—pyrazole with NHSO$_2$-phenyl-SO$_2$N(C$_3$H$_7$-n)$_2$ (4-position) | 1 |

TABLE IV-6

| Compound No. | M | X | a |
|---|---|---|---|
| IV-126 | Cu | —SO$_2$— pyrazole (5-O(CH$_2$)$_4$SO$_2$NHC$_3$H$_7$(i), 3-CH$_3$) | 1 |
| IV-127 | Cu | —SO$_2$— triazole-NHSO$_2$-C$_6$H$_4$-SO$_2$NHC$_4$H$_9$(n) | 1 |
| IV-128 | Cu | —SO$_2$— triazole-NHSO$_2$-C$_6$H$_4$-SO$_2$N(C$_2$H$_5$)$_2$ | 1 |
| IV-129 | Cu | —SO$_2$— triazole (CH$_2$CO$_2$C$_4$H$_9$(s)) - C$_6$H$_4$-NHSO$_2$-C$_6$H$_4$-CO$_2$C$_4$H$_9$(s) | 1 |
| IV-130 | Cu | —SO$_2$— benzotriazole-CO$_2$C$_5$H$_{11}$(s) | 1 |

TABLE IV-7

| Compound No. | M | X | a |
|---|---|---|---|
| IV-131 | Cu | Br-substituted pyrazolo-triazole (N-CH$_3$, (i)C$_3$H$_7$) with C$_6$H$_4$-SO$_2$NHC$_2$H$_4$OC$_2$H$_5$ | 1 |

TABLE IV-7-continued
| Compound No. | M | X | a |
|---|---|---|---|
| IV-132 | Cu | 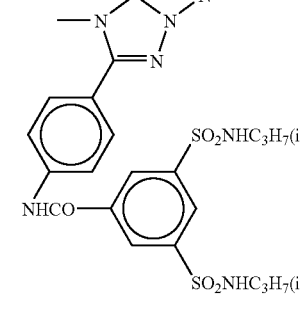 | 1 |
| IV-133 | Cu | 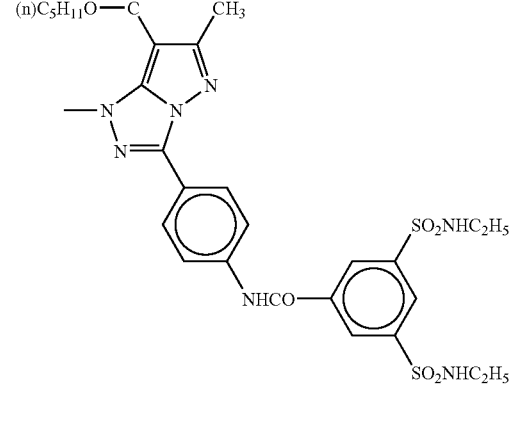 | 1 |
| IV-134 | Cu | 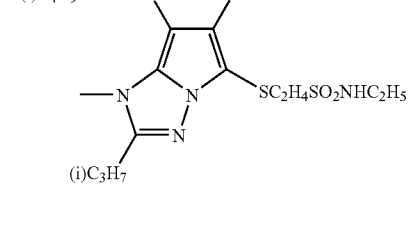 | 1 |
| IV-135 | Ni | 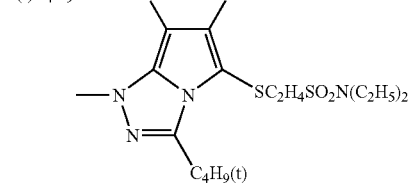 | 1 |

TABLE IV-8

| Compound No. | M | X | a |
|---|---|---|---|
| IV-136 | Cu | 4-(n-C5H11O2C)-C6H4-tetrazol-1-yl-SO2— | 1 |
| IV-137 | Cu | —SO2—N(piperidine-4-yl)—CO2C2H4OCH3 | 1 |

TABLE IV-8-continued

| Compound No. | M | X | a |
|---|---|---|---|
| IV-138 | Cu | —SO2—N(piperidine-3-yl)—CO2CH(CH3)CH2OCH3 | 1 |
| IV-139 | Cu | —SO2—N(piperidine-2-yl)—CO2C5H11(n) | 1 |
| IV-140 | Cu | —SO2—N(piperidine-3-yl)—O(CH2)3SO2NHC4H9(n) | 1 |

TABLE IV-9

| Compound No. | M | X | a |
|---|---|---|---|
| IV-141 | Cu | —SO2—N(2,2,6,6-tetramethylpiperidin-4-yl)—O(CH2)4SO2NHC3H7(i) | 1 |
| IV-142 | Cu | —SO2—N(2,2,6,6-tetramethylpiperidin-4-yl)—NHSO2—C6H4—SO2NHC4H9(n) | 1 |
| IV-143 | Cu | —SO2—N(2,2,6,6-tetramethyl-4-hydroxypiperidin-4-yl)—CO2C5H11(n) | 1 |
| IV-144 | Cu | —SO2—N(piperidin-4-yl)—(CH2)3—(piperidin-4-yl)N—SO2—C6H4—SO2N(C4H9-n)2 | 1 |
| IV-145 | Zn | —SO2—N(piperidin-4-yl)—(piperidin-4-yl)N—SO2—C6H4—SO2NHC4H9(n) | 1 |

Further, specific examples of the phthalocyanine compound of the invention will be given with reference to the following Table IV-0.10 (Illustrative Compounds IV-146 to IV-150) while using the following general formula (I'), it should not be construed that the phthalocyanine compound used in the invention is limited thereto. Incidentally, in the tables, specific examples of each group of ($X_1$, $X_2$), ($Y_{11}$, $Y_{12}$), ($Y_{13}$, $Y_{14}$), ($Y_{15}$, $Y_{16}$), and ($Y_{17}$, $Y_{18}$) are each independently not in order.

General formula (I')

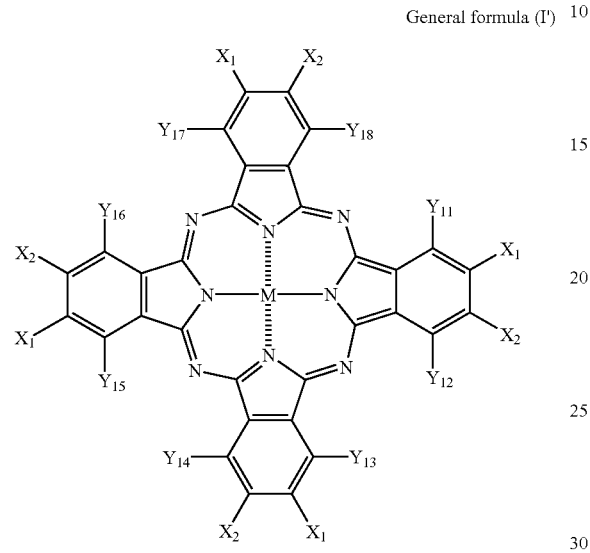

TABLE IV-10

| Compound No. | M | $X_1$ | $X_2$ | $Y_{11}$, $Y_{12}$ | $Y_{13}$, $Y_{14}$ | $Y_{15}$, $Y_{16}$ | $Y_{17}$, $Y_{18}$ |
|---|---|---|---|---|---|---|---|
| IV-146 | Cu | —SO₂—N(piperazine)N—CO—C₆H₄— | SO₂NHC₄H₉(n)—Cl | —H, —H | —H, —H | —H, —H | —H, —H |
| IV-147 | Cu | —SO₂—N(piperazine)N—CO₂C₅H₁₁(n) | —H | —Cl, —H | —Cl, —H | —Cl, —H | —Cl, —H |
| IV-148 | Cu | —SO₂—N(2,6-dimethylpiperazine)N—CO—C₆H₄— | SO₂NHC₃H₇(i)—Cl | —H, —H | —H, —H | —H, —H | —H, —H |
| IV-149 | Cu | —SO₂—N(thiazolidine with CO₂C₅H₁₁(i)) | —Cl | —Cl, —H | —Cl, —H | —Cl, —H | —Cl, —H |
| IV-150 | Cu | —SO₂—N(thiazolidine-2-yl-C₆H₄-CO₂C₂H₄OCH₃) | —Cl | —H, —H | —H, —H | —H, —H | —H, —H |

As the application of the compounds of the invention are enumerated materials for forming images, particularly color images. Specifically, it includes not only inkjet recording materials as described below in detail but also thermal transfer image recording materials, pressure-sensitive recording materials, electrophotographic recording materials, transfer silver halide light-sensitive materials, printing inks, and recording pens, preferably inkjet recording materials, thermal transfer image recording materials, and electrophotographic recording materials, and more preferably inkjet recording materials. Further, the compounds of the invention can be applied to color filters used in solid picture elements such as LCD and CCD as well as to dyeing baths for dyeing various fibers, as described in U.S. Pat. No. 4,808,501 and JP-A-6-35182.

Also, as means for improving the resistance of outdoor advertisement media and the like to sunlight, particularly ultraviolet light, or to an oxidative atmosphere, while utilizing a high oxidation resistance of the phthalocyanine compound of the invention, there is employable a method for drawing images using an ink or inkjet ink containing the phthalocyanine compound of the invention.

The compound of the invention can be used by adjusting physical properties thereof, such as solubility and heat transfer, suitable for the application, with a substituent. Further, the compound of the invention can be used in a state such as a uniform dissolution state, a dispersed dissolution state such as emulsification and dispersion, and solid dispersion state, depending on a system to be used.

[Ink and Inkjet Ink]

Next, inks (including inkjet inks) using the compound of the invention will be described.

An ink can be prepared by dissolving and/or dispersing the phthalocyanine compound in an oleophilic medium or an aqueous medium. The ink of the invention is applied preferably to the case where an oleophilic medium is used. If desired, other additives may be contained within the range in which the effects of the invention are not hindered. Examples of other additives include known additives such as drying inhibitors (wetting agents), fading inhibitors, emulsification stabilizers, penetration promoters, ultraviolet absorbers, antiseptics, fungicides, pH regulators, surface tension regulators, antifoaming agents, viscosity regulators, dispersing agents, dispersion stabilizers, rust preventives, and chelating agents. In the case of an aqueous ink, each of these additives is added directly to the ink liquid. In the case where an oil-soluble dye is used in a dispersion form, while it is general to prepare a dye dispersion and then add the additives to the dispersion, the additives may be added to an oil phase or an aqueous phase at the time of the preparation.

The drying inhibitor is suitably used for the purpose of inhibiting clogging of an ink injection inlet of a recording nozzle by an ink, especially an inkjet ink upon drying.

As the drying inhibitor are preferable organic solvents having a lower vapor pressure than water. Specific examples include polyhydric alcohols represented by ethylene glycol, propylene glycol, diethylene glycol, polyethylene glycol, thiodiglycol, dithiodiglycol, 2-methyl-1,3-propanediol, 1,2, 6-hexanetriol, acetylene glycol derivatives, glycerin, and trimethylolpropane; lower alkyl ethers of a polyhydric alcohol such as ethylene glycol monomethyl(or ethyl) ether, diethylene glycol monomethyl (or ethyl) ether, and triethylene glycol monoethyl (or butyl) ether; heterocyclic compounds such as 2-pyrrolidone, N-methyl-2-pyrrolidone, 1,3-di-methyl-2-imidazolidinone, and N-ethylmorpholine; sulfur-containing compounds such as sulfolane, dimethyl sulfoxide, and 3-sulfolene; polyfunctional compounds such as diacetone alcohol and diethanolamine; and urea derivatives. Of these are more preferable polyhydric alcohols such as glycerin and diethylene glycol. These drying inhibitors may be used alone or in admixture of two or more thereof. Preferably, the drying inhibitor is contained in an amount of from 10 to 50% by weight in the ink.

The penetration promoter is suitably used for the purpose of more efficiently penetrating the ink, especially the ink-jet ink into paper. Examples of the diffusion promoter that can be used include alcohols such as ethanol, isopropanol, butanol, di (or tri) ethylene glycol monobutyl ether, and 1,2-hexanediol, sodium laurate, sodium oleate, and nonionic surfactants. When the penetration promoter is contained in an amount of from 5 to 30% by weight in the ink, sufficient effects are usually given. It is preferred that the penetration promoter is used within the range of the addition amount in which bleeding of prints and print-through do not take place.

The ultraviolet absorber is used for the purpose of improving the preservability of images. Examples of the ultraviolet absorber that can be used include the benzotriazole-based compounds as described in, for example, JP-A-58-185677, JP-A-61-190537, JP-A-2-782, JP-A-5-197075, and JP-A-9-34057; the benzophenone-based compounds as described in, for example, JP-A-46-2784, JP-A-5-194483, and U.S. Pat. No. 3,214,463; the cinnamic acid-based compounds as described in, for example, JP-B-48-30492, JP-B-56-21141, and JP-A-10-88106; the triazine-based compounds as described in, for example, JP-A-4-298503, JP-A-8-53427, JP-A-8-239368, JP-A-10-182621, and JP-T-8-501291; the compounds as described in *Research Disclosure* No. 24239; compounds for absorbing ultraviolet light to emit fluorescence, so-called fluorescent brighteners, represented by stilbene-based compounds and benzoxazole-based compounds.

The fading inhibitor is used for the purpose of improving the preservability of images. As the fading inhibitor are employable various organic or metal complex-based fading inhibitors. Examples of the organic fading inhibitor include hydroquinones, alkoxyphenols, dialkoxyphenols, phenols, anilines, amines, indanes, chromans, alkoxyanilines, and heterocyclic compounds. Examples of the metal complex include nickel complexes and zinc complexes. More concretely, can be used the compounds described in the patents cited in *Research Disclosure* No. 17643, Chapter VII, Items I to J, ibid. No. 15162, ibid. No. 18716, page 650, left column, ibid. No. 36544, page 527, ibid. No. 307105, page 872, and ibid. No. 15162; and the compounds included in the general formulae and compound examples of representative examples described on pages 127 to 137 of JP-A-62-215272.

Examples of the fungicide include sodium tetrahydroacetate, sodium benzoate, sodium pyridinethione-1-oxide, ethyl p-hydroxybenzoazte, 1,2-benzisothiazolin-3-one, and salts thereof. Preferably, the fungicide is used in an amount of from 0.02 to 1.00% by weight in the ink.

As the pH regulator, can be used the neutralizing agents (organic bases and inorganic alkalis). The pH regulator is used for the purpose of improving the storage stability of the ink. Preferably, the pH regulator is added such that the pH becomes from 6 to 10, and more preferably from 7 to 10.

As the surface tension regulator are enumerated anionic, cationic, or anionic surfactants. The ink, especially ink-jet ink of the invention preferably has a surface tension of from 25 to 70 mPa·s, and more preferably from 25 to 60 mN/m. Further, it is preferred to adjust the inkjet ink of the invention so as to have a viscosity of 30 mPa·s or less, and more preferably 20 mPa·s or less. Preferred examples of the surfactant include anionic surfactants such as fatty acid salts, alkyl sulfuric acid ester salts, alkylbenzenesulfonates, alkylnaphthalenesulfonates, dialkylsulfosuccinates, alkylphosphoric acid ester salts, naphthalenesulfonic acid-formalin condensates, and polyoxyethylene alkyl sulfuric acid ester salts; and nonionic surfactants such as polyoxyethylene alkyl ethers, polyoxyethylene alkylallyl ethers, polyoxyethylene fatty acid esters, sorbitan fatty acid esters, polyoxyethylene sorbitan fatty acid esters, polyoxyethylene alkylamines, glycerin fatty acid esters, and oxyethylene-oxypropylene block copolymers. Also, SURFYNOLIS (made by Air Product & Chemicals) that is an acetylene-based polyoxyethylene oxide surfactant is preferably used. Also, amine oxide type ampholytic surfactants such as N,N-dimethyl-N-alkylamine oxides are preferable. In addition, can be used those enumerated as the surfactant, as described in JP-A-59-157636, pages 37 to 38 and Research Disclosure No. 308119 (1989).

As the antifoaming agent, fluorocarbon-based compounds, silicone-based compounds, and chelating agents represented by EDTA can be used, if desired.

In the case where the phthalocyanine compound of the invention is dispersed in an aqueous medium, it is preferred that colored fine particles containing the dye and an oil-soluble polymer are dispersed in the aqueous medium, as described in JP-A-11-286637, JP-A-2001-240763, JP-A-2001-262039, and JP-A-2001-247788; and that the compound of the invention dissolved in a high-boiling organic solvent is dispersed in the aqueous medium, as described in JP-A-2001-262018, JP-A-2001-240763, JP-A-2000-203856, and JP-A-2000-203857.

In the case where the compound of the invention is dispersed in the aqueous medium, as to the specific method, the oil-soluble polymer, high-boiling organic solvent and additives to be used, and the amounts thereof, those described in the above-cited patents can be suitably applied. Alternatively, the azo dye in a solid form may be dispersed into a state of fine particles. At the time of dispersion, a dispersing agent and a surfactant can be used.

As dispersion apparatus, can be used a simple stirrer or impeller stirring mode, an inline stirring mode, a mill mode (such as a colloid mill, a ball mil, a sand mill, an attritor, a roll mill, and an agitator mill), a ultrasonic wave mode, and a high-pressure emulsification dispersion mode (a high-pressure homogenizer; specific examples of commercially available apparatus include a Gaulin homogenizer, a microfluidizer, and DeBEE2000).

With respect to the preparation method of the inkjet ink, in addition to the above-cited patents, JP-A-5-148436, JP-A-5-295312, JP-A-7-97541, JP-A-7-82515, JP-A-7-118584, JP-A-11-286637, and Japanese Patent Application No. 2000-87539 can be referred to for the preparation of the ink-jet ink of the invention.

As the aqueous medium, those comprising water as a major component and optionally a water-miscible organic solvent can be used. Examples of the water-miscible organic solvent include alcohols (such as methanol, ethanol, propanol, isopropanol, butanol, isobutanol, sec-butanol, t-butanol, pentanol, hexanol, cyclohexanol, and benzyl alcohol); polyhydric alcohols (such as ethylene glycol, diethylene glycol, triethylene glycol, polyethylene glycol, propylene glycol, dipropylene glycol, polypropylene glycol, butylenes glycol, hexanediol, pentanediol, glycerin, hexanetriol, and thiodiglycol); glycol derivatives (such as ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, and ethylene glycol monophenyl ether); amines (such as ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, and tetramethylpropylenediamine); and other polar solvents (such as foramide, N,N-dimethylformamide, N,N-dimethylacetamide, dimethyl sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, and acetone). These water-miscible organic solvents may be used in admixture of two or more thereof.

Preferably, the ink of the invention contains from 0.2 to 10 parts by weight of the phthalocyanine compound in 100 parts by weight of the ink. In the inkjet ink of the invention, the phthalocyanine compound may be used in combination with other dye. In the case where two or more kinds of dyes are used in combination, it is preferred that the total sum of the contents of the dyes falls within the above-specified range.

The inkjet ink of the invention can be used for not only the formation of monochromatic images but also the formation of full-color images. In order to form full-color images, a magenta color tone ink, a cyan color tone ink, and a yellow color tone ink can be used. Also, in order to adjust the color tone, a black color tone ink may further be used. In these inks, other color materials (dyes and pigments) are used in addition to the phthalocyanine compound according to the invention, whereby the image reproduction performance can be enhanced.

As the yellow dye that can be adapted together with the phthalocyanine compound of the invention, any arbitrary ones can be used. Examples include aryl or heteryl azo dyes having, for example, phenols, naphthols, anilines, heterocyclic compounds such as pyrazolone and pyridone, or open chain active methylene compounds as a coupling component (hereinafter called "coupler component"); azomethine dyes having, for example, open chain active methylene compounds as a coupler component; methine dyes such as benzylidene dyes and monomethineoxonol dyes; and quinone-based dyes such as naphthoquinone dyes and anthraquinone dyes. Other dye species include quinophthalone dyes, nitro/nitroso dyes, acridine dyes, and acridinone dyes.

As the magenta dye that can be adapted, any arbitrary ones can be used. Examples include aryl or heteryl azo dyes having, for example, phenols, naphthols, or anilines as a coupler component; azomethine dyes having, for example, pyrazolones or pyrazolotriazoles as a coupler component; methine dyes such as arylidene dyes, styryl dyes, merocyanine dyes, cyanine dyes, and oxonol dyes; carbonium dyes such as diphenylmethane dyes, triphenylmethane dyes, and xanthene dyes; quinone dyes such as naphthoquinone, anthraquinone, and anthrapyridone; and condesed polycyclic dyes such as dioxazine dyes.

As the cyane dye that can be adapted, any arbitrary ones can be used. Examples include aryl or heteryl azo dyes having, for example, phenols, naphthols, or anilines as a coupler component; azomethine dyes having, for example, phenols, naphthols, or heterocyclic compounds such as pyrrolotriazoles, as a coupler component; polymethine dyes such as cyanine dyes, oxonol dyes, and merocyanine dyes; carbonium dyes such as diphenylmethane dyes, triphenylmethane dyes, and xanthene dyes; phthalocyanine dyes, anthraquinone dyes; and indigo/thioindigo dyes.

Each of the above-described dyes may be one in which a part of the chromophore is dissociated, whereby a yellow, magenta or cyan color is first exhibited. In this case, a counter cation may be an inorganic cation such as an alkali metal and ammonium, or an organic cation such as pyridinium and a quaternary ammonium salt, or even a polymer cation having the same in a partial structure thereof. Examples of the black color material that can be adapted include not only dis-azo, tris-azo and tetra-azo dyes but also a dispersed material of carbon black.

[Inkjet Recording Method]

Next, the inkjet recording method using the above-described inkjet ink of the invention will be described below.

The inkjet recording method of the invention comprises imparting an energy to the inkjet ink and forming images on a known image-receiving material, namely, plain paper or resin-coated paper, such as special inkjet paper, films, electrophotographic shared paper, cloths, glass, metals, and ceramics, as described in, for example, JP-A-8-169172, JP-A-8-27693, JP-A-2-276670, JP-A-7-276789, JP-A-9-323475, JP-A-62-238783, JP-A-10-153989, JP-A-10-217473, JP-A-10-235995, JP-A-10-337947, JP-A-10-217597, and JP-A-10-337947.

In forming images, polymer latex compounds may be used in combination for the purposes of imparting gloss and water resistance and improving weather resistance. As to timing when the latex compound is imparted to the image-receiving material, it may be imparted before or after imparting a coloring material, or simultaneously. Accordingly, as to a place to be added, it may be imparted in the image-receiving paper or ink, or it may be used in a liquid state of the polymer latex alone. Concretely, the methods as described in, for example, Japanese Patent Application Nos. 2000-363090, 2000-315231, 2000-354380, 2000-343944, 2000-268952, 2000-299465, and 2000-297365 can be suitably employed.

A recording paper and a recording film that are used for achieving inkjet printing using the ink of the invention will be described hereunder. As a support in the recording paper or recording film, are employable those made of, for example, a chemical pulp such as LBKP and NBKP, a mechanical pulp such as GP, PGW, RMP, TMP, CTMP, CMP, and CGP, or a waste-paper pulp such as DIP, optionally mixed with known additives such as pigments, binders, sizing agents, fixing agents, cationic agents, and paper strengthening agents, which are produced by subjecting to paper making by various apparatus such as long screen paper making machines or round screen paper making machines. Besides, synthetic papers and plastic films may be used. The support desirably has a thickness of from 10 to 250 μm and a basis weight of from 10 to 250 g/m². The support may be provided directly with an ink-receiving layer and a back-coat layer. Alternatively, after size pressing with starch or polyvinyl alcohol or providing an anchor layer, the support may be provided with an ink-receiving layer and a back-coat layer. Further, the support may be subjected to flattening processing by calender apparatus such as a machine calender, a TG calender, and a soft calender.

As the support of the invention, papers or plastic films, the both surfaces of which are laminated with a polyolefin (such as polyethylene, polystryrene, polyethylene terephthalate, polybutene, and copolymers thereof), are suitably used. Preferably, a white pigment (such as titanium oxide and zinc oxide) or a tinting dye (such as cobalt blue, ultramarine, and neodymium oxide) is added in the polyolefin.

The ink-receiving layer provided on the support contains a pigment and an aqueous binder. As the pigment, a white pigment is preferable. Examples of the white pigment include white inorganic pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide, and zinc carbonate; and organic pigments such as styrenic pigments, acrylic pigments, urea resins, and melamine resins. As the white pigment to be contained in the ink-receiving layer, porous inorganic pigments are preferred, and particularly, synthetic amorphous silica having a large pore area is suitable. As the synthetic amorphous silica, any of silicic anhydride obtained by the dry production process and hydrated silicic acid obtained by the wet production process can be used, and particularly, the hydrated silicic acid is suitably used.

Examples of the aqueous binder to be contained in the ink-receiving layer include water-soluble polymeric materials such as polyvinyl alcohol, silanol-modified polyvinyl alcohol, starch, cationic starch, casein, gelatin, carboxymethyl cellulose, hydroxymethyl cellulose, polyvinyl pyrrolidone, polyalkylene oxides, and polyalkylene oxide derivatives; and water-dispersible polymeric materials such as styrene-butadiene latices and acrylic emulsions. These aqueous binders may be used along or in admixture of two ore more thereof. In the invention, polyvinyl alcohol and silanol-modified polyvinyl alcohol are particularly suitable from the standpoints of adhesion to the pigment and peeling resistance of the ink-receiving layer.

The ink-receiving layer may contain a mordant, a waterproofing agent, a light fastness improver, a surfactant, and other additives, in addition to the pigment and the aqueous binder.

It is preferred that the mordant to be added in the ink-receiving layer is immobilized. For this reason, polymer mordants are suitably used.

The polymer mordants are described in, for example, JP-A-48-28325, JP-A-54-74430, JP-A-54-124726, JP-A-55-22766, JP-A-55-142339, JP-A-60-23850, JP-A-60-23851, JP-A-60-23852, JP-A-60-23853, JP-A-60-57836, JP-A-60-60643, JP-60-118834, JP-A-60-122940, JP-A-60-122941, JP-A-60-122942, JP-A-60-235134, JP-A-1-161236, and U.S. Pat. Nos. 2,484,430, 2,548,564, 3,148,061, 3,309,690, 4,115,124, 4,124,386, 4,193,800, 4,273,853, 4,282,305, and 4,450,224. Of these are particularly preferable image-receiving materials containing the polymer mordant as described on pages 212 to 215 of JP-A-1-161236. When the polymer mordant as described in this patent is used, not only images having a superior image quality are obtained, but also light fastness of the images is improved.

The waterproofing agent is effective for making the images waterproof. As the waterproofing agent, is particularly preferable a cationic resin. Examples of the cationic resin include polyamidepolyamine epichlorohydrin, polyethyleneimine, polyaminesulfone, dimethyldiallylammonium chloride polymers, cationic polyacrylamide, and colloidal silca. Of these are particularly suitable polyamidepolyamine epichlorohydrin. A content of the cationic resin is preferably from 1 to 15% by weight, and particularly preferably from 3 to 10% by weight based on all of the solids of the ink-receiving layer.

Examples of the light fastness improver include zinc sulfate, zinc oxide, hindered amine-based antioxidants, and benzotriazole-based ultraviolet absorbers such as benzophenone. Of these is particularly suitable zinc sulfate.

The surfactant functions as a coating aid, a peeling improver, a sliding improver, or an antistatic agent. The surfactant is described in JP-A-62-173463 and JP-A-62-183457. An organic fluorocarbon compound may be used in place of the surfactant. Preferably, the organic fluorocarbon compound is hydrophobic. Examples of the organic fluorocarbon compound include fluorine-based surfactants, oily fluorine-based compounds (such as fluorocarbon oils), and solid fluorine-based compounds (such as tetrafluoroethylene resins). The organic fluorocarbon compound is described in JP-B-57-9053 (columns 8 to 17), JP-A-61-20994, and JP-A-62-135826.

Examples of other additives to be added to the ink-receiving layer include a pigment dispersing agent, a thickening agent, an antifoaming agent, a dye, a fluorescent brightener, an antiseptic, a pH regulator, a matting agent, and a hardener. Incidentally, the ink-receiving layer may be a single layer or a double layer.

The recording paper or recording film can be provided with a back-coat layer. Examples of components that can be added to the layer include a white pigment, an aqueous binder, and other components.

Examples of the white pigment to be contained in the back-coat layer include white inorganic pigments such as precipitated calcium carbonate light, calcium carbonate heavy, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudoboehmite, aluminum hydroxide, alumina, lithopone, zeolite, hydrated halloysite, magnesium carbonate, and magnesium hydroxide; and organic pigments such as styrenic plastic pigments, arylic plastic pigments, polyethylene, microcapsules, urea resins, and melamine resins.

Examples of the aqueous binder to be contained in the back-coat layer include water-soluble polymeric materials such as a styrene/maleic acid salt copolymer, a styrene/acrylic acid salt copolymer, polyvinyl alcohol, silanol-modified polyvinyl alcohol, starch, cationic starch, casein, gelatin, carboxymethyl cellulose, hydroxymethyl cellulose, and polyvinyl pyrrolidone; and water-dispersible polymeric materials such as styrene-butadiene latices and acrylic emulsions. Examples of other components to be contained in the back-coat layer include an deforming agent, a deforming agent, a dye, a fluorescent brightener, an antiseptic, and a waterproofing agent.

In the constitutional layers (including the back-coat layer) of the inkjet recording paper or recording film, may be added a polymer latex. The polymer latex is used for the purpose of improving the film physical properties such as dimensional stabilization, prevention of curling, prevention of adhesion, and prevention of film cracks. The polymer latex is described in JP-A-62-245258, JP-A-62-1316648, and JP-A-62-110066. When a polymer latex having a low glass transition temperature (40° C. or lower) is added in the layer containing a mordant, the film cracks and the curling can be prevented. Further, when a polymer latex having a high glass transition temperature is added to the back-coat layer, the curling can be prevented.

In the ink of the invention, there is no restriction on the inkjet recording mode. Examples include known modes such as a charge control mode for discharging the ink utilizing an electrostatic induction force; a drop-on-demand mode (pressure pulse mode) utilizing an oscillation pressure of piezoelectric elements; an acoustic injection mode for converting electric signals into acoustic beams, irradiating the ink with the acoustic beams and discharging the ink utilizing a radiation pressure; and a thermal inkjet mode for heating the ink to form foams and utilizing a generated pressure. The inkjet recording mode includes a mode for injecting many small-volume inks having a low concentration, called a photo-ink; a mode for using a plurality of inks having substantially the same hue and a different concentration to improve the image quality; and a mode for using a colorless transparent ink.

[Color Toner]

As a color toner binder for introducing the phthalocyanine compound of the invention, all of binders that are generally used can be used. Examples thereof include styrenic resins, acrylic resins, styrene/acrylic resins, and polyester resins.

For the purposes of fluidity improvement and charge control, inorganic fine powders or organic fine particles may be externally added to the toner. Silica fine particles and titania fine particles, whose surfaces are treated with, for example, an alkyl group-containing coupling agent, are suitably used. In this case, it is preferred that the fine particles have a number average primary particle size of from 10 to 500 nm and added in an amount of from 0.1 to 20% by weight in the toner.

As a release agent, all of release agents that have hitherto been used can be used. Specific examples thereof include olefins such as low-molecular weight polypropylene, low-molecular weight polyethylene, and ethylene-propylene copolymers, microcrystalline wax, carnauba wax, sasol wax, and paraffin wax. An amount of the release agent is preferably from 1 to 5% by weight in the toner.

A charge control agent may be optionally added. The charge control agent is preferably colorless from the standpoint of color formation. Examples thereof include ones having a quaternary ammonium structure and ones having a calixarene structure.

As a carrier, any of non-coated carriers constituted of only magnetic material particles such as iron and ferrite, and resin-coated carriers in which the surfaces of magnetic material particles are coated with a resin may be used. Preferably, the carrier has a mean particle size of from 30 to 150 μm in terms of volume mean particle size.

The image formation method to which the toner of the invention is applied is not particularly limited. Examples thereof include a method in which color images are repeatedly formed on a light-sensitive material, followed by transfer to form images; and a method in which images formed on a light-sensitive material are successively transferred to an intermediate transfer material, and color images are formed on the intermediate transfer material, followed by transfer to an image-forming member such as paper, to form color images.

[Thermal Transfer Material]

A thermal recording material is constructed of an ink sheet prepared by applying the phthalocyanine compound of the invention together with a binder on a support; and an image-receiving sheet in which a dye migrated corresponding to a heat energy applied from a thermal head according to image recording signals is fixed. The ink sheet can be formed by dissolving the compound of the invention together with a binder in a solvent, or dispersing them in a fine particle state in a solvent, to prepare an ink, and applying the ink on a support, followed by properly drying. With respect to the preferred binder resin, ink solvent, support, and image-receiving sheet, which can be used, those described in JP-A-7-137466 can be suitably used.

In order to apply the thermal recording material to thermal recording materials capable of undergoing full-color image recording, it is preferred to apply and form a cyan ink sheet containing a heat diffusible cyan dye capable of forming a cyan image, a magenta ink containing a heat diffusible magenta dye capable of forming a magenta image, and a yellow ink sheet containing a heat diffusible yellow dye capable of forming a yellow image successively on a support. If desired, an ink sheet containing a black image-forming substance may further be formed.

[Color Filter]

As a method for forming a color filter, there are a method in which a pattern is first formed by a photoresist and then dyed; and a method in which a pattern is formed by a photoresist having a dye added thereto, as disclosed in JP-A-4-163552, JP-A-4-128703, and JP-A-4-175753. As a method for introducing the phthalocyanine compound of the invention in the color filter, these two methods may be employed. As a preferred method, can be enumerated a method for forming a color filter, in which a positive-working resist composition comprising a thermosetting resin, a quinonediazide compound, a crosslinking agent, a dye, and a solvent is applied on a substrate; exposure is carried out through a mask; the exposed areas are developed to form a positive-working resist pattern; the positive-working resist pattern is entirely exposed; and the exposed positive-working resist pattern is cured, as described in JP-A-4-175753 and JP-A-6-35182. Further, RGB primary color system or Y, M, C complementary color system color filters can be obtained by forming a black matrix according to the customary manner.

With respect to the thermosetting resin, quinonediazide compound, crosslinking agent, and solvent, which are used, and their amounts, those described in the above-cited patents can be suitably used.

EXAMPLES

The invention will be described with reference to the following Examples, but it should not be construed that the invention is limited to these Examples.

Example I-1

(Preparation of Sample A)

A phthalocyanine compound (Illustrative Compound I-101, an oil-soluble dye) (5.3 g) and 7.04 g of sodium dioctylsulfosuccinate were dissolved in 4.22 g of the following high-boiling organic solvent (s-2), 5.63 g of the following high-boiling organic solvent (s-11), and 50 mL of ethyl acetate at 70° C. To this solution, 500 mL of deionized water was added while stirring with a magnetic stirrer, to prepare an oil-in-water type coarse dispersion. Next, the coarse dispersion was passed through a micro-fluidizer (MICROFLUIDEX INC) 5 times under a pressure of 600 bar to form fine particles. Further, the resulting emulsion was subjected to desolvation by a rotary evaporator until a smell of the ethyl acetate became disappeared. To the thus obtained fine emulsion of the hydrophobic dye, were added 140 g of diethylene glycol, 50 g of glycerin, 7 g of SURFYNOL 465 (made by Air Product & Chemicals), and 900 mL of deionized water, to prepare an ink.

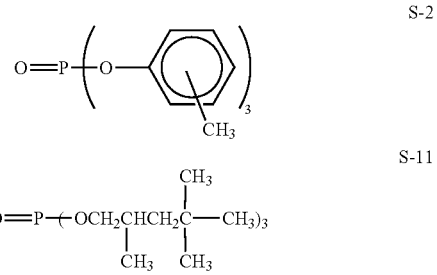

(Preparation of Samples B to G)

Samples B to G were prepared in the same manner as in the preparation of Sample A, except that the phthalocyanine compound (Illustrative Compound I-101, an oil-soluble dye) was replaced by each of the phthalocyanine compounds (oil-soluble dyes) as shown in Table I-11. At that time, Ink Solutions 101 to 108 were prepared as comparative ink solutions using the following Comparative Compounds 1 to 8.

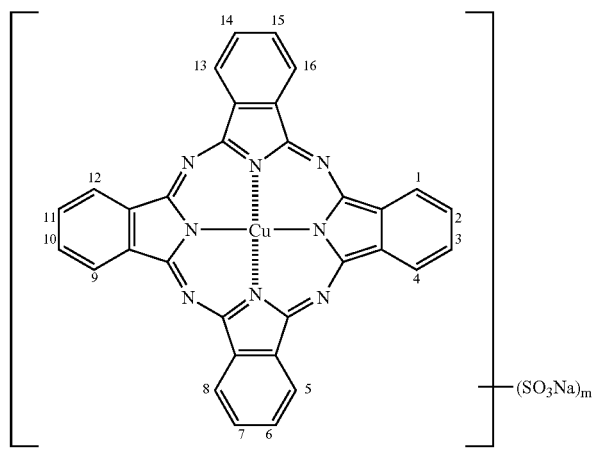

Comparative Compound 1

Substitution position: Mixture at the 1-position to 16-position
Number of substitutions: Mixture of m = 4, 3, 2

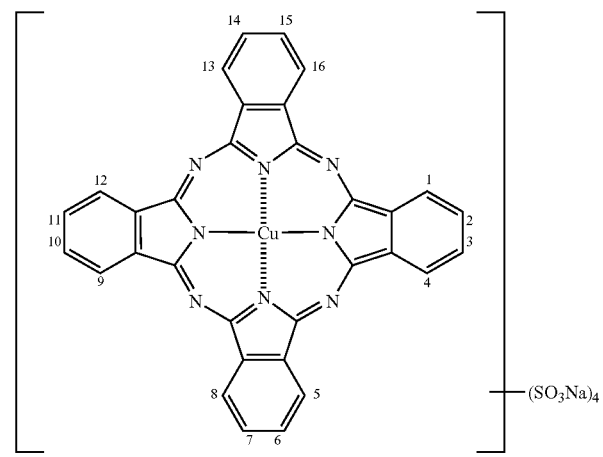

Comparative Compound 2

Substitution position: Mixture at the 1-position to 16-position

-continued
Comparative Compound 3
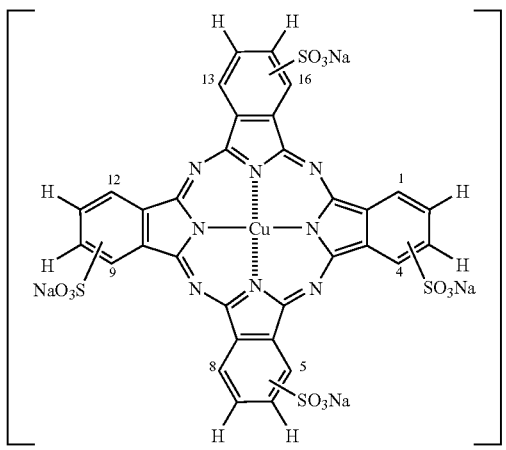
Comparative Compound 4
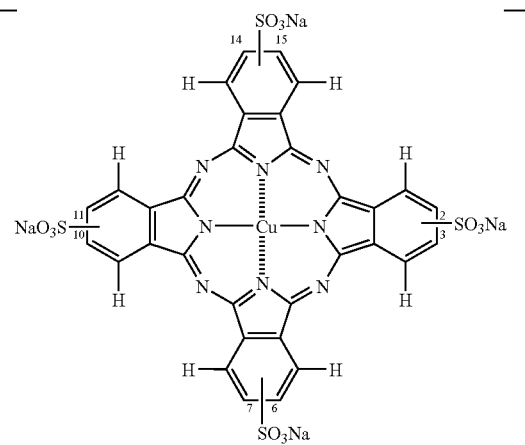
Comparative Compound 5
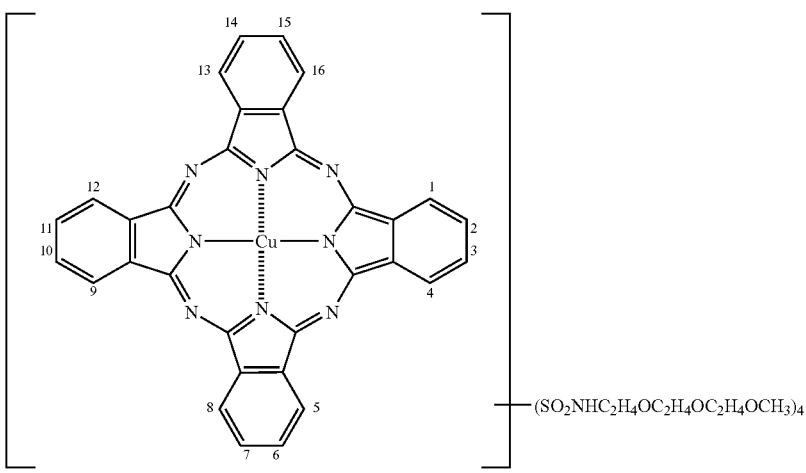
Substitution position: Mixture at the 1-position to 16-position
Comparative Compound 6
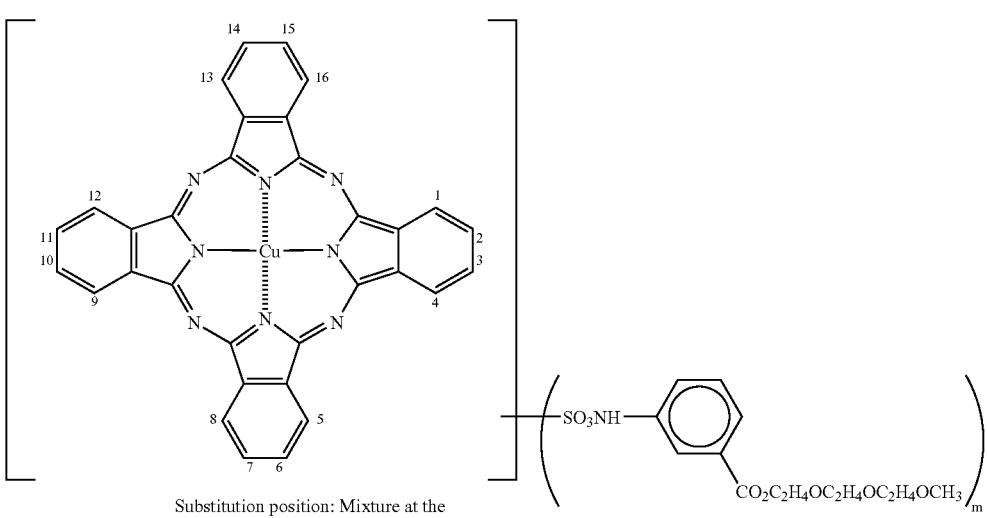
Substitution position: Mixture at the 1-position to 16-position
Number of substitutions: Mixture of m = 4, 3, 2

-continued

Comparative Compound 7

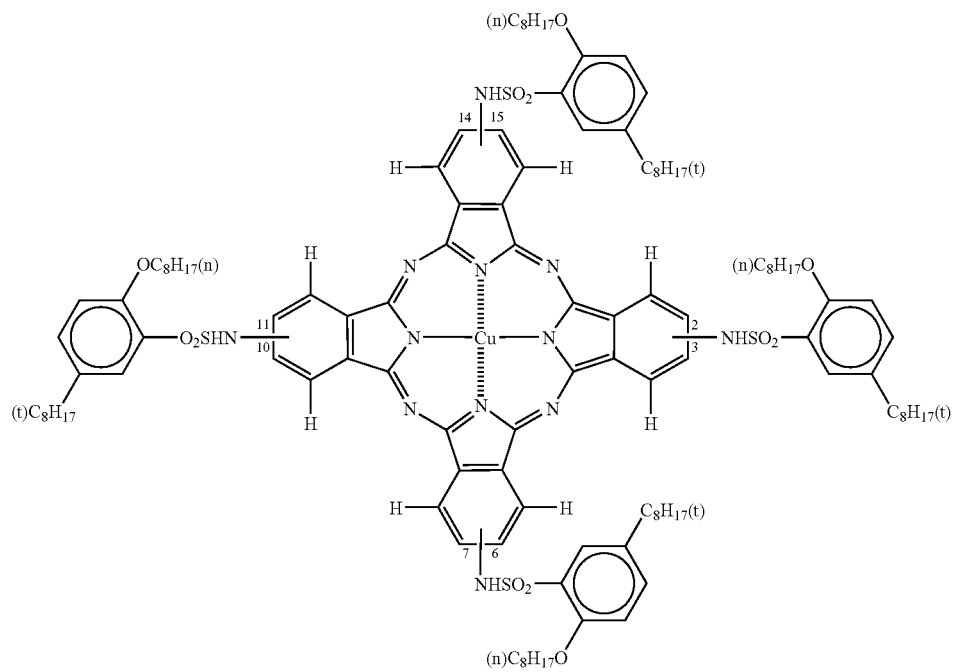

Comparative Compound 8

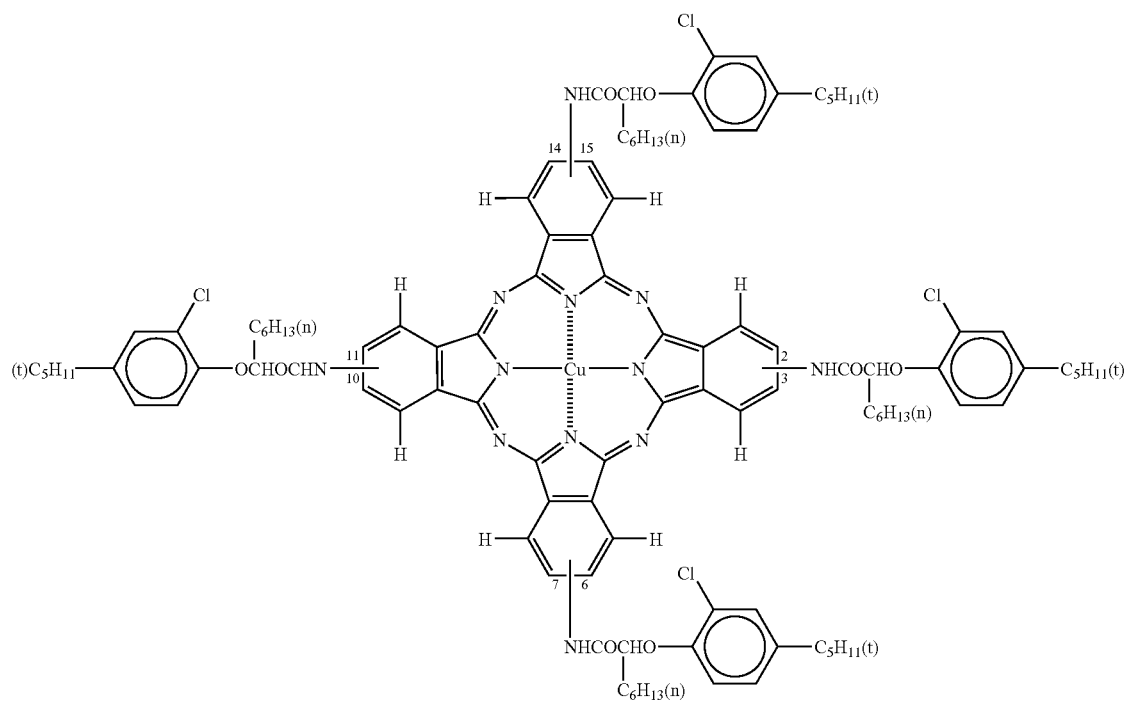

In the case where the dye was changed, the dye was used such that the addition amount was equimolar to the Ink Solution A. In the case where two or more kinds of the dyes were used, they were used in equimolar amounts, respectively.

(Image Recording and Evaluation)

The inkjet inks of the Examples (Ink Solutions A to G) and Comparative Examples (Ink Solutions 101 to 108) were evaluated in the following manners. The results are shown in Table I-11.-

Incidentally, in Table I-11, the "color tone", "paper dependency", "water resistance", and "light fastness" were evaluated after recording images with each inkjet ink on a photo glossy paper [PM photographic paper "Kotaku" (KA420PSK, EPSON), made by EPSON] using an inkjet printer (PM-700C, made by EPSON).

<Color Tone>

The images formed on the photo glossy paper were subjected to colorimetry with respect to a reflection spectrum in an interval of 10 nm in a region of from 390 to 730 nm using GRETAG SPM100-II (made by GRETAG), from which were calculated a* and b* based on the L*a*b* color space system of CIE (Commission Internationale l'Eclairage). In comparison with a color sample of standard cyan of Japan Colour (a color obtained by colorimetry of proof-printed solid patches provided from 21 companies of JNC (Japan Printing Machinery Manufacturers Asscoiation) and undergoing printing using Japan Colour Ink SF-90 and Japan Paper such that a color difference ($\Delta E$) became minimum against its mean value) of JNC, a preferable color tone as cyan was defined as follows.

L*: Within the range of 53.6±0.2
○: a* (the range of −35.6±6) and b* (the range of −50.4±6)
Δ: Either one of a* or b* (the preferred region defined with "○")
×: Both of a* and b* (outside the preferred region defined with "○")

The color values of the color sample of the standard cyan of Japan Colour used herein for reference are shown below.
L*: 53.6±0.2
a*: −37.4±0.2
b*: −50.2±0.2
ΔE: 0.4(0.1 to 0.7)
(1) Printer: Mann Roland R-704, Ink: Japan Colour SF-90, Japan Color Standard Paper: Tokubishi Art
(2) Colorimetry: Colorimeter: X-rite 938, 0/45, D50, 2 deg., Black Backing <Paper Dependency>

The images formed on the photo glossy paper were compared in color tone with images separately formed on a PPC plain paper and evaluated in accordance with the following two grades: the case where a difference between the both images was small is designated as "A" (good), and the case where the difference therebetween was large is designated as "B" (poor), respectively.

<Water Resistance>

The photo glossy paper having images formed thereon was dried at room temperature for one hour, dipped in deionized water for 10 seconds, and then spontaneously dried at room temperature, thereby observing bleeding. The evaluation was made in accordance with the following three grades: the case where no bleeding was observed is designated as "A", bleeding was slightly observed is designated as "B", and bleeding was largely observed is designated as "C", respectively.

<Light Fastness>

The photo glossy paper having images formed thereon was irradiated with a xenon light (85,000 lx) using a weatherometer (Weather-O-meter, made by Atlas, U.S.A.) for 7 days, and an image density before and after the irradiation with a xenon light was measured using a reflection densitometer (X-Rite 310TR) and evaluated as a dye retention rate. The reflection density was measured at three points, 1, 1.5 and 2.0.

The evaluation was made in accordance with the following three grades: the case where the dye retention rate was 70% or more at any density is designated as "A", the case where the dye retention rate was less than 70% at one or two points is designated as "B", and the case where the dye retention rate was less than 70% at all of the densities is designated as "C", respectively.

<Dark-heat Preservability>

The photo glossy paper having images formed thereon was preserved at 80° C. and at 15% RH for 7 days, and an image density before and after the preservation was measured using a reflection densitometer (X-Rite 310TR) and evaluated as a dye retention rate. The dye retention rate was measured at three points of reflection density, 1, 1.5 and 2.0. The evaluation was made in accordance with the following three grades: the case where the dye retention rate was 90% or more at any density is designated as "A", the case where the dye retention rate was less than 90% at two points is designated as "B", and the case where the dye retention rate was less than 90% at all of the densities is designated as "C", respectively.

<Ozone Gas Resistance>

In a box set in a dark place at an ozone gas concentration of 0.5±0.1 ppm and at room temperature, the photo glossy paper having images formed thereon was allowed to stand for 7 days while passing dry air within a Siemens type double glass tube and applying an alternating current of 5 kV, and an image density before and after standing under an ozone gas was measured using a reflection densitometer (X-Rite 310TR) and evaluated as a dye retention rate. The dye retention rate was measured at three points of reflection density, 1, 1.5 and 2.0. The ozone gas concentration in the box was set using an ozone gas monitor made by APPLICS (model: OZG-EM-01).

The evaluation was made in accordance with the following three grades: the case where the dye retention rate was 70% or more at any density is designated as "A", the case where the dye retention rate was less than 70% at one or two points is designated as "B", and the case where the dye retention rate was less than 70% at all of the densities is designated as "C", respectively. Table I-11

| Sample No. of ink solution | Compound No. | Pc Structure Substitution position (α or β) Number of substitutions (n) | Color tone | Paper dependency | Water resistance | Light fastness | Dark-heat preservability | Ozone resistance |
|---|---|---|---|---|---|---|---|---|
| A | I-101 | β-Position (n = 4) | ○ | A | A | A | A | A |

-continued

| Sample No. of ink solution | Compound No. | Pc Structure Substitution position (α or β) Number of substitutions (n) | Color tone | Paper dependency | Water resistance | Light fastness | Dark-heat preservability | Ozone resistance |
|---|---|---|---|---|---|---|---|---|
| B | I-102 | β-Position (n = 4) | ○ | A | A | A | A | A |
| C | I-103 | β-Position (n = 4) | ○ | A | A | A | A | A |
| D | I-104 | β-Position (n = 4) | ○ | A | A | A | A | A |
| E | I-109 | β-Position (n = 4) | ○ | A | A | A | A | A |
| F | I-110 | β-Position (n = 4) | ○ | A | A | A | A | A |
| G | I-111 | β-Position (n = 4) | ○ | A | A | A | A | A |
| 101 | Comparative Compound 1 | α,β-Mixture (n = 4, 3, 2) | Δ | B | B | B | A | C |
| 102 | Comparative Compound 2 | α,β-Mixture (n = 4) | ○ | B | B | B | A | C |
| 103 | Comparative Compound 3 | α-Position (n = 4) | Δ | A | B | B | A | C |
| 104 | Comparative Compound 4 | β-Position (n = 4) | ○ | A | B | B | A | C |
| 105 | Comparative Compound 5 | α,β-Positions (n = 4) | Δ | B | B | B | B | C |
| 106 | Comparative Compound 6 | α,β-Positions (n = 2 to 4) | Δ | B | B | B | B | C |
| 107 | Comparative Compound 7 | β-Position (n = 4) | Δ | B | B | B | B | C |
| 108 | Comparative Compound 8 | β-Position (n = 4) | Δ | B | B | B | B | C |

As is clear from Table I-11, the inkjet inks of the invention were superior in the color tone, small in the paper dependency, and superior in the water resistance, light fastness and ozone gas resistance. Especially, it is clear that the inkjet inks of the invention are superior in image preservability such as light fastness and ozone gas resistance.

Example I-2

Using the same cartridge as prepared in Example I-1, images were printed on an inkjet paper photo glossy paper EX, made by Fuji Photo Film, by means of the same apparatus as in Example I-1, and then evaluated in the same manner as in Example I-1. As a result, similar results to those in Example I-1 were obtained.

Example I-3

The same ink as prepared in Example I-1 was packed in a cartridge of an inkjet printer BJ-F850 (made by CANON). Using this cartridge, images were printed on an inkjet paper photo glossy paper GP-301 of the same company by means of the same apparatus, and then evaluated in the same manner as in Example I-1. As a result, similar results to those in Example I-1 were obtained.

Example I-4

Three parts by weight of each of the phthalocyanine compounds of the invention (Compounds I-101, I-121, I-141 and I-161) and 100 parts by weight of a resin for toner [a styrene-acrylic acid ester copolymer; a trade name: Himer TB-1000F (made by Sanyo Chemical)] were mixed and pulverized in a ball mill. The mixture was heated at 150° C. for melt kneading, and after cooling, the mixture was coarsely ground by means of a hammer mill. Thereafter, the coarse particles were pulverized by an air jet-mode pulverizer and classified by sieving to choose particles of from 1 to 20 microns as a toner. Ten parts of the toner was uniformly mixed with 900 parts of a carrier iron powder (a trade name: EFV250/400, made by Nippon Teppun) to prepare a developer. Similarly, samples of comparative coloring agents as shown in Table I-12 were prepared in the same manner, except that 3 parts by weight of the dye and 6 parts by weight of the pigment were used. Using these developers, copying was carried out by means of a dry type electrophotographic copier for plain paper [a trade name: NP-5000, made by CANON].

On each of paper and OHP, was prepared a reflection image (image on the paper) or a transmission image (on the OHP) with the developer using the color toner containing the compound of the invention by the foregoing image formation method. Then, evaluation was carried out in the following manner. Incidentally, the evaluation was made within the range of an adhesion amount of the toner of 0.7±0.05 (mg/cm$^2$).

The obtained images were evaluated with respect to hue and light fastness. The hue was visually evaluated in accordance with three grades, "best", "good" and "poor". The evaluation results are shown in Table I-12. In Table I-12, "○" means that the hue was best, "Δ" means that the hue was good, and "×" means that the hue was poor, respectively. With respect to the light fastness, an image density Ci immediately after recording was measured, and images were irradiated with a xenon light (85,000 lx) using a weatherometer (Atlas C. 165) for 5 days. Then, an image density Cf was again measured. A dye retention rate ($\{(Ci-Cf)/Ci\} \times 100\%$) was calculated from a difference in the image density before and after the irradiation with a xenon light and evaluated. The image density was measured using a reflection densitometer (X-Rite 310TR). The evaluation results are shown in Table I-12. In Table I-12, the case where the dye retention rate was 90% or more is designated as "○", the case where the dye retention rate was from 90 to 80% is designated as "Δ", and the case where the dye retention rate was less than 80% is designated as "×", respectively.

The transparency of the OHP image was evaluated in the following manner. A visible light spectral transmittance of the image was measured by means of 330 Model Autographic Spectrophotometer made by. Hitachi, Ltd. while using an OHP sheet not having a toner supported thereon as a reference, and a spectral transmittance at 450 nm was obtained as a measure of the transparency of the OHP image. The case where the spectral transmittance was 80% or more is designated as "○", the case where the spectral transmittance was from 70 to 80% is designated as "Δ", and the case where the spectral transmittance was less than 70% is designated as "×", respectively. The results are shown in Table I-12.

TABLE I-12

| Test compound No. | Hue | fastness | Transparency |
|---|---|---|---|
| Invention | I-101 | ○ | ○ | ○ |
| Invention | I-104 | ○ | ○ | ○ |
| Invention | I-115 | ○ | ○ | ○ |
| Invention | I-132 | ○ | ○ | ○ |
| Comparative Example I-1 | Comparative Dye 9 | Δ | Δ | Δ |
| Comparative Example I-2 | Comparative Dye 10 | Δ | Δ | Δ |
| Comparative Example I-3 | C.I. Solvent Blue 38 | × | ○ | × |

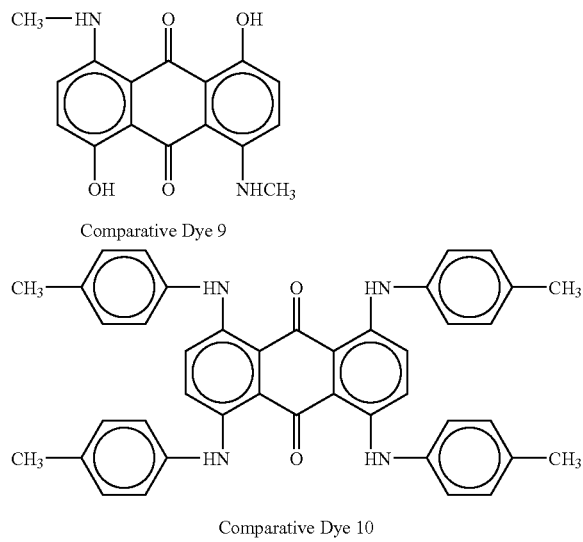

Comparative Dye 9

Comparative Dye 10

As is clear from Table I-12, as compared with the comparative dyes, the phthalocyanine compounds of the invention are superior in the light fastness, sharp in the hue, and high in the transparency. When the color toner of the invention is used, faithful color reproducibility and high OHP quality are obtained, and hence, the color toner of the invention is suitable for use as a full-color toner. Further, since the phthalocyanine compounds of the invention are superior in the light fastness, it is possible to provide images that can be preserved over a long period of time.

Example I-5

<Preparation Method of Color Filter>

In this Example, the results obtained when the phthalocyanine compound was applied for a color filter are shown. The color filter was prepared in the following method. Specifically, a positive-working resist composition containing a thermosetting resin, a quinonediazide compound, a crosslinking agent, a dye, and a solvent was spin coated on a silicone wafer and heated to evaporate off the solvent. Thereafter, exposure was carried out through a mask to decompose the quinonediazide compound. If necessary, after heating, development was carried out to obtain a mosaic pattern. The exposure was carried out using an i-line exposure stepper, HITACHI LD-5010-i (NA=0.40) made by Hitachi, Ltd. Further, as the developing solution, was used SOPD or SOPD-B made by Sumitomo Chemical.

<Preparation of Positive-working Resist Composition>

A positive-working resist composition was obtained by mixing 3.4 parts by weight of a cresol novolak resin (weight average molecular weight calculated as polystyrene: 4,300) obtained from an m-cresol/p-cresol/formaldehyde mixture (reaction molar ratio=5/5/7.5), 1.8 parts by weight of o-naphthoquinonediazide-5-sulfonic acid ester (in which two (in average) hydroxyl groups are esterified) produced using Phenol Compound (A) represented by the following formula, 0.8 parts by weight of hexamethoxymethyloled melamine, 20 parts by weight of ethyl lactate, and 1 part by weight of the phthalocyanine compound of the invention as shown in Table I-13.

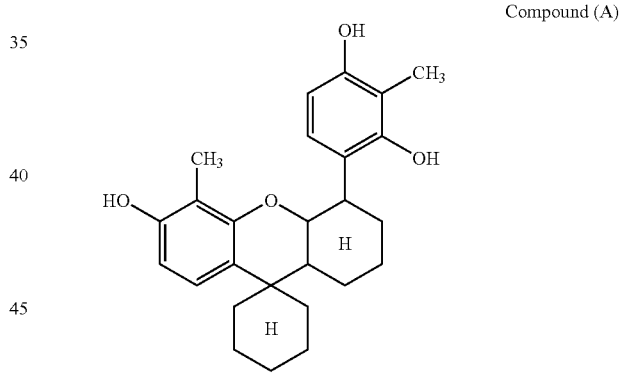

Compound (A)

<Preparation of Color Filter>

The obtained positive-working resist composition was spin coated on a silicone wafer, and the solvent was then evaporated off. After exposure, the exposed silicone wafer was heated at 100° C. and subjected to alkaline development to remove exposed areas. There was thus obtained a positive-working colored pattern having a resolution of 0.8 μm. The pattern was entirely exposed and heated at 150° C. for 15 minutes to obtain a cyan complementary color system color filter.

Comparative Example

A positive-working resist composition was obtained by mixing 1 part by weight of the following Comparative Dye 11 in place of the cyan-based phthalocyanine compound of the invention as used in the above-described Example. The obtained positive-working resist composition was spin coated on a silicone wafer, and the solvent was then evaporated off. After exposure, the exposed silicone wafer was subjected to alkaline development to obtain a positive-working colored pattern having a resolution of 1 μm. The pattern was entirely exposed and heated at 150° C. for 10 minutes to obtain a magenta color filter.

<Evaluation>

A transmission spectrum of the obtained cyan color filter was measured, and the sharpness in the short wave side and long wave of the spectrum as an important factor in the color reproduction was relatively evaluated. "○" means that the sharpness is at a good level, "Δ" means that the sharpness is at a barely allowable level, and "×" means that the sharpness is at a non-allowable level, respectively. Further, the color filter was irradiated with a xenon light (85,000 lx) using a weatherometer (Atlas C. 165) for 7 days, and an image density before and after the irradiation with a xenon light was measured and evaluated as a dye retention rate.

TABLE I-13

|  | Dye/Pigment No. | Absorption characteristic | Light fastness |
|---|---|---|---|
| Invention | I-104 | ○ | 98% |
| Invention | I-112 | ○ | 95% |
| Comparative Example | Comparative Dye 11 | Δ | 18% |

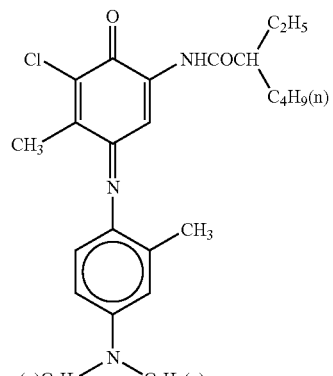

Comparative Dye 11

As compared with the Comparative Example, the phthalocyanine compounds of the invention were sharp in the sharpness in the short wave side and long wave side of the spectrum and hence, were superior in the color reproducibility. Further, it was shown that the phthalocyanine compounds of the invention were superior in the light fastness to the comparative compound.

Example I-6

A test of Example I-6 was carried out in the same procedures as in Example I-1, except that the test method of Example I-1 was changed to the following environmental test. Namely, the test was carried out by an oxidation resistance test method using a fluorescent lamp-irradiated chamber at a relative humidity of 80% and at a hydrogen peroxide concentration of 120 ppm, as described in H. Iwano, et al., *Journal of Imaging Science and Technology*, Vol. 38, 140–142 (1994), as an oxidizing gas resistance test method simulating an outdoor environment exposed with oxidizing gases such as exhaust gases of automobiles and sunlight. The results were the same as in Example I-1.

Example II-1

Deionized water was added to the following components to make one liter, and the mixture was stirred for one hour while heating at 30 to 40° C. Thereafter, the reaction mixture was adjusted at a pH of 9 with 10 moles/L of KOH and filtered under reduced pressure by a 25-μm micro-filter, to prepare a cyan ink solution.

(Preparation of Ink Solution A)

A phthalocyanine compound (Illustrative Compound II-101, an oil-soluble dye) (20.0 g), 0.06 g of benzotriazole, and 1.8 g of PROXEL XL2 were dissolved in 230 g of diethylene glycol monobutyl ether, 80 g of 2-pyrrolidone, 17.9 g of triethanolamine, and 50 mL of ethyl acetate at 70° C. To this solution, 500 mL of deionized water was added while stirring with a magnetic stirrer, to prepare an oil-in-water type coarse dispersion. Next, the coarse dispersion was passed through a micro-fluidizer (MICROFLUIDEX INC) 5 times under a pressure of 600 bar to form fine particles. Further, the resulting emulsion was subjected to desolvation by a rotary evaporator until a smell of the ethyl acetate became disappeared. To the thus obtained fine emulsion of the hydrophobic dye, were added 20 g of diethylene glycol, 120 g of glycerin, 8.5 g of SURFYNOL 465 (made by Air Product & Chemicals), and 900 mL of deionized water, to prepare an ink.

(Preparation of Ink Solutions B to G)

Ink Solutions B to G were prepared in the same manner as in Ink Solution A, except that the phthalocyanine compound Illustrative Compound II-101, an oil-soluble dye) of Ink solution A was replaced by each of the phthalocyanine dyes (oil-soluble dyes) shown in Table II-11. At that time, Ink Solutions 101 and 102 were prepared as comparative ink solutions using the above compounds.

In the case where the dye was changed, the dye was used such that the addition amount was equimolar to the Ink Solution A. In the case where two or more kinds of the dyes were used, they were used in equimolar amounts, respectively.

(Image Recording and Evaluation)

The inkjet inks of the Examples (Ink Solutions A to G) and Comparative Examples (Ink Solutions 101 and 102) were evaluated in the following manners. The results are shown in Table II-11.

Incidentally, in Table II-11, the "color tone", "paper dependency", "water resistance", and "light fastness" were evaluated after recording images with each inkjet ink on a photo glossy paper [PM photographic paper "Kotaku" (KA420PSK, EPSON), made by EPSON] using an inkjet printer (PM-700C, made by EPSON).

The color tone, paper dependency, water resistance, dark-heat preservability, and ozone gas resistance were evaluated in the same manner as in Example I-1.

TABLE II-11

| Sample No. of ink solution | Compound No. | Pc Structure Substitution position (α or β) Number of substitutions (n) | Color tone | Paper dependency | Water resistance | Light fastness | Dark-heat preservability | Ozone resistance |
|---|---|---|---|---|---|---|---|---|
| A | II-101 | β-Position (n = 4) | ○ | A | A | A | A | A |
| B | II-102 | β-Position (n = 4) | ○ | A | A | A | A | A |
| C | II-103 | β-Position (n = 4) | ○ | A | A | A | A | A |
| D | II-104 | β-Position (n = 4) | ○ | A | A | A | A | A |
| E | II-105 | β-Position (n = 4) | ○ | A | A | A | A | A |
| F | II-110 | β-Position (n = 4) | ○ | A | A | A | A | A |
| G | II-111 | β-Position (n = 4) | ○ | A | A | A | A | A |
| 101 | Comparative Compound 1 | α,β-Mixture (n = 4, 3, 2) | Δ | B | A | B | A | B |
| 102 | Comparative Compound 3 | α-Position (n = 4) | Δ | B | B | B | A | C |

As is clear from Table II-11, the inkjet inks of the invention were superior in the color tone, small in the paper dependency, and superior in the water resistance, light fastness and ozone gas resistance. Especially, it is clear that the inkjet inks of the invention are superior in image preservability such as light fastness and ozone gas resistance.

Example II-2

Using the same cartridge as prepared in Example II-1, images were printed on an inkjet paper photo glossy paper EX, made by Fuji Photo Film, by means of the same apparatus as in Example II-1, and then evaluated in the same manner as in Example II-1. As a result, similar results to those in Example II-1 were obtained.

Example II-3

The same ink as prepared in Example II-1 was packed in a cartridge of an inkjet printer BJ-F850 (made by CANON). Using this cartridge, images were printed on an inkjet paper photo glossy paper GP-301 of the same company by means of the same apparatus, and then evaluated in the same manner as in Example II-1. As a result, similar results to those in Example II-1 were obtained.

Example II-4

Three parts by weight of each of the phthalocyanine compounds of the invention (Compounds II-101, II-121 and II-161) and 100 parts by weight of a resin for toner [a styrene-acrylic acid ester copolymer; a trade name: Himer TB-1000F (made by Sanyo Chemical)] were mixed and pulverized in a ball mill. The mixture was heated at 150° C. for melt kneading, and after cooling, the mixture was coarsely ground by means of a hammer mill. Thereafter, the coarse particles were pulverized by an air jet-mode pulverizer and classified by sieving to choose particles of from 1 to 20 microns as a toner. Ten parts of the toner was uniformly mixed with 900 parts of a carrier iron powder (a trade name: EFV250/400, made by Nippon Teppun) to prepare a developer. Similarly, samples of comparative coloring agents as shown in Table II-12 were prepared in the same manner, except that 3 parts by weight of the dye and 6 parts by weight of the pigment were used. Using these developers, copying was carried out by means of a dry type electrophotographic copier for plain paper [a trade name: NP-5000, made by CANON].

On each of paper and OHP, was prepared a reflection image (image on the paper) or a transmission image (on the OHP) with the developer using the color toner containing the compound of the invention by the foregoing image formation method. Then, evaluation was carried out in the following manner. Incidentally, the evaluation was made within the range of an adhesion amount of the toner of $0.7 \pm 0.05$ (mg/cm$^2$).

The obtained images were evaluated with respect to hue and light fastness. The hue was visually evaluated in accordance with three grades, "best", "good" and "poor". The evaluation results are shown in Table II-12. In Table II-12, "○" means that the hue was best, "Δ" means that the hue was good, and "×" means that the hue was poor, respectively. With respect to the light fastness, an image density Ci immediately after recording was measured, and images were irradiated with a xenon light (85,000 lx) using a weatherometer (Atlas C. 165) for 5 days. Then, an image density Cf was again measured. A dye retention rate ($\{(Ci-Cf)/Ci\} \times 100\%$) was calculated from a difference in the image density before and after the irradiation with a xenon light and evaluated. The image density was measured using a reflection densitometer (X-Rite 310TR). The evaluation results are shown in Table II-12. In Table II-12, the case where the dye retention rate was 90% or more is designated as "○", the case where the dye retention rate was from 90 to 80% is designated as "Δ", and the case where the dye retention rate was less than 80% is designated as "×", respectively.

The transparency of the OHP image was evaluated in the following manner. A visible light spectral transmittance of the image was measured by means of 330 Model Autographic Spectrophotometer made by Hitachi, Ltd. while using an OHP sheet not having a toner supported thereon as a reference, and a spectral transmittance at 450 nm was obtained as a measure of the transparency of the OHP image. The case where the spectral transmittance was 80% or more is designated as "○", the case where the spectral transmittance was from 70 to 80% is designated as "Δ", and the case where the spectral transmittance was less than 70% is designated as "×", respectively. The results are shown in Table II-12.

TABLE II-12

| | Test compound No. | Hue | Light fastness | Transparency |
|---|---|---|---|---|
| Invention | II-101 | ○ | ○ | ○ |
| Invention | II-102 | ○ | ○ | ○ |
| Invention | II-104 | ○ | ○ | ○ |
| Invention | II-112 | ○ | ○ | ○ |
| Comparative Example II-1 | Comparative Dye 9 | Δ | Δ | Δ |
| Comparative Example II-2 | Comparative Dye 10 | Δ | Δ | Δ |
| Comparative Example II-3 | C.I. Solvent Blue 38 | × ○ | | × |
| Comparative Example II-4 | C.I. Solvent Blue 70 | × ○ | | × |

As is clear from Table II-12, as compared with the comparative dyes, the phthalocyanine compounds of the invention are superior in the light fastness, sharp in the hue, and high in the transparency. When the color toner of the invention is used, faithful color reproducibility and high OHP quality are obtained, and hence, the color toner of the invention is suitable for use as a full-color toner. Further, since the phthalocyanine compounds of the invention are superior in the light fastness, it is possible to provide images that can be preserved over a long period of time.

Example II-5

<Preparation Method of Color Filter>

In this Example, the results obtained when the phthalocyanine compound was applied for a color filter are shown. The color filter was prepared in the following method. Specifically, a positive-working resist composition containing a thermosetting resin, a quinonediazide compound, a crosslinking agent, a dye, and a solvent was spin coated on a silicone wafer and heated to evaporate off the solvent. Thereafter, exposure was carried out through a mask to decompose the quinonediazide compound. If necessary, after heating, development was carried out to obtain a mosaic pattern. The exposure was carried out using an i-line exposure stepper, HITACHI LD-5010-i (NA=0.40) made by Hitachi, Ltd. Further, as the developing solution, was used SOPD or SOPD-B made by Sumitomo Chemical.

<Preparation of Positive-working Resist Composition>

A positive-working resist composition was obtained by mixing 3.4 parts by weight of a cresol novolak resin (weight average molecular weight calculated as polystyrene: 4,300) obtained from an m-cresol/p-cresol/formaldehyde mixture (reaction molar ratio=5/5/7.5), 1.8 parts by weight of o-naphthoquinonediazide-5-sulfonic acid ester (in which two (in average) hydroxyl groups are esterified) produced using the foregoing Phenol Compound (A), 0.8 parts by weight of hexamethoxymethyloled melamine, 20 parts by weight of ethyl lactate, and 1 part by weight of the phthalocyanine compound of the invention as shown in Table II-13.

<Preparation of Color Filter>

The obtained positive-working resist composition was spin coated on a silicone wafer, and the solvent was then evaporated off. After exposure, the exposed silicone wafer was heated at 100° C. and subjected to alkaline development to remove exposed areas. There was thus obtained a positive-working colored pattern having a resolution of 0.8 μm. The pattern was entirely exposed and heated at 150° C. for 15 minutes to obtain a cyan complementary color system color filter.

Comparative Example

A positive-working resist composition was obtained by mixing 1 part by weight of the foregoing Comparative Dye 11 in place of the cyan-based phthalocyanine compound of the invention as used in the above-described Example. The obtained positive-working resist composition was spin coated on a silicone wafer, and the solvent was then evaporated off. After exposure, the exposed silicone wafer was subjected to alkaline development to obtain a positive-working colored pattern having a resolution of 1 μm. The pattern was entirely exposed and heated at 150° C. for 10 minutes to obtain a magenta color filter.

<Evaluation>

A transmission spectrum of the obtained cyan color filter was measured, and the sharpness in the short wave side and long wave of the spectrum as an important factor in the color reproduction was relatively evaluated. "○" means that the sharpness is at a good level, "Δ" means that the sharpness is at a barely allowable level, and "×" means that the sharpness is at a non-allowable level, respectively. Further, the color filter was irradiated with a xenon light (85,000 lx) using a weatherometer (Atlas C. 165) for 7 days, and an image density before and after the irradiation with a xenon light was measured and evaluated as a dye retention rate.

TABLE II-13

| | Dye/Pigment No. | Absorption characteristic | Light fastness |
|---|---|---|---|
| Invention | II-105 | ○ | 98% |
| Invention | II-113 | ○ | 95% |
| Comparative Example | Comparative Dye 11 | Δ | 18% |

As compared with the Comparative Example, the phthalocyanine compounds of the invention were sharp in the sharpness in the short wave side and long wave side of the spectrum and hence, were superior in the color reproducibility. Further, it was shown that the phthalocyanine compounds of the invention were superior in the light fastness to the comparative compound.

Example II-6

A test of Example II-6 was carried out in the same procedures as in Example II-1, except that the test method of Example II-1 was changed to the following environmental test. Namely, the test was carried out by an oxidation resistance test method using a fluorescent lamp-irradiated chamber at a relative humidity of 80% and at a hydrogen peroxide concentration of 120 ppm, as described in H. Iwano, et al., *Journal of Imaging Science and Technology*, Vol. 38, 140–142 (1994), as an oxidizing gas resistance test method simulating an outdoor environment exposed with oxidizing gases such as exhaust gases of automobiles and sunlight. The results were the same as in Example II-1.

Example III-1

(Preparation of Sample A)

A phthalocyanine compound (Illustrative Compound III-101, an oil-soluble dye) (5.3 g) and 7.04 g of sodium dioctylsulfosuccinate were dissolved in 4.22 g of the foregoing high-boiling organic solvent (s-2), 5.63 g of the foregoing high-boiling organic solvent (s-11), and 50 mL of ethyl acetate at 70° C. To this solution, 500 mL of deionized water was added while stirring with a magnetic stirrer, to prepare an oil-in-water type coarse dispersion. Next, the coarse dispersion was passed through a micro-fluidizer (MICROFLUIDEX INC) 5 times under a pressure of 600 bar to form fine particles. Further, the resulting emulsion was subjected to desolvation by a rotary evaporator until a smell of the ethyl acetate became disappeared. To the thus obtained fine emulsion of the hydrophobic dye, were added 140 g of diethylene glycol, 50 g of glycerin, 7 g of SURFYNOL 465 (made by Air Product & Chemicals), and 900 mL of deionized water, to prepare an ink.

(Preparation of Samples B to G)

Samples B to G were prepared in the same manner as in the preparation of Sample 101, except that the phthalocyanine compound (Illustrative Compound III-101, an oil-soluble dye) was replaced by each of the phthalocyanine compounds (oil-soluble dyes) as shown in Table III-11. At that time, Ink Solutions 101 and 102 were prepared as comparative ink solutions using the foregoing Comparative Compounds 1 and 3.

In the case where the dye was changed, the dye was used such that the addition amount was equimolar to the Ink Solution A. In the case where two or more kinds of the dyes were used, they were used in equimolar amounts, respectively.

(Image Recording and Evaluation)

The inkjet inks of the Examples (Ink Solutions A to G) and Comparative Examples (Ink Solutions 101 and 102) were evaluated in the following manners. The results are shown in Table III-11.

Incidentally, in Table III-11, the "color tone", "paper dependency", "water resistance", and "light fastness" were evaluated after recording images with each inkjet ink on a photo glossy paper [PM photographic paper "Kotaku" (KA420PSK, EPSON), made by EPSON] using an inkjet printer (PM-700C, made by EPSON).

The color tone, paper dependency, water resistance, dark-heat preservability, and ozone gas resistance were evaluated in the same manner as in Example I-1.

TABLE III-11

| Sample No. of ink solution | Compound No. | Pc Structure Substitution position (α or β) Number of substitutions (n) | Color tone | Paper dependency | Water resistance | Light fastness | Dark-heat preservability | Ozone resistance |
|---|---|---|---|---|---|---|---|---|
| A | III-101 | β-Position (n = 4) | ○ | A | A | A | A | A |
| B | III-102 | β-Position (n = 4) | ○ | A | A | A | A | A |
| C | III-103 | β-Position (n = 4) | ○ | A | A | A | A | A |
| D | III-104 | β-Position (n = 4) | ○ | A | A | A | A | A |
| E | III-109 | β-Position (n = 4) | ○ | A | A | A | A | A |
| F | III-110 | β-Position (n = 4) | ○ | A | A | A | A | A |
| G | III-111 | β-Position (n = 4) | ○ | A | A | A | A | A |
| 101 | Comparative Compound 1 | α,β-Mixture (n = 4, 3, 2) | Δ | B | B | B | A | C |
| 102 | Comparative Compound 3 | α-Position (n = 4) | Δ | B | B | B | A | C |

As is clear from Table III-11, the inkjet inks of the invention were superior in the color tone, small in the paper dependency, and superior in the water resistance, light fastness and ozone gas resistance. Especially, it is clear that the inkjet inks of the invention are superior in image preservability such as light fastness and ozone gas resistance.

Example III-2

Using the same cartridge as prepared in Example III-1, images were printed on an inkjet paper photo glossy paper EX, made by Fuji Photo Film, by means of the same apparatus as in Example III-1, and then evaluated in the same manner as in Example III-1. As a result, similar results to those in Example III-1 were obtained.

Example III-3

The same ink as prepared in Example III-1 was packed in a cartridge of an inkjet printer BJ-F850 (made by CANON). Using this cartridge, images were printed on an inkjet paper photo glossy paper GP-301 of the same company by means of the same apparatus, and then evaluated in the same manner as in Example III-1. As a result, similar results to those in Example III-1 were obtained.

Example III-4

Three parts by weight of each of the phthalocyanine compounds of the invention (Compounds III-101, III-121, III-141 and III-161) and 100 parts by weight of a resin for toner [a styrene-acrylic acid ester copolymer; a trade name: Himer TB-1000F (made by Sanyo Chemical)] were mixed and pulverized in a ball mill. The mixture was heated at 150°

C. for melt kneading, and after cooling, the mixture was coarsely ground by means of a hammer mill. Thereafter, the coarse particles were pulverized by an air jet-mode pulverizer and classified by sieving to choose particles of from 1 to 20 microns as a toner. Ten parts of the toner was uniformly mixed with 900 parts of a carrier iron powder (a trade name: EFV250/400, made by Nippon Teppun) to prepare a developer. Similarly, samples of comparative coloring agents as shown in Table III-12 were prepared in the same manner, except that 3 parts by weight of the dye and 6 parts by weight of the pigment were used. Using these developers, copying was carried out by means of a dry type electrophotographic copier for plain paper [a trade name: NP-5000, made by CANON].

On each of paper and OHP, was prepared a reflection image (image on the paper) or a transmission image (on the OHP) with the developer using the color toner containing the compound of the invention by the foregoing image formation method. Then, evaluation was carried out in the following manner. Incidentally, the evaluation was made within the range of an adhesion amount of the toner of 0.7±0.05 (mg/cm$^2$).

The obtained images were evaluated with respect to hue and light fastness. The hue was visually evaluated in accordance with three grades, "best", "good" and "poor". The evaluation results are shown in Table III-12. In Table III-12, "○" means that the hue was best, "Δ" means that the hue was good, and "×" means that the hue was poor, respectively. With respect to the light fastness, an image density Ci immediately after recording was measured, and images were irradiated with a xenon light (85,000 lx) using a weatherometer (Atlas C. 165) for 5 days. Then, an image density Cf was again measured. A dye retention rate ($\{(Ci-Cf)/Ci\} \times 100\%$) was calculated from a difference in the image density before and after the irradiation with a xenon light and evaluated. The image density was measured using a reflection densitometer (X-Rite 310TR). The evaluation results are shown in Table III-12. In Table III-12, the case where the dye retention rate was 90% or more is designated as "○", the case where the dye retention rate was from 90 to 80% is designated as "Δ", and the case where the dye retention rate was less than 80% is designated as "×", respectively.

The transparency of the OHP image was evaluated in the following manner. A visible light spectral transmittance of the image was measured by means of 330 Model Autographic Spectrophotometer made by Hitachi, Ltd. while using an OHP sheet not having a toner supported thereon as a reference, and a spectral transmittance at 450 nm was obtained as a measure of the transparency of the OHP image. The case where the spectral transmittance was 80% or more is designated as "○", the case where the spectral transmittance was from 70 to 80% is designated as "Δ", and the case where the spectral transmittance was less than 70% is designated as "×", respectively. The results are shown in Table III-12.

TABLE III-12

|  | Test compound No. | Hue | Light fastness | Transparency |
|---|---|---|---|---|
| Invention | III-101 | ○ | ○ | ○ |
| Invention | III-104 | ○ | ○ | ○ |
| Invention | III-115 | ○ | ○ | ○ |
| Invention | III-132 | ○ | ○ | ○ |
| Comparative Example III-1 | Comparative Dye 9 | Δ | Δ | Δ |
| Comparative Example III-2 | Comparative Dye 10 | Δ | Δ | Δ |
| Comparative Example III-3 | C.I. Solvent Blue 38 | × ○ | x |  |
| Comparative Example III-4 | C.I. Solvent Blue 70 | × ○ | x |  |

As is clear from Table III-12, as compared with the comparative dyes, the phthalocyanine compounds of the invention are superior in the light fastness, sharp in the hue, and high in the transparency. When the color toner of the invention is used, faithful color reproducibility and high OHP quality are obtained, and hence, the color toner of the invention is suitable for use as a full-color toner. Further, since the phthalocyanine compounds of the invention are superior in the light fastness, it is possible to provide images that can be preserved over a long period of time.

Example III-5

<Preparation Method of Color Filter>

In this Example, the results obtained when the phthalocyanine compound was applied for a color filter are shown. The color filter was prepared in the following method. Specifically, a positive-working resist composition containing a thermosetting resin, a quinonediazide compound, a crosslinking agent, a dye, and a solvent was spin coated on a silicone wafer and heated to evaporate off the solvent. Thereafter, exposure was carried out through a mask to decompose the quinonediazide compound. If necessary, after heating, development was carried out to obtain a mosaic pattern. The exposure was carried out using an i-line exposure stepper, HITACHI LD-5010-i (NA=0.40) made by Hitachi, Ltd. Further, as the developing solution, was used SOPD or SOPD-B made by Sumitomo Chemical.

<Preparation of Positive-working Resist Composition>

A positive-working resist composition was obtained by mixing 3.4 parts by weight of a cresol novolak resin (weight average molecular weight calculated as polystyrene: 4,300) obtained from an m-cresol/p-cresol/formaldehyde mixture (reaction molar ratio=5/5/7.5), 1.8 parts by weight of o-naphthoquinonediazide-5-sulfonic acid ester (in which two (in average) hydroxyl groups are esterified) produced using the foregoing Phenol Compound (A), 0.8 parts by weight of hexamethoxymethyloled melamine, 20 parts by weight of ethyl lactate, and 1 part by weight of the phthalocyanine compound of the invention as shown in Table III-13.

<Preparation of Color Filter>

The obtained positive-working resist composition was spin coated on a silicone wafer, and the solvent was then evaporated off. After exposure, the exposed silicone wafer was heated at 100° C. and subjected to alkaline development to remove exposed areas. There was thus obtained a positive-working colored pattern having a resolution of 0.8 µm. The pattern was entirely exposed and heated at 150° C. for 15 minutes to obtain a cyan complementary color system color filter.

Comparative Example

A positive-working resist composition was obtained by mixing 1 part by weight of the foregoing Comparative Dye 11 in place of the cyan-based phthalocyanine compound of the invention as used in the above-described Example. The obtained positive-working resist composition was spin coated on a silicone wafer, and the solvent was then evaporated off. After exposure, the exposed silicone wafer was subjected to alkaline development to obtain a positive-working colored pattern having a resolution of 1 μm. The pattern was entirely exposed and heated at 150° C. for 10 minutes to obtain a magenta color filter.

<Evaluation>

A transmission spectrum of the obtained cyan color filter was measured, and the sharpness in the short wave side and long wave of the spectrum as an important factor in the color reproduction was relatively evaluated. "○" means that the sharpness is at a good level, "Δ" means that the sharpness is at a barely allowable level, and "×" means that the sharpness is at a non-allowable level, respectively. Further, the color filter was irradiated with a xenon light (85,000 lx) using a weatherometer (Atlas C. 165) for 7 days, and an image density before and after the irradiation with a xenon light was measured and evaluated as a dye retention rate.

TABLE III-13

| | Dye/Pigment No. | Absorption characteristic | Light fastness |
|---|---|---|---|
| Invention | III-104 | ○ | 98% |
| Invention | III-112 | ○ | 95% |
| Comparative Example | Comparative Dye 11 | Δ | 18% |

As compared with the Comparative Example, the phthalocyanine compounds of the invention were sharp in the sharpness in the short wave side and long wave side of the spectrum and hence, were superior in the color reproducibility. Further, it was shown that the phthalocyanine compounds of the invention were superior in the light fastness to the comparative compound.

Example III-6

A test of Example III-6 was carried out in the same procedures as in Example III-1, except that the test method of Example III-1 was changed to the following environmental test. Namely, the test was carried out by an oxidation resistance test method using a fluorescent lamp-irradiated chamber at a relative humidity of 80% and at a hydrogen peroxide concentration of 120 ppm, as described in H. Iwano, et al., *Journal of Imaging Science and Technology*, Vol. 38, 140–142 (1994), as an oxidizing gas resistance test method simulating an outdoor environment exposed with oxidizing gases such as exhaust gases of automobiles and sunlight. The results were the same as in Example III-1.

Example IV-1

(Preparation of Sample A)

A phthalocyanine compound (Illustrative Compound IV-101, an oil-soluble dye) (5.3 g) and 7.04 g of sodium dioctylsulfosuccinate were dissolved in 4.22 g of the foregoing high-boiling organic solvent (s-2), 5.63 g of the foregoing high-boiling organic solvent (s-11), and 50 mL of ethyl acetate at 70° C. To this solution, 500 mL of deionized water was added while stirring with a magnetic stirrer, to prepare an oil-in-water type coarse dispersion. Next, the coarse dispersion was passed through a micro-fluidizer (MICROFLUIDEX INC) 5 times under a pressure of 600 bar to form fine particles. Further, the resulting emulsion was subjected to desolvation by a rotary evaporator until a smell of the ethyl acetate became disappeared. To the thus obtained fine emulsion of the hydrophobic dye, were added 140 g of diethylene glycol, 50 g of glycerin, 7 g of SURFYNOL 465 (made by Air Product & Chemicals), and 900 mL of deionized water, to prepare an ink.

(Preparation of Samples B to G)

Samples B to G were prepared in the same manner as in the preparation of Sample 101, except that the phthalocyanine compound (Illustrative Compound IV-101, an oil-soluble dye) was replaced by each of the phthalocyanine compounds (oil-soluble dyes) as shown in Table IV-11. At that time, Ink Solutions 101, 102, 103 and 104 were prepared as comparative ink solutions using the following compounds.

In the case where the dye was changed, the dye was used such that the addition amount was equimolar to the Ink Solution A. In the case where two or more kinds of the dyes were used, they were used in equimolar amounts, respectively.

(Image Recording and Evaluation)

The inkjet inks of the Examples (Ink Solutions A to G) and Comparative Examples (Ink Solutions 101 to 104) were evaluated in the following manners. The results are shown in Table IV-11.

Incidentally, in Table IV-11, the "color tone", "paper dependency", "water resistance", and "light fastness" were evaluated after recording images with each inkjet ink on a photo glossy paper [PM photographic paper "Kotaku" (KA420PSK, EPSON), made by EPSON] using an inkjet printer (PM-700C, made by EPSON).

The color tone, paper dependency, water resistance, dark-heat preservability, and ozone gas resistance were evaluated in the same manner as in Example I-1.

TABLE IV-11

| Sample No. of ink solution | Compound No. | Pc Structure Substitution position (α or β) Number of substitutions (n) | Color tone | Paper dependency | Water resistance | Light fastness | Dark-heat preservability | Ozone resistance |
|---|---|---|---|---|---|---|---|---|
| A | IV-101 | β-Position (n = 4) | ○ | A | A | A | A | A |
| B | IV-107 | β-Position (n = 4) | ○ | A | A | A | A | A |
| C | IV-118 | β-Position (n = 4) | ○ | A | A | A | A | A |

TABLE IV-11-continued

| Sample No. of ink solution | Compound No. | Pc Structure Substitution position (α or β) Number of substitutions (n) | Color tone | Paper dependency | Water resistance | Light fastness | Dark-heat preservability | Ozone resistance |
|---|---|---|---|---|---|---|---|---|
| D | IV-128 | β-Position (n = 4) | ○ | A | A | A | A | A |
| E | IV-131 | β-Position (n = 4) | ○ | A | A | A | A | A |
| F | IV-146 | β-Position (n = 4) | ○ | A | A | A | A | A |
| G | IV-149 | β-Position (n = 4) | ○ | A | A | A | A | A |
| 101 | Comparative Compound 1 | α,β-Mixture (n = 4, 3, 2) | ○ | B | B | B | A | C |
| 102 | Comparative Compound 2 | α,β-Mixture (n = 4) | ○ | B | B | B | A | C |
| 103 | Comparative Compound 3 | α-Position (n = 4) | ○ | A | A | B | A | C |
| 104 | Comparative Compound 4 | β-Position (n = 4) | ○ | A | B | B | A | C |

As is clear from Table IV-11, the inkjet inks of the invention were superior in the color tone, small in the paper dependency, and superior in the water resistance, light fastness and ozone gas resistance. Especially, it is clear that the inkjet inks of the invention are superior in image preservability such as light fastness and ozone gas resistance.

Example IV-2

Using the same cartridge as prepared in Example IV-1, images were printed on an inkjet paper photo glossy paper EX, made by Fuji Photo Film, by means of the same apparatus as in Example IV-1, and then evaluated in the same manner as in Example IV-1. As a result, similar results to those in Example IV-1 were obtained.

Example IV-3

The same ink as prepared in Example IV-1 was packed in a cartridge of an inkjet printer BJ-F850 (made by CANON). Using this cartridge, images were printed on an inkjet paper photo glossy paper GP-301 of the same company by means of the same apparatus, and then evaluated in the same manner as in Example IV-1. As a result, similar results to those in Example IV-1 were obtained.

Example IV-4

Three parts by weight of each of the phthalocyanine compounds of the invention (Compounds IV-101, IV-121, IV-141 and IV-161) and 100 parts by weight of a resin for toner [a styrene-acrylic acid ester copolymer; a trade name: Himer TB-1000F (made by Sanyo Chemical)] were mixed and pulverized in a ball mill. The mixture was heated at 150° C. for melt kneading, and after cooling, the mixture was coarsely ground by means of a hammer mill. Thereafter, the coarse particles were pulverized by an air jet-mode pulverizer and classified by sieving to choose particles of from 1 to 20 microns as a toner. Ten parts of the toner was uniformly mixed with 900 parts of a carrier iron powder (a trade name: EFV250/400, made by Nippon Teppun) to prepare a developer. Similarly, samples of comparative coloring agents as shown in Table IV-12 were prepared in the same manner, except that 3 parts by weight of the dye and 6 parts by weight of the pigment were used. Using these developers, copying was carried out by means of a dry type electrophotographic copier for plain paper [a trade name: NP-5000, made by CANON].

On each of paper and OHP, was prepared a reflection image (image on the paper) or a transmission image (on the OHP) with the developer using the color toner containing the compound of the invention by the foregoing image formation method. Then, evaluation was carried out in the following manner. Incidentally, the evaluation was made within the range of an adhesion amount of the toner of 0.7±0.05 (mg/cm$^2$).

The obtained images were evaluated with respect to hue and light fastness. The hue was visually evaluated in accordance with three grades, "best", "good" and "poor". The evaluation results are shown in Table IV-12. In Table IV-12, "○" means that the hue was best, "Δ" means that the hue was good, and "×" means that the hue was poor, respectively. With respect to the light fastness, an image density Ci immediately after recording was measured, and images were irradiated with a xenon light (85,000 lx) using a weather-ometer (Atlas C. 165) for 5 days. Then, an image density Cf was again measured. A dye retention rate ({(Ci−Cf)/Ci}× 100%) was calculated from a difference in the image density before and after the irradiation with a xenon light and evaluated. The image density was measured using a reflection densitometer (X-Rite 310TR). The evaluation results are shown in Table IV-12. In Table IV-12, the case where the dye retention rate was 90% or more is designated as "○", the case where the dye retention rate was from 90 to 80% is designated as "Δ", and the case where the dye retention rate was less than 80% is designated as "×", respectively.

The transparency of the OHP image was evaluated in the following manner. A visible light spectral transmittance of the image was measured by means of 330 Model Autographic Spectrophotometer made by Hitachi, Ltd. while using an OHP sheet not having a toner supported thereon as a reference, and a spectral transmittance at 450 nm was obtained as a measure of the transparency of the OHP image. The case where the spectral transmittance was 80% or more is designated as "○", the case where the spectral transmittance was from 70 to 80% is designated as "Δ", and the case where the spectral transmittance was less than 70% is designated as "×", respectively. The results are shown in Table IV-12.

TABLE IV-12

| | Test compound No. | Hue | Light fastness | Transparency |
|---|---|---|---|---|
| Invention | IV-101 | ○ | ○ | ○ |
| Invention | IV-104 | ○ | ○ | ○ |
| Invention | IV-115 | ○ | ○ | ○ |
| Invention | IV-132 | ○ | ○ | ○ |
| Comparative Example IV-1 | Comparative Dye 9 | Δ | Δ | Δ |
| Comparative Example IV-2 | Comparative Dye 10 | Δ | Δ | Δ |
| Comparative Example IV-3 | C.I. Solvent Blue 38 | x ○ | x | |
| Comparative Example IV-4 | C.I. Solvent Blue 70 | x ○ | x | |

As is clear from Table IV-12, as compared with the comparative dyes, the phthalocyanine compounds of the invention are superior in the light fastness, sharp in the hue, and high in the transparency. When the color toner of the invention is used, faithful color reproducibility and high OHP quality are obtained, and hence, the color toner of the invention is suitable for use as a full-color toner. Further, since the phthalocyanine compounds of the invention are superior in the light fastness, it is possible to provide images that can be preserved over a long period of time.

Example IV-5

<Preparation Method of Color Filter>

In this Example, the results obtained when the phthalocyanine compound was applied for a color filter are shown. The color filter was prepared in the following method. Specifically, a positive-working resist composition containing a thermosetting resin, a quinonediazide compound, a crosslinking agent, a dye, and a solvent was spin coated on a silicone wafer and heated to evaporate off the solvent. Thereafter, exposure was carried out through a mask to decompose the quinonediazide compound. If necessary, after heating, development was carried out to obtain a mosaic pattern. The exposure was carried out using an i-line exposure stepper, HITACHI LD-5010-i (NA=0.40) made by Hitachi, Ltd. Further, as the developing solution, was used SOPD or SOPD-B made by Sumitomo Chemical.

<Preparation of Positive-working Resist Composition>

A positive-working resist composition was obtained by mixing 3.4 parts by weight of a cresol novolak resin (weight average molecular weight calculated as polystyrene: 4,300) obtained from an m-cresol/p-cresol/formaldehyde mixture (reaction molar ratio=5/5/7.5), 1.8 parts by weight of o-naphthoquinonediazide-5-sulfonic acid ester (in which two (in average) hydroxyl groups are esterified) produced using the foregoing Phenol Compound (A), 0.8 parts by weight of hexamethoxymethyloled melamine, 20 parts by weight of ethyl lactate, and 1 part by weight of the phthalocyanine compound of the invention as shown in Table IV-13.

<Preparation of Color Filter>

The obtained positive-working resist composition was spin coated on a silicone wafer, and the solvent was then evaporated off. After exposure, the exposed silicone wafer was heated at 100° C. and subjected to alkaline development to remove exposed areas. There was thus obtained a positive-working colored pattern having a resolution of 0.8 μm. The pattern was entirely exposed and heated at 150° C. for 15 minutes to obtain a cyan complementary color system color filter.

Comparative Example

A positive-working resist composition was obtained by mixing 1 part by weight of the foregoing Comparative Dye 11 in place of the cyan-based phthalocyanine compound of the invention as used in the above-described Example. The obtained positive-working resist composition was spin coated on a silicone wafer, and the solvent was then evaporated off. After exposure, the exposed silicone wafer was subjected to alkaline development to obtain a positive-working colored pattern having a resolution of 1 μm. The pattern was entirely exposed and heated at 150° C. for 10 minutes to obtain a magenta color filter.

<Evaluation>

A transmission spectrum of the obtained cyan color filter was measured, and the sharpness in the short wave side and long wave of the spectrum as an important factor in the color reproduction was relatively evaluated. "○" means that the sharpness is at a good level, "Δ" means that the sharpness is at a barely allowable level, and "x" means that the sharpness is at a non-allowable level, respectively. Further, the color filter was irradiated with a xenon light (85,000 lx) using a weatherometer (Atlas C. 165) for 7 days, and an image density before and after the irradiation with a xenon light was measured and evaluated as a dye retention rate.

TABLE IV-13

| | Dye/Pigment No. | Absorption characteristic | Light fastness |
|---|---|---|---|
| Invention | IV-104 | ○ | 98% |
| Invention | IV-112 | ○ | 95% |
| Comparative Example | Comparative Dye 11 | Δ | 18% |

As compared with the Comparative Example, the phthalocyanine compounds of the invention were sharp in the sharpness in the short wave side and long wave side of the spectrum and hence, were superior in the color reproducibility. Further, it was shown that the phthalocyanine compounds of the invention were superior in the light fastness to the comparative compound.

Example IV-6

A test of Example IV-6 was carried out in the same procedures as in Example IV-1, except that the test method of Example IV-1 was changed to the following environmental test. Namely, the test was carried out by an oxidation resistance test method using a fluorescent lamp-irradiated chamber at a relative humidity of 80% and at a hydrogen peroxide concentration of 120 ppm, as described in H. Iwano, et al., *Journal of Imaging Science and Technology*, Vol. 38, 140–142 (1994), as an oxidizing gas resistance test method simulating an outdoor environment exposed with oxidizing gases such as exhaust gases of automobiles and sunlight. The results were the same as in Example IV-1.

While the invention has been described in detail and with reference to specific embodiments thereof, it will be apparent to one skilled in the art that various changes and modifications can be made therein without departing from the spirit and scope thereof.

This application is based on Japanese Patent Application Nos. 2001-189982, 2001-190214, 2001-19215, and 2001-190216, all filed Jun. 22, 2001, the contents of which are incorporated herein by reference.

INDUSTRIAL APPLICABILITY

According to the invention, it is possible:
(1) to provide novel coloring agents (dyes and pigments) having an absorption characteristic superior in color reproducibility as dyes of three primary colors and having sufficient fastness to light, heat, humidity, and active gases in an environment;
(2) to provide various coloring compositions capable of giving colored images and coloring materials superior in hue and fastness, which are used for inks for printing such as inkjet, ink sheets in thermal recording materials, color toners for electrophotography, color filers used in displays such as LCD and PDP and picture elements such as CCD, and the like;
(3) to provide inkjet inks capable of forming images having a good hue and high fastness to light and active gases in an environment, particularly ozone gas, particularly by the use of the phthalocyanine compound derivatives, and an ink-jet recording method; and
(4) to provide a method of making images fast for improving a fading resistance to ozone gas of inkjet recording image materials by applying the inkjet recording method.

The invention claimed is:
1. An ink comprising a phthalocyanine compound represented by the following general formula (I):

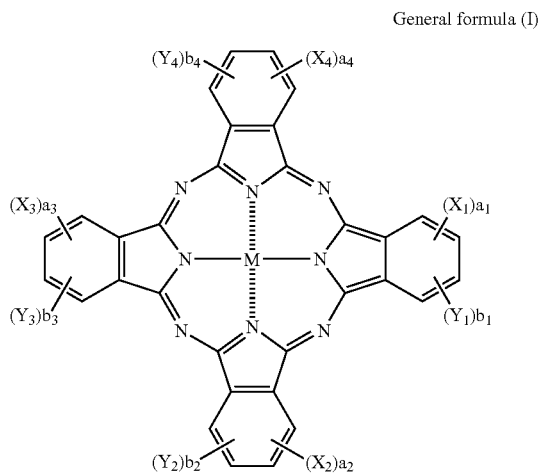

General formula (I)

in the general formula (I), $X_1$, $X_2$, $X_3$, and $X_4$ each independently represents —SO—Z and/or —$SO_2$—Z, wherein each of $X_1$, $X_2$, $X_3$, and $X_4$ is at a β-position of general formula (I), wherein each Z independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, $Y_1$, $Y_2$, $Y_3$, and $Y_4$ each independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amide group, an arylamino group, an ureido group, a sulfamoylamino group, an alkylthio group, an arylthio group, an alkoxycarbonylamino group, a sulfonamide group, a carbamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a phosphoryl group, or an acyl group, and each group may be further substituted, provided that at least one of $X_1$, $X_2$, $X_3$, $X_4$, $Y_1$, $Y_2$, $Y_3$, and $Y_4$ represents a substituent having 2 or more carbon atoms, and the total sum of carbon atoms of the substituents represented by $X_1$, $X_2$, $X_3$, $X_4$, $Y_1$, $Y_2$, $Y_3$, and $Y_4$ is 8 or more, $a_1$ to $a_4$, and $b_1$ to $b_4$ each represents a number of the substituents of $X_1$ to $X_4$, and $Y_1$ to $Y_4$; $a_1$ to $a_4$ each independently represents an integer of from 1 to 4; and $b_1$ to $b_4$ each independently represents an integer of from 0 to 4, and M represents a hydrogen atom, a metal element, or an oxide, a hydroxide or a halide thereof.

2. The ink according to claim 1, wherein the compound represented by the general formula (I) is a compound represented by the following general formula (V):

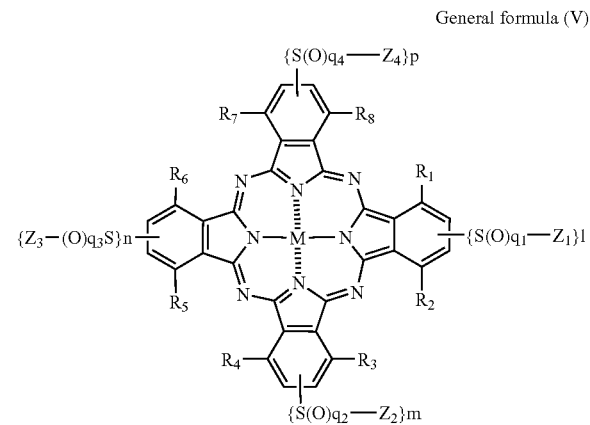

General formula (V)

in the general formula (V), $R_1$, $R_2$, $R_3$, $R_4$, $R_5$, $R_6$, $R_7$, and $R_8$ each independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amide group, an arylamino group, an ureido group, a sulfamoylamino group, an alkylthio group, an arylthio group, an alkoxycarbonylamino group, a sulfonamide group, a carbamoyl group, a sulfamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a phosphoryl group, or an acyl group and each group may be further substituted, $Z_1$, $Z_2$, $Z_3$, and $Z_4$ each independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, provided that at least one of $Z_1$, $Z_2$, $Z_3$, $Z_4$, $R_1$, $R_2$, $R_3$, $R_4$, $R_5$, $R_6$, $R_7$, and $R_8$ represents a substituent having 2 or more carbon atoms, and the total sum of carbon atoms of the substituents represented by $Z_1$, $Z_2$, $Z_3$, $Z_4$, $R_1$, $R_2$, $R_3$, $R_4$, $R_5$, $R_6$, $R_7$, and $R_8$ is 8 or more, l, m, n, p, $q_1$, $q_2$, $q_3$, and $q_4$ each independently represents an integer of 1 or 2, and M represents a hydrogen atom, a metal element, or an oxide, a hydroxide or a halide thereof.

3. The ink according to claim 1, wherein the compound represented by the general formula (I) is a compound represented by the following general formula (IX):

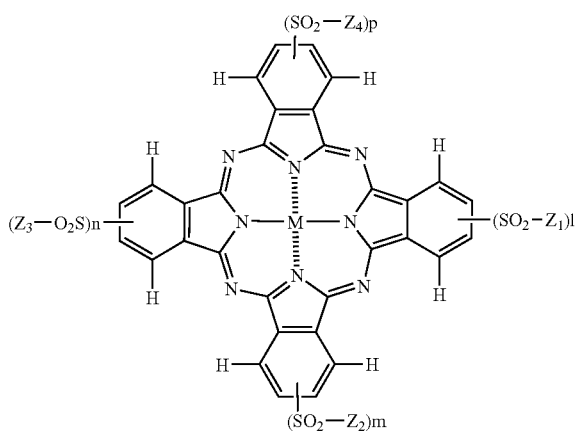

General formula (IX)

in the general formula (IX), $Z_1$, $Z_2$, $Z_3$, and $Z_4$ each independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, provided that at least one of $Z_1$, $Z_2$, $Z_3$, and $Z_4$ represents a substituent having 2 or more carbon atoms, and the total sum of carbon atoms of the substituents represented by $Z_1$, $Z_2$, $Z_3$, and $Z_4$ is 8 or more per molecule of the phthalocyanine compound, l, m, n, and p each independently represents an integer of 1 or 2, and M represents a hydrogen atom, a metal element, or an oxide, a hydroxide or a halide thereof.

4. The ink according to claim 1, wherein the compound represented by the general formula (I) is contained in an amount of 0.2 parts by weight or more and 10 parts by weight or less in 100 parts by weight of the ink.

5. The ink according to claim 2, wherein the compound represented by the general formula (V) is contained in an amount of 0.2 parts by weight or more and 10 parts by weight or less in 100 parts by weight of the ink.

6. The ink according to claim 3, wherein the compound represented by the general formula (IX) is contained in an amount of 0.2 parts by weight or more and 10 parts by weight or less in 100 parts by weight of the ink.

7. The ink according to claim 1, which is an ink for inkjet recording.

8. The ink according to claim 2, which is an ink for inkjet recording.

9. The ink according to claim 3, which is an ink for inkjet recording.

10. An inkjet recording method, which comprises forming images on an image-receiving material having an ink-receiving layer containing white inorganic pigment particles on a support with the ink for inkjet recording according to claim 7.

11. An inkjet recording method, which comprises forming images on an image-receiving material having an ink-receiving layer containing white inorganic pigment particles on a support with the ink for inkjet recording according to claim 8.

12. An inkjet recording method, which comprises forming images on an image-receiving material having an ink-receiving layer containing white inorganic pigment particles on a support with the ink for inkjet recording according to claim 9.

13. A method of improving ozone gas resistance by forming images using the ink for inkjet recording according to claim 9, thereby improving an ozone gas resistance of a colored image material.

14. An ink, comprising a phthalocyanine compound represented by the following general formula (II):

General formula (II)

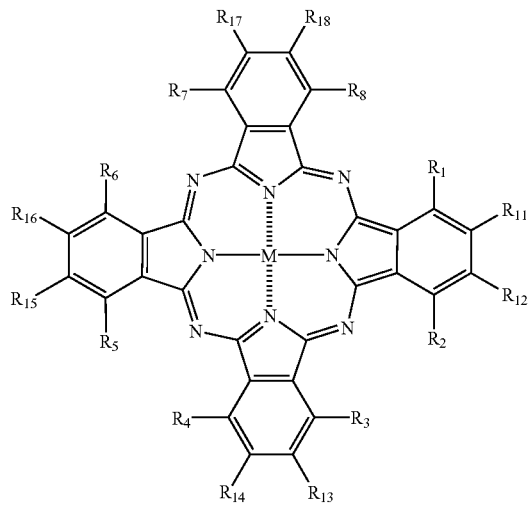

in the general formula (II), $R_1$, $R_2$, $R_3$, $R_1$, $R_5$, $R_6$, $R_7$, and $R_8$ each independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amide group, an arylamino group, an ureido group, a sulfamoylamino group, an alkylthio group, an arylthio group, an alkoxycarbonylamino group, a sulfonamide group, a carbamoyl group, a sulfamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a phosphoryl group, or an acyl group; and each group may be further substituted, $R_{11}$, $R_{12}$, $R_{13}$, $R_{14}$, $R_{15}$, $R_{16}$, $R_{17}$, and $R_{18}$ each independently represents a hydrogen atom, a halogen atom, or a substituted sulfamoyl group, provided that, with respect to each of $R_{11}$ and $R_{12}$, $R_{13}$ and $R_{14}$, $R_{15}$ and $R_{16}$, and $R_{17}$ and $R_{18}$, at least either one represents a substituted sulfamoyl group, and at least one of the four or more substituted sulfamoyl groups present has a substituent which is an alkyl group having 2 or more carbon atoms or an aryl group having 2 or more carbon atoms, wherein the alkyl group having 2 or more carbon atoms or the aryl group having 2 or more carbon atoms has a substituent selected from the group consisting of a halogen atom, an alkyl group, a cycloakyl group, an alkenyl group, an aralkyl group, and aryl group, a heterocyclic group, a cyano group, a hydroxyl group, a nitro group, amino group, an alkylamino group, an alkoxy group, an aryloxy group, an amide group, an arylamino group, a ureido group, a sulfamoylamino group, an alkylthio group, an arylthio group, a sulfonamide group, a carbamoyl group, a sulfamoyl group, an alkoxycarbonyl group, a heterocyclic oxy group, an azo group, an acyloxy group, a carbamoyloxy group, a silyloxy group, an aryloxycarbonyl group, an arloxycarbonylamino group, an imide group, a heterocyclic thio group, a sulfinyl group, a phosphoryl group and an acyl group, and the total sum of carbon atoms of the substituents represented by $R_1$, $R_2$, $R_3$, $R_4$, $R_5$, $R_6$, $R_7$, $R_8$, $R_{11}$, $R_{12}$, $R_{13}$, $R_{14}$, $R_{15}$, $R_{16}$, $R_{17}$, and $R_{18}$ is 8 or more, and M represents a hydrogen atom, a metal element, a metal oxide, a metal hydroxide, or a metal halide.

15. The ink according to claim 14, wherein the compound represented by the general formula (II) is a compound represented by the following general formulae (VI):

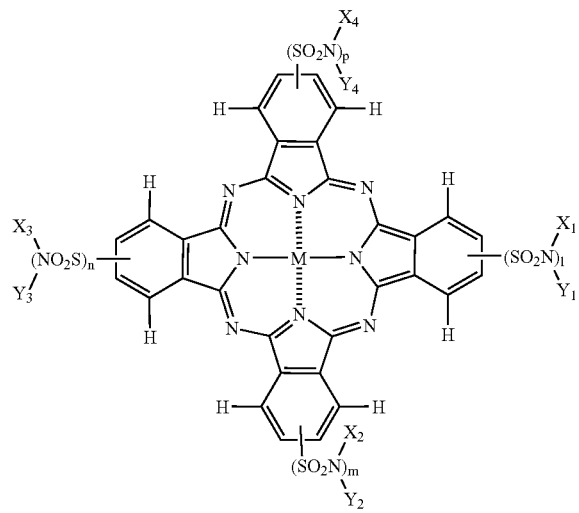

General formula (VI)

in the general formula (VI), $X_1$, $X_2$, $X_3$, and $X_4$ each independently represents a hydrogen atom, a substituted or unsubstituted alkyl group, a substituted or unsubstituted aryl group, a substituted or unsubstituted cycloalkyl group, a substituted or unsubstituted alkenyl group, a substituted or unsubstituted aralkyl group, or a substituted or unsubstituted heterocyclic group, $Y_1$, $Y_2$, $Y_3$, and $Y_4$ each independently represents a substituted or unsubstituted alkyl group or aryl group, provided that at least one of $X_1$, $X_2$, $X_3$, $X_4$, $Y_1$, $Y_2$, $Y_3$, and $Y_4$ represents a substituent which is an alkyl group having 2 or more carbon atoms or an aryl group having 2 or more carbon atoms, wherein the alkyl group having 2 or more carbon atoms or the aryl group having 2 or more carbon atoms has a substituent selected from the group consisting of a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amide group, an arylamino group, an ureido group, a sulfamoylamino group, an alkylthio group, an arylthio group, a sulfonamide group, a carbamoyl group, a sulfamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a sulfinyl group, a phosphoryl group and an acyl group, and the total sum of carbon atoms of the substituents represented by $X_1$, $X_2$, $X_3$, $X_4$, $Y_1$, $Y_2$, $Y_3$, and $Y_4$ is 8 or more, M represents a hydrogen atom, a metal element, or an oxide, a hydroxide or a halide thereof, and l, m, n, and p each independently represents an integer of 1 or 2.

16. An ink, comprising a phthalocyanine compound represented by the following general formula (X):

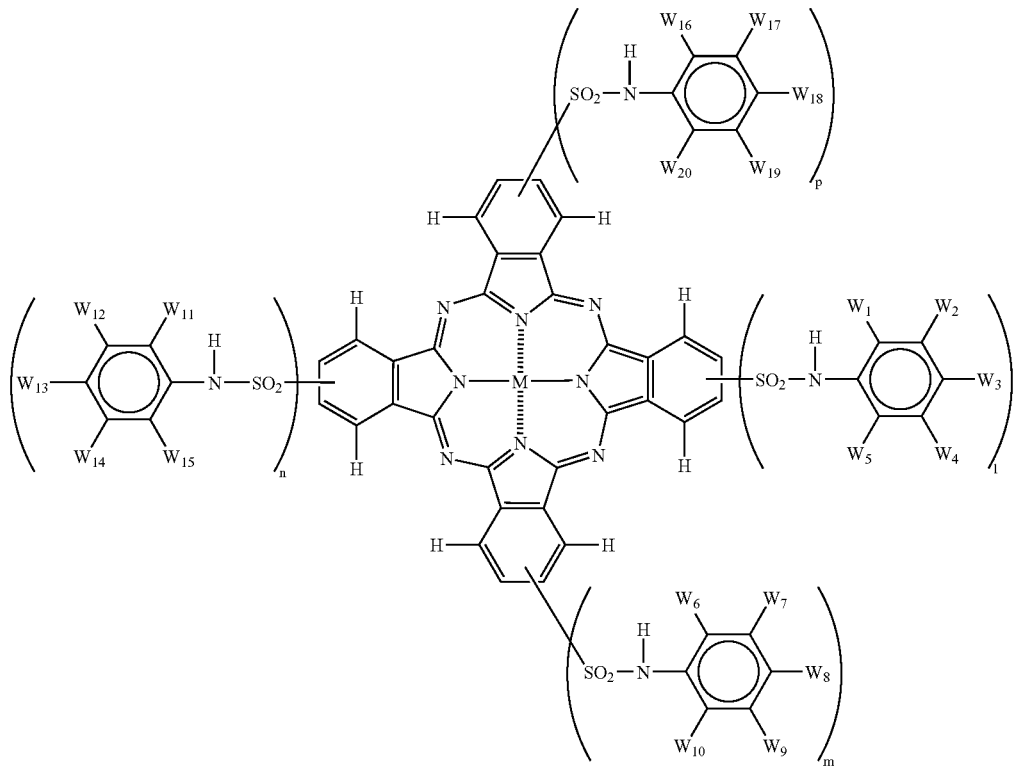

General formula (X)

in the general formula (X), $W_1$ to $W_{20}$ each independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amide group, an arylamino group, an ureido group, a sulfamoylamino group, an alkylthio group, an arylthio group, an alkoxycarbonylamino group, a sulfonamide group, a carbamoyl group, a sulfamoyl group, a sulfonyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a sulfinyl group, a phosphoryl group, or an acyl group; and each group may be further substituted, provided that, each of at least one of $W_1$ to $W_5$, at least one of $W_6$ to $W_{10}$, at least one of $W_{11}$ to $W_{15}$, and at least one of $W_{16}$ to $W_{20}$, is a substituent having 2 or more carbon atoms, and the total sum of carbon atoms of the substituents represented by $W_1$ to $W_{20}$ is 8 or more, M represents a hydrogen atom, a metal element, or an oxide, a hydroxide or a halide thereof, and l, m, n, and p each independently represents an integer of 1 or 2.

17. The ink according to claim 14, wherein the compound represented by the general formula (II) is contained in an amount of 0.2 parts by weight or more and 10 parts by weight or less in 100 parts by weight of the ink.

18. The ink according to claim 15, wherein the compound represented by the general formula (VI) is contained in an amount of 0.2 parts by weight or more and 10 parts by weight or less in 100 parts by weight of the ink.

19. The ink according to claim 16, wherein the compound represented by the general formula (X) is contained in an amount of 0.2 parts by weight or more and 10 parts by weight or less in 100 parts by weight of the ink.

20. The ink according to claim 14, which is an ink for inkjet recording.

21. The ink according to claim 15, which is an ink for inkjet recording.

22. The ink according to claim 16, which is an ink for inkjet recording.

23. An inkjet recording method, which comprises forming images on an image-receiving material having an ink-receiving layer containing white inorganic pigment particles on a support with the ink for inkjet recording according to claim 20.

24. An inkjet recording method, which comprises forming images on an image-receiving material having an ink-receiving layer containing white inorganic pigment particles on a support with the ink for inkjet recording according to claim 21.

25. An inkjet recording method, which comprises forming images on an image-receiving material having an ink-receiving layer containing white inorganic pigment particles on a support with the ink for inkjet recording according to claim 22.

26. A method of improving ozone gas resistance by forming images using the ink for inkjet recording according to claim 22, thereby improving an ozone gas resistance of a colored image material.

27. An ink comprising a phthalocyanine compound represented by the following general formula (III):

General formula (III)

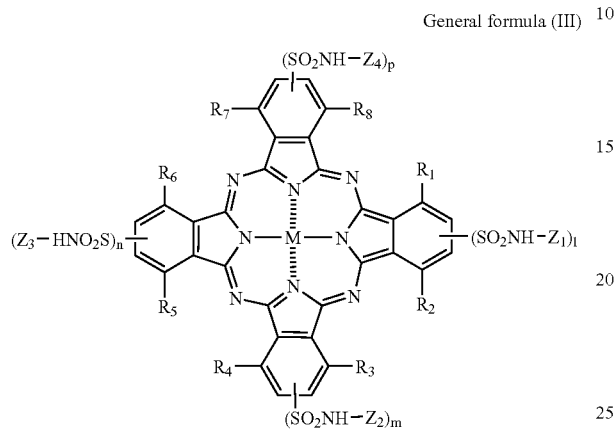

in the general formula (III), $R_1$, $R_2$, $R_3$, $R_4$, $R_5$, $R_6$, $R_7$, and $R_8$ each independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amide group, an arylamino group, an ureido group, a sulfamoylamino group, an alkylthio group, an arylthio group, an alkoxycarbonylamino group, a sulfonamide group, a carbamoyl group, a sulfamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a phosphoryl group, or an acyl group; and each group may be further substituted, $Z_1$, $Z_2$, $Z_3$, and $Z_4$ each independently represents a substituted or unsubstituted heterocyclic group, at least one of $Z_1$, $Z_2$, $Z_3$, $Z_4$, $R_1$, $R_2$, $R_3$, $R_4$, $R_5$, $R_6$, $R_7$, and $R_8$ has a substituent having 2 or more carbon atoms, and the total sum of carbon atoms of the substituents substituted in $Z_1$, $Z_2$, $Z_3$, $Z_4$, $R_1$, $R_2$, $R_3$, $R_4$, $R_5$, $R_6$, $R_7$, and $R_8$ is 8 or more, l, m, n, and p each independently represents an integer of 1 or 2, and M represents a hydrogen atom, a metal element, a metal oxide, a metal hydroxide, or a metal halide.

28. The ink according to claim 27, wherein the compound represented by the general formula (III) is a compound represented by the following general formula (VII):

General formula (VII)

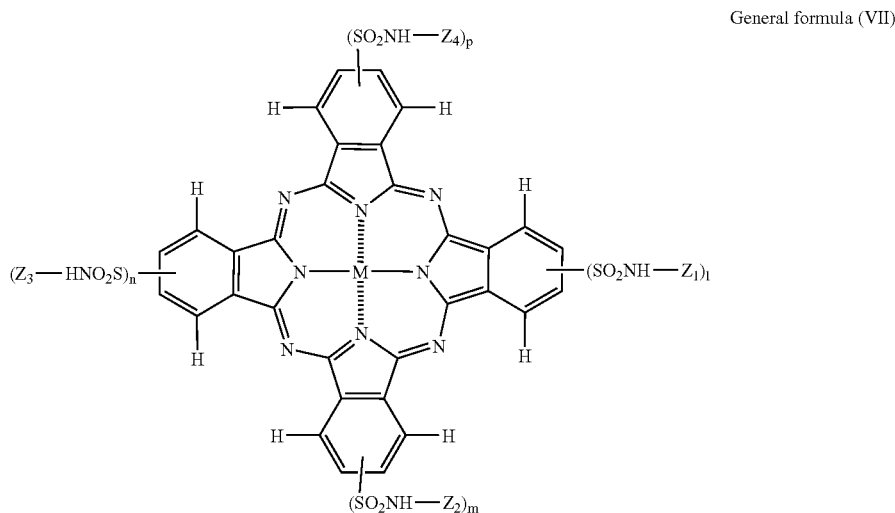

in the general formula (VII), $Z_1$, $Z_2$, $Z_3$, and $Z_4$ each independently represents a substituted or unsubstituted heterocyclic group, at least one of $Z_1$, $Z_2$, $Z_3$, and $Z_4$ has a substituent having 2 or more carbon atoms, and the total sum of carbon atoms of the substituents substituted in $Z_1$, $Z_2$, $Z_3$, and $Z_4$ is 8 or more, M represents a hydrogen atom, a metal element, a metal oxide, a metal hydroxide, or a metal halide.

l, m, n, and p each independently represents an integer of 1 or 2.

29. The ink according to claim 27, wherein the compound represented by the general formula (III) is a compound represented by the following general formulae (XI):

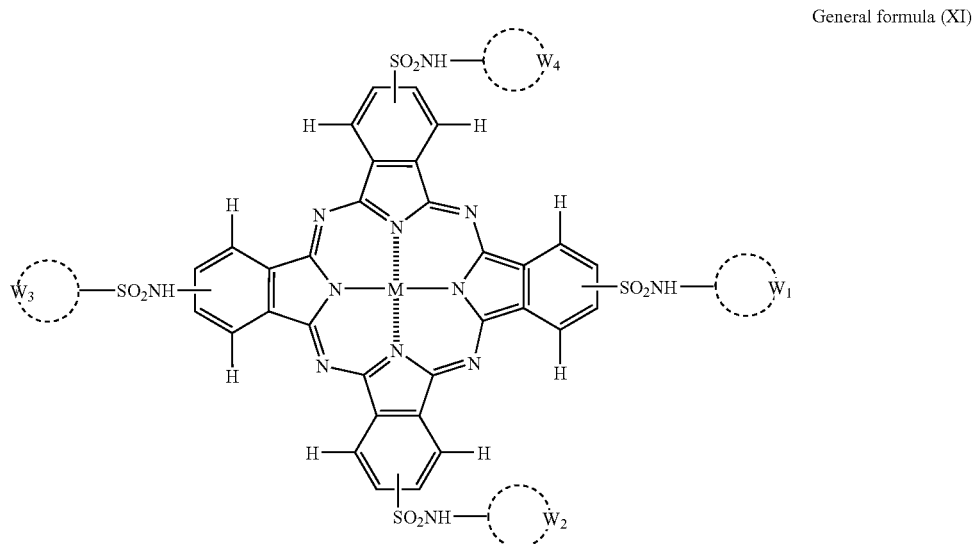

General formula (XI)

in the general formula (XI), $W_1$, $W_2$, $W_3$, and $W_4$ each independently represents an atomic group necessary for forming a 5- to 6-membered nitrogen-containing hetero ring or a condensed ring of the hetero ring with other ring, provided that, in the case where $W_1$, $W_2$, $W_3$, and/or $W_4$ is an atomic group for forming a 6-membered nitrogen-containing hetero ring or a condensed ring of the hetero ring with other ring, the number of nitrogen atoms constituting the 6-membered hetero ring or the condensed ring is 1 or 2, at least one of the 5- to 6-membered hetero rings or the condensed rings of the hetero ring with other ring, as formed from the atomic group of $W_1$, $W_2$, $W_3$, and $W_4$, has a substituent having 2 or more carbon atoms, and the total sum of carbon atoms of the substituents substituted in $W_1$, $W_2$, $W_3$, and $W_4$ is 8 or more, and M represents a hydrogen atom, a metal element, a metal oxide, a metal hydroxide, or a metal halide.

30. The ink according to claim 27, wherein the compound represented by the general formula (III) is contained in an amount of 0.2 parts by weight or more and 10 parts by weight or less in 100 parts by weight of the ink.

31. The ink according to claim 28, wherein the compound represented by the general formula (VII) is contained in an amount of 0.2 parts by weight or more and 10 parts by weight or less in 100 parts by weight of the ink.

32. The ink according to claim 29, wherein the compound represented by the general formula (XI) is contained in an amount of 0.2 parts by weight or more and 10 parts by weight or less in 100 parts by weight of the ink.

33. The ink according to claim 27, which is an ink for inkjet recording.

34. The ink according to claim 28, which is an ink for inkjet recording.

35. The ink according to claim 29, which is an ink for inkjet recording.

36. An inkjet recording method, which comprises forming images on an image-receiving material having an ink-receiving layer containing white inorganic pigment particles on a support with the ink for inkjet recording according to claim 33.

37. An inkjet recording method, which comprises forming images on an image-receiving material having an ink-receiving layer containing white inorganic pigment particles on a support with the ink for inkjet recording according to claim 34.

38. An inkjet recording method, which comprises forming images on an image-receiving material having an ink-receiving layer containing white inorganic pigment particles on a support with the ink for inkjet recording according to claim 35.

39. A method of improving ozone gas resistance by forming images using the ink for inkjet recording according to claim 35, thereby improving an ozone gas resistance of a colored image material.

40. An ink comprising a phthalocyanine compound represented by the following general formula (IV):

General formula (IV)

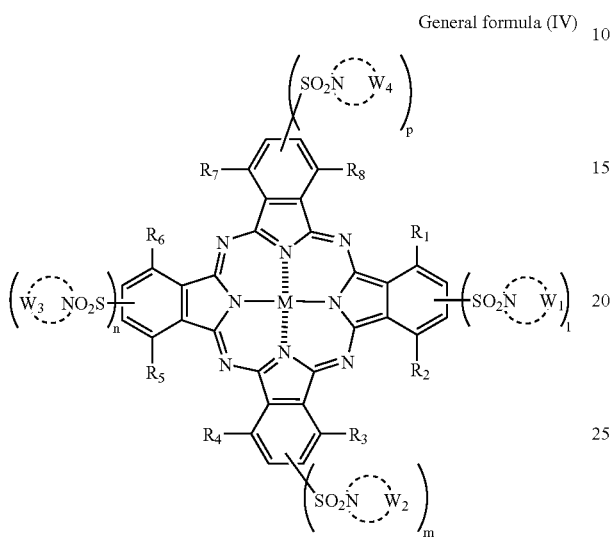

in the general formula (IV), $R_1$, $R_2$, $R_3$, $R_4$, $R_5$, $R_6$, $R_7$, and $R_8$ each independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amide group, an arylamino group, an ureido group, a sulfamoylamino group, an alkylthio group, an arylthio group, an alkoxycarbonylamino group, a sulfonamide group, a carbamoyl group, a sulfamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a phosphoryl group, or an acyl group; and each group may be further substituted, $W_1$, $W_2$, $W_3$, and $W_4$ each independently represents an atomic group necessary for forming a nitrogen-containing heterocyclic ring or a condensed ring of the heterocyclic ring with other ring, provided that at least one heterocyclic ring formed from $W_1$, $W_2$, $W_3$, and $W_4$ has a substituent having 2 or more carbon atoms, and the total sum of carbon atoms of the substituents further substituted in the groups represented by $W_1$, $W_2$, $W_3$, and $W_4$ is 8 or more, l, m, n, and p each independently represents an integer of 1 or 2, and M represents a hydrogen atom, a metal element, a metal oxide, a metal hydroxide, or a metal halide.

41. The ink according to claim 40, wherein the compound represented by the general formula (IV) is a compound represented by the following general formula (VII):

General formula (VIII)

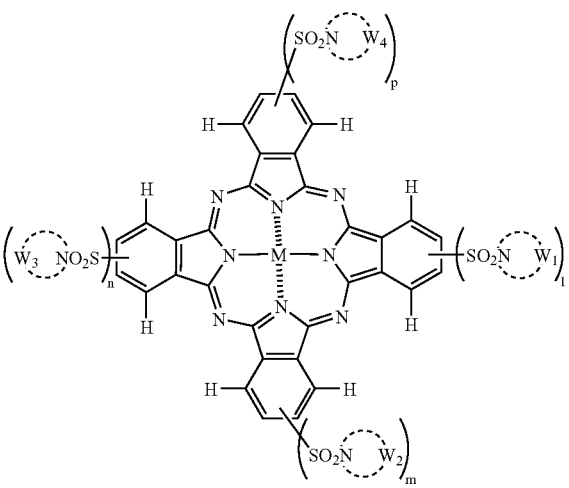

in the general formula (VIII), $W_1$, $W_2$, $W_3$, and $W_4$ each independently represents an atomic group necessary for forming a nitrogen-containing heterocyclic ring or a condensed ring of the heterocyclic ring with other ring, provided that at least one heterocyclic ring formed from $W_1$, $W_2$, $W_3$, and $W_4$ has a substituent having 2 or more carbon atoms, and the total sum of carbon atoms of the substituents further substituted in the groups represented by $W_1$, $W_2$, $W_3$, and $W_4$ is 8 or more, l, m, n, and p each independently represents an integer of 1 or 2, and M represents a hydrogen atom, a metal element, a metal oxide, a metal hydroxide, or a metal halide.

42. The ink according to claim 40, wherein the compound represented by the general formula (IV) is a compound represented by the following general formula (XII):

General formula (XII)

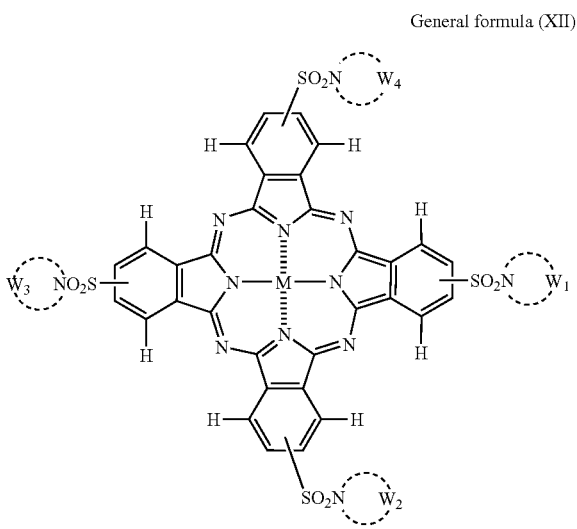

in the general formula (XII), $W_1$, $W_2$, $W_3$, and $W_4$ each independently represents an atomic group necessary for forming a 5- to 6-membered nitrogen-containing hetero ring or a condensed ring of the hetero ring with other ring, provided that at least one of the hetero rings or the condensed rings of the hetero ring with other ring, as formed from $W_1$, $W_2$, $W_3$, and $W_4$, has a substituent having 2 or more carbon atoms, and the total sum of carbon atoms of the substituents further substituted in the groups represented by $W_1$, $W_2$, $W_3$, and $W_4$ is 8 or more, and M represents a hydrogen atom, a metal element, a metal oxide, a metal hydroxide, or a metal halide.

43. The ink according to claim 40, wherein the compound represented by the general formula (IV) is contained in an amount of 0.2 parts by weight or more and 10 parts by weight or less in 100 parts by weight of the ink.

44. The ink according to claim 41, wherein the compound represented by the general formula (VIII) is contained in an amount of 0.2 parts by weight or more and 10 parts by weight or less in 100 parts by weight of the ink.

45. The ink according to claim 42, wherein the compound represented by the general formula (XII) is contained in an amount of 0.2 parts by weight or more and 10 parts by weight or less in 100 parts by weight of the ink.

46. The ink according to claim 40, which is an ink for inkjet recording.

47. The ink according to claim 41, which is an ink for inkjet recording.

48. The ink according to claim 42, which is an ink for inkjet recording.

49. An inkjet recording method, which comprises forming images on an image-receiving material having an ink-receiving layer containing white inorganic pigment particles on a support with the ink for inkjet recording according to claim 46.

50. An inkjet recording method, which comprises forming images on an image-receiving material having an ink-receiving layer containing white inorganic pigment particles on a support with the ink for inkjet recording according to claim 47.

51. An inkjet recording method, which comprises forming images on an image-receiving material having an ink-receiving layer containing white inorganic pigment particles on a support with the ink for inkjet recording according to claim 48.

52. A method of improving ozone gas resistance by forming images using the ink for inkjet recording according to claim 48, thereby improving an ozone gas resistance of a colored image material.

53. A phthalocyanine compound, which is represented by the general formulae (IX):

General formula (IX)

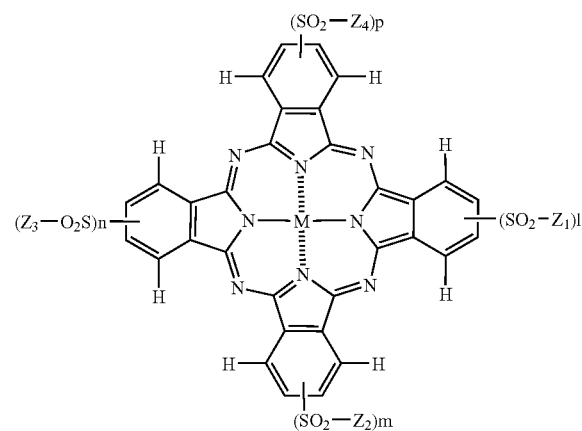

in the general formula (IX), $Z_1$, $Z_2$, $Z_3$, and $Z_4$ each independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, provided that at least one of $Z_1$, $Z_2$, $Z_3$, and $Z_4$ represents a substituent having 2 or more carbon atoms, and the total sum of carbon atoms of the substituents represented by $Z_1$, $Z_2$, $Z_3$, and $Z_4$ is 8 or more per molecule of the phthalocyanine compound, l, m, n, p, each independently represents an integer of 1 or 2, and M represents a hydrogen atom, a metal element, or an oxide, a hydroxide or a halide thereof.

54. The phthalocyanine compound according to claim 53, wherein in the general formula (IX), $Z_1$, $Z_2$, $Z_3$, and $Z_4$ are each represented by -$A_1$-$L_1$-$A_2$-Q, wherein $A_1$ and $A_2$ each represents a substituted or unsubstituted alkylene group; $L_1$ represents a divalent connecting group; and Q represents an alkoxy group.

55. The phthalocyanine compound according to claim 54, wherein in the general formula (IX), $L_1$ is $SO_2NH$—, —COO—, —CONH—, —$NHSO_2$—, —NHCO—, —$SO_2$—, or —O—.

56. A phthalocyanine compound, which is represented by the general formulae (X):

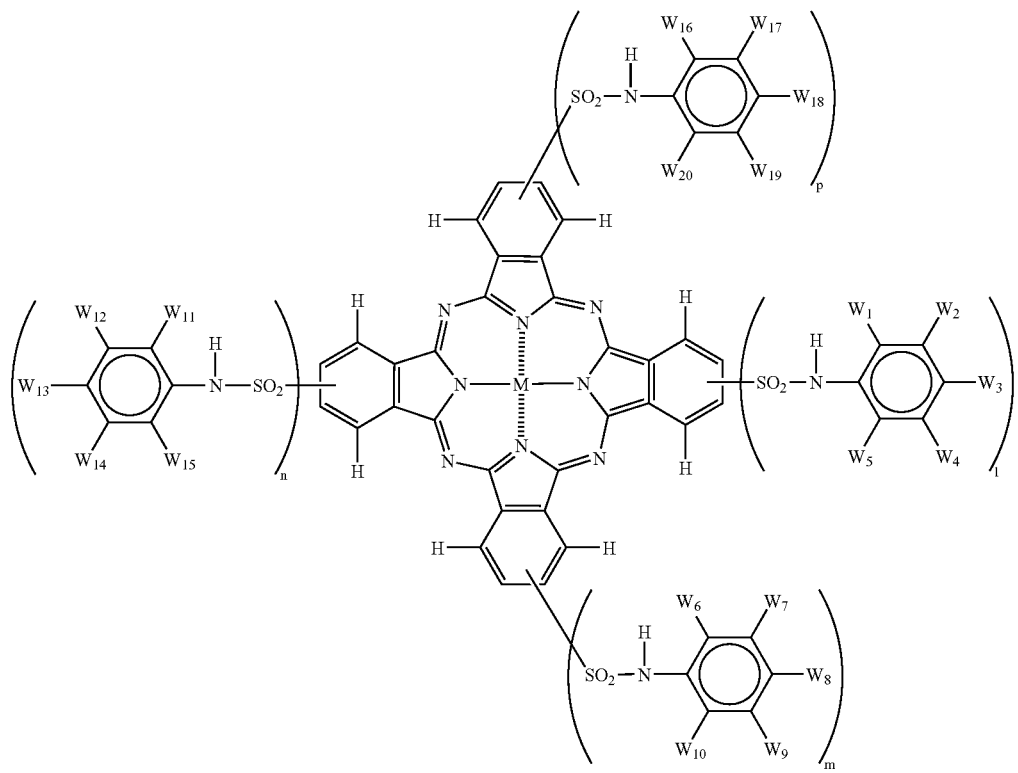

General formula (X)

in the general formula (X), $W_1$ to $W_{20}$ each independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amide group, an arylamino group, an ureido group, a sulfamoylamino group, an alkylthio group, an arylthio group, an alkoxycarbonylamino group, a sulfonamide group, a carbamoyl group, a sulfamoyl group, a sulfonyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a sulfinyl group, a phosphoryl group, or an acyl group; and each group may be further substituted, provided that, each of at least one of $W_1$ to $W_5$, at least one of $W_6$ to $W_{10}$, at least on of $W_{11}$ to $W_{15}$, and at least one of $W_{16}$ to $W_{20}$, is a substituent having 2 or more carbon atoms, and the total sum of carbon atoms of the substituents represented by $W_1$ to $W_{20}$ is 8 or more, M represents a hydrogen atom, a metal element, or an oxide, a hydroxide or a halide thereof, and l, m, n, and p each independently represents an integer of 1 or 2.

57. A phthalocyanine compound, which is represented by the general formulae (XI):

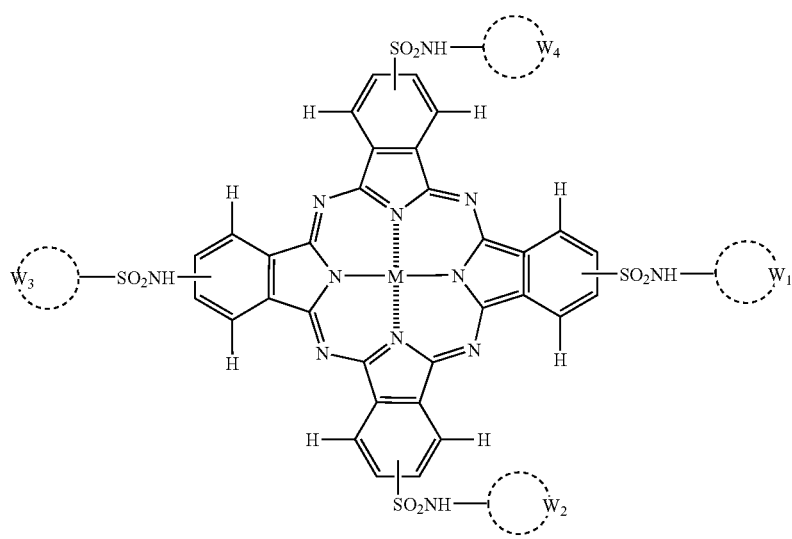

General formula (XI)

in the general formula (XI), $W_1$, $W_2$, $W_3$, and $W_4$ each independently represents an atomic group necessary for forming a 5- to 6-membered nitrogen-containing hetero ring or a condensed ring of the hetero ring with other ring, provided that, in the case where $W_1$, $W_2$, $W_3$, and/or $W_4$ is an atomic group for forming a 6-membered nitrogen-containing hetero ring or a condensed ring of the hetero ring with other ring, the number of nitrogen atoms constituting the 6-membered hetero ring or the condensed ring is 1 or 2, at least one of the 5- to 6-membered hetero rings or the condensed rings of the hetero ring with other ring, as formed from the atomic group of $W_1$, $W_2$, $W_3$, and $W_4$, has a substituent having 2 or more carbon atoms, and the total sum of carbon atoms of the substituents substituted in $W_1$, $W_2$, $W_3$, and $W_4$ is 8 or more, and M represents a hydrogen atom, a metal element, or an oxide, a hydroxide or a halide thereof.

58. The ink according to claim 14, wherein the substituent of the alkyl group having 2 or more carbon atoms or the aryl group having 2 or more carbon atoms is selected from the group consisting of a halogen atom, an alkyl group, a cyano group, an alkoxy group, an amide group, an ureido group, a sulfonamide group, a carbamoyl group, a sulfamoyl group and an alkoxycarbonyl group.

59. The ink according to claim 15, wherein the substituent of the alkyl group having 2 or more carbon atoms or the aryl group having 2 or more carbon atoms is selected from the group consisting of a halogen atom, an alkyl group, a cyano group, an alkoxy group, an amide group, an ureido group, a sulfonamide group, a carbamoyl group, a sulfamoyl group and an alkoxycarbonyl group.

* * * * *